(12) United States Patent
Sako et al.

(10) Patent No.: US 10,297,231 B2
(45) Date of Patent: May 21, 2019

(54) DISPLAY APPARATUS

(71) Applicant: Japan Display Inc., Tokyo (JP)

(72) Inventors: Kazuhiko Sako, Tokyo (JP); Kazunari Tomizawa, Tokyo (JP); Tsutomu Harada, Tokyo (JP); Naoyuki Takasaki, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/677,326

(22) Filed: Aug. 15, 2017

(65) Prior Publication Data

US 2018/0061368 A1    Mar. 1, 2018

(30) Foreign Application Priority Data

Aug. 25, 2016   (JP) ................. 2016-165024

(51) Int. Cl.
| | | |
|---|---|---|
| *G09G 5/10* | (2006.01) |
| *G06T 5/00* | (2006.01) |
| *G09G 3/34* | (2006.01) |
| *G09G 3/36* | (2006.01) |
| *G09G 3/3208* | (2016.01) |

(52) U.S. Cl.
CPC .............. *G09G 5/10* (2013.01); *G06T 5/007* (2013.01); *G09G 3/342* (2013.01); *G09G 3/3611* (2013.01); *G09G 3/3208* (2013.01); *G09G 3/3406* (2013.01); *G09G 3/3607* (2013.01); *G09G 2300/0452* (2013.01); *G09G 2320/0271* (2013.01); *G09G 2320/066* (2013.01);

(Continued)

(58) Field of Classification Search
CPC ......... G09G 3/3426; G09G 2320/0646; G09G 2320/064; G09G 3/3413; G09G 2320/066; G09G 3/3406; G09G 2320/062; G09G 2320/0626; G09G 3/342; G02F 2001/133601; G02F 1/133615; G02F 1/133603
See application file for complete search history.

(56) References Cited

U.S. PATENT DOCUMENTS

2009/0207182 A1*  8/2009  Takada ................. G09G 3/3406
                                                            345/589
2010/0039368 A1   2/2010  Kim et al.
(Continued)

FOREIGN PATENT DOCUMENTS

| JP | 2010-044389 A | 2/2010 |
| JP | 2016-161921 A | 9/2016 |

*Primary Examiner* — Koosha Sharifi-Tafreshi
(74) *Attorney, Agent, or Firm* — Michael Best & Friedrich LLP

(57) ABSTRACT

According to an aspect, a display apparatus includes: an image display panel including a plurality of pixels and displaying an image; and a signal processor generating a second signal by multiplying signal values for a plurality of sub-pixels making up each of the plurality of pixels by a gain, the signal values being included in a first signal that is an input signal of the image. The the signal processor calculates a luminance of each of the plurality of pixels based on the signal values of the sub-pixels included in the respective pixels. The signal processor increases the gain by which the signal values of the sub-pixels of the pixel having a luminance greater than a first luminance threshold are multiplied, in accordance with the luminance of the corresponding pixel.

5 Claims, 44 Drawing Sheets

(52) U.S. Cl.
CPC . *G09G 2320/0646* (2013.01); *G09G 2340/06* (2013.01); *G09G 2360/16* (2013.01)

(56) References Cited

U.S. PATENT DOCUMENTS

| | | | |
|---|---|---|---|
| 2013/0241810 A1* | 9/2013 | Higashi | G09G 3/3406 345/77 |
| 2013/0335457 A1* | 12/2013 | Yano | G09G 3/30 345/690 |
| 2014/0267471 A1* | 9/2014 | Harada | G09G 5/04 345/694 |
| 2016/0260395 A1 | 9/2016 | Sako et al. | |

\* cited by examiner

LINEAR INTERPOLATION

POLYNOMIAL INTERPOLATION

FIG.18
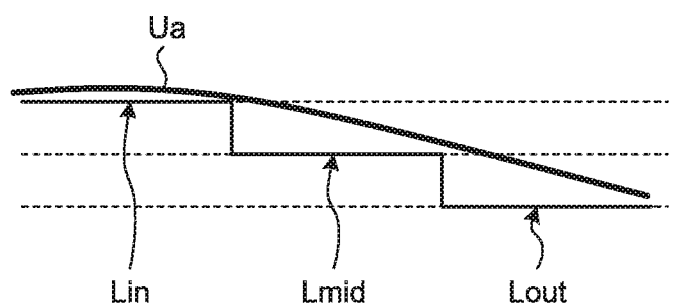
FIG.19
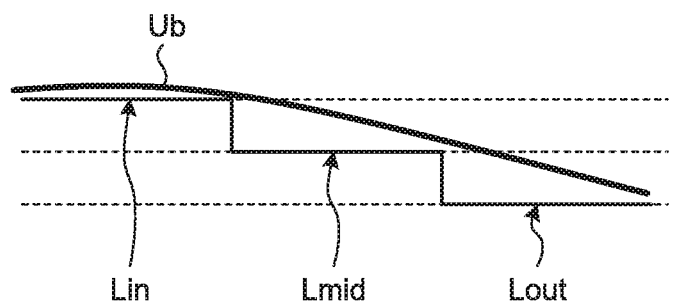

FIG.43
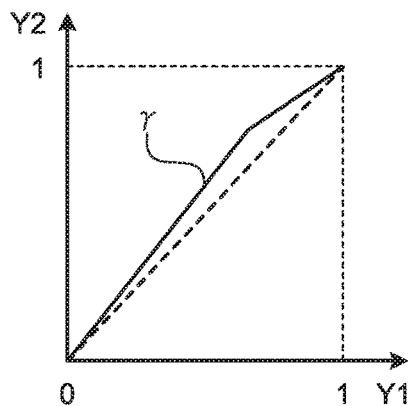
100a, 100f, 100g
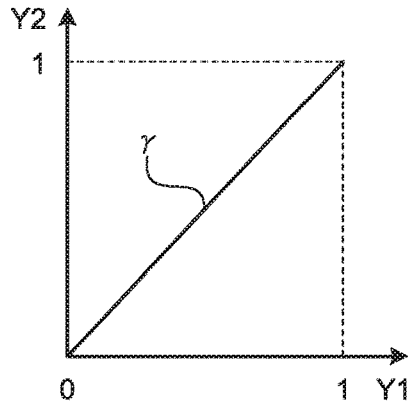
100b, 100d, 100e, 100i, 100k
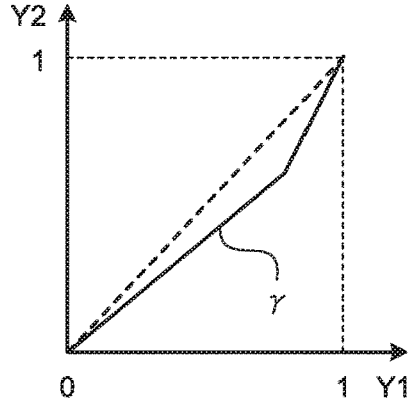
100c, 100h, 100j, 100l

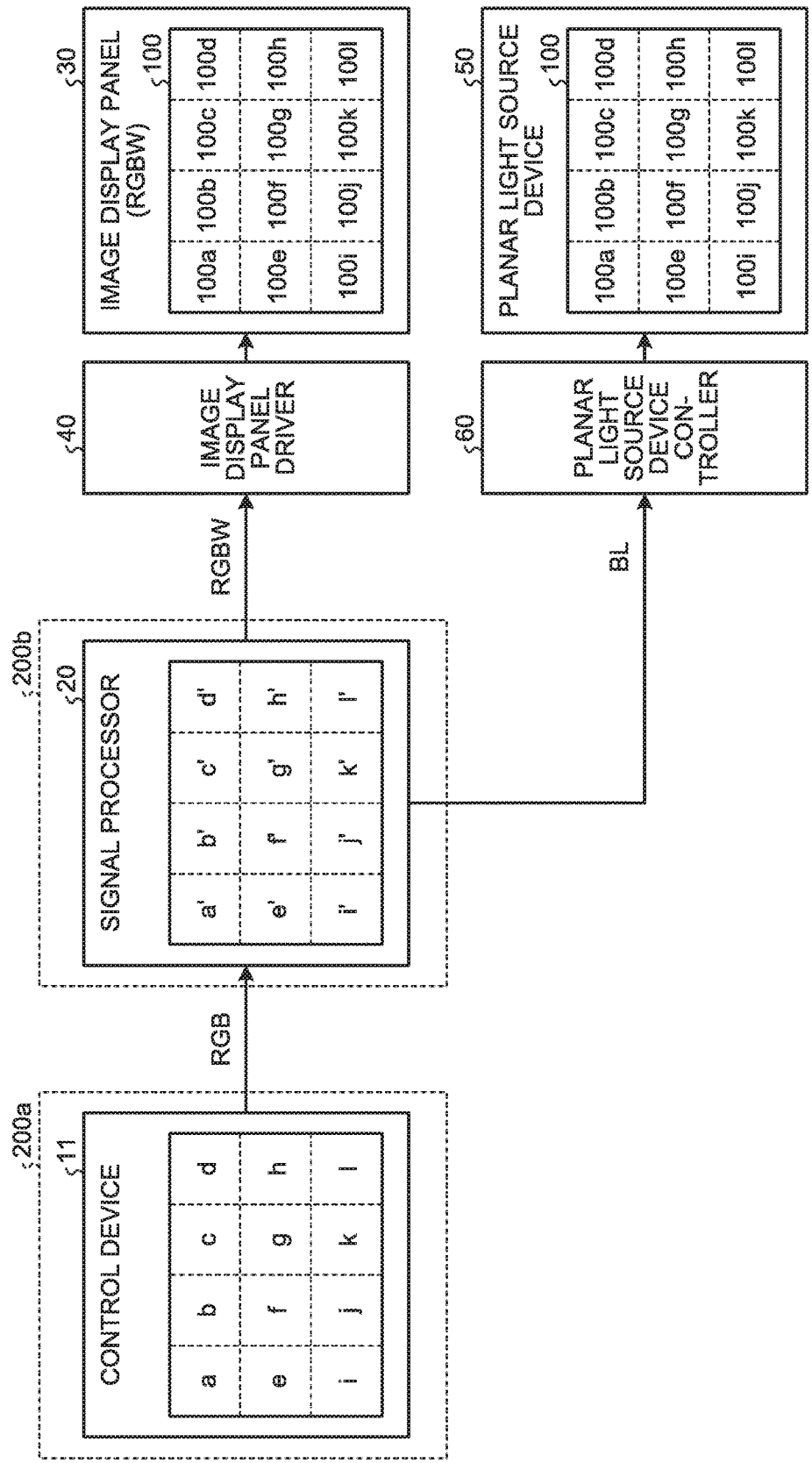

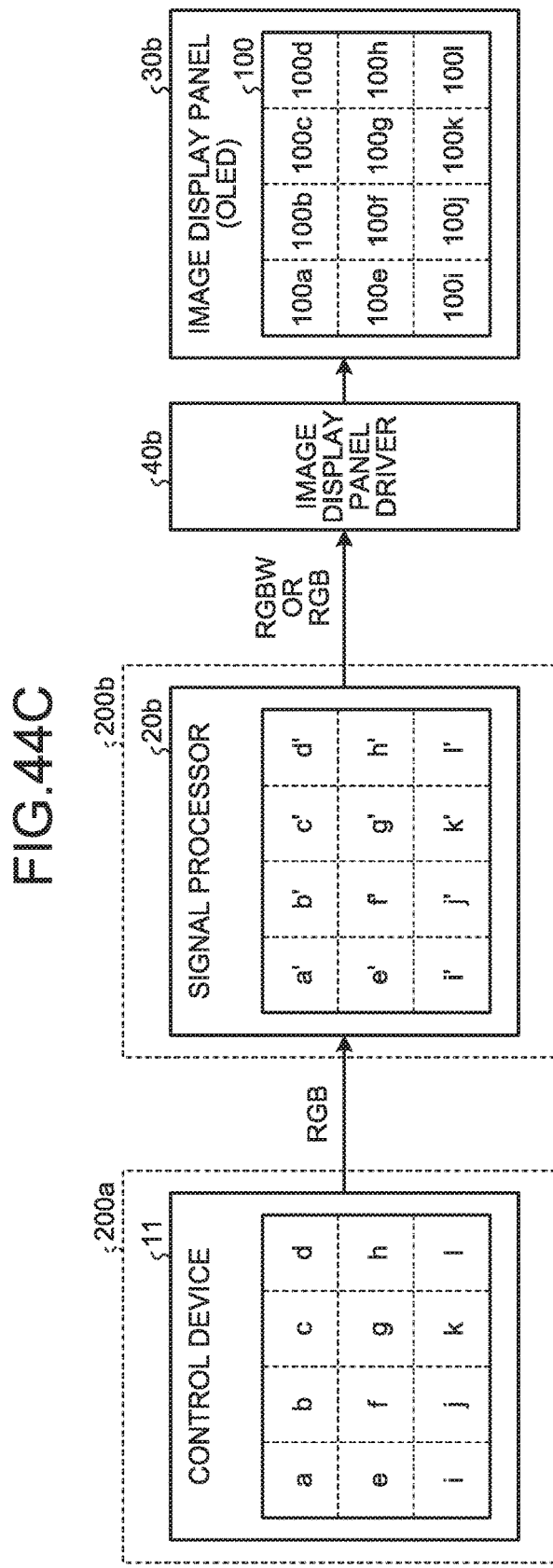

DISPLAY APPARATUS

CROSS-REFERENCE TO RELATED APPLICATIONS

This application claims priority from Japanese Application No. 2016-165024, filed on Aug. 25, 2016, the contents of which are incorporated by reference herein in its entirety.

BACKGROUND

1. Technical Field

The present invention relates to a display apparatus.

2. Description of the Related Art

It is well known that there are display apparatuses that employ a liquid crystal display panel or an organic electroluminescence display (OLED) panel using organic electroluminescence emission. In recent years, there has been a demand for increasing the dynamic range of a display image displayed on such display apparatuses. For example, in Japanese Patent Application Laid-open Publication No. 2010-44389, a local dimming technology is disclosed which improves the contrast ratio by arranging a plurality of light sources in a corresponding plurality of areas acquired by dividing a display area of a liquid crystal display panel and controlling the light emission amounts of the light sources for the corresponding areas.

When the dynamic range of a display image is increased, depending on the display image, there is a possibility that the luminance of a low-luminance portion is raised as well, and a sufficient contrast perception cannot be acquired.

For the foregoing reasons, there is a need for a display apparatus capable of increasing the dynamic range of a display image by increasing the gain of high luminance pixels for an arbitrary image input.

SUMMARY

According to an aspect, a display apparatus includes: an image display panel including a plurality of pixels and displaying an image; and a signal processor generating a second signal by multiplying signal values for a plurality of sub-pixels making up each of the plurality of pixels by a gain, the signal values being included in a first signal that is an input signal of the image. The the signal processor calculates a luminance of each of the plurality of pixels based on the signal values of the sub-pixels included in the respective pixels. The signal processor increases the gain by which the signal values of the sub-pixels of the pixel having a luminance greater than a first luminance threshold are multiplied, in accordance with the luminance of the corresponding pixel.

BRIEF DESCRIPTION OF THE DRAWINGS

FIG. 18 is an explanatory diagram that illustrates a case where the luminance is highest at a light incident part of a luminance determination block according to the embodiment;

FIG. 19 is an explanatory diagram that illustrates the actual luminance of the luminance determination block illustrated in FIG. 18;

FIG. 43 is a diagram that illustrates examples in which an image display area of an original image is divided into a plurality of areas, and in which the curve characteristic γ of the luminance of the input signal for the tone curve converter according to the embodiment with respect to the luminance of the original image differ from division area to division area;

FIG. 44A is a diagram that illustrates an example in which the display apparatus according to the embodiment is applied to a liquid crystal display panel made up of sub-pixels of the four colors red, green, blue, and white;

FIG. 44C is a diagram that illustrates an example in which the display apparatus according to the embodiment is applied to an OLED panel;

DETAILED DESCRIPTION

Figure 1:
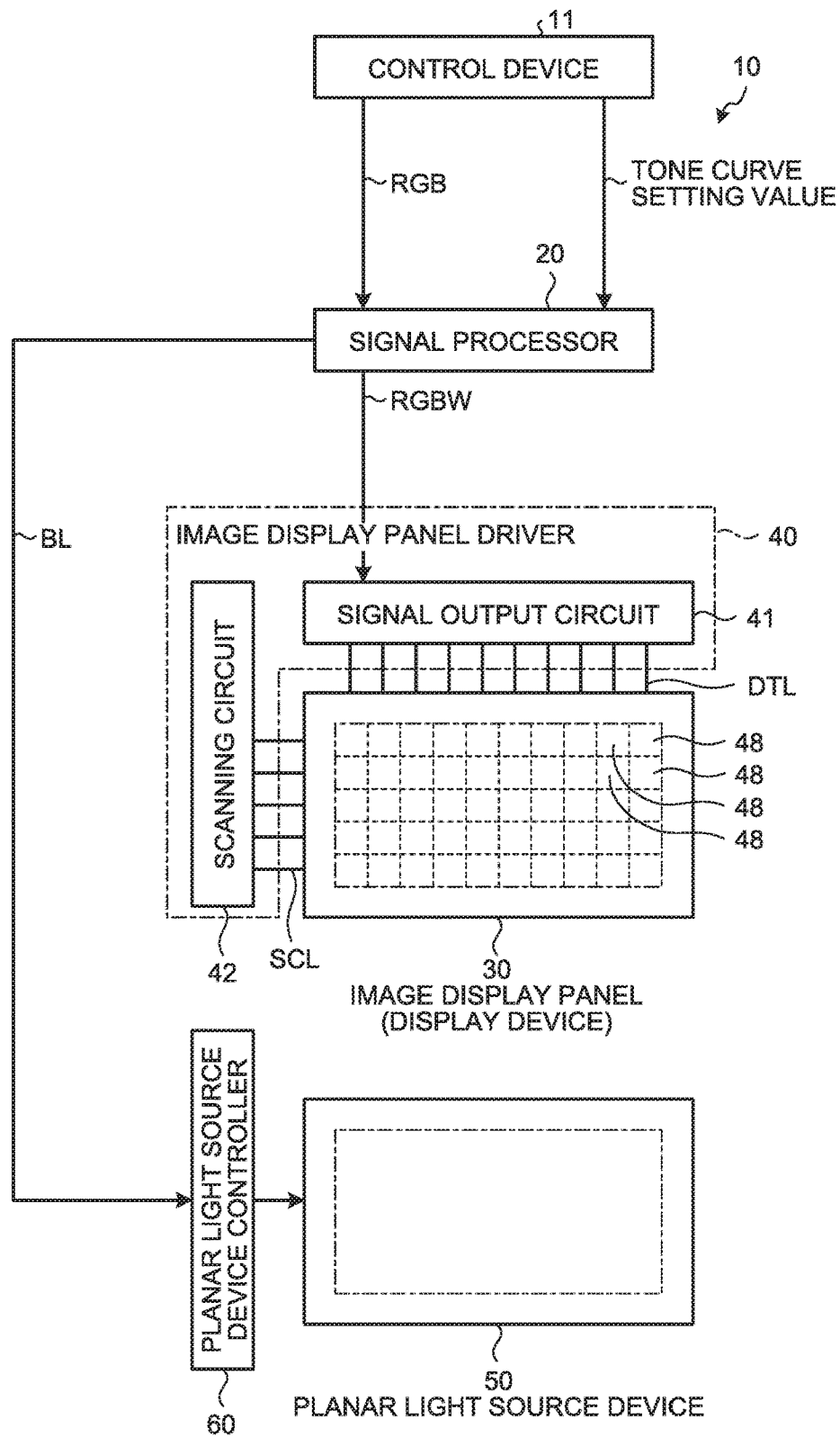
FIG. 1 is a block diagram that illustrates an example of the configuration of a display apparatus according to an embodiment.

Hereinafter, embodiments of the present invention will be described with reference to the drawings. However, the present invention is not limited to contents described in the following embodiments. In constituent elements described below, constituent elements that can be easily considered by a person skilled in the art and constituent elements that are substantially the same are included. The constituent elements described below may be appropriately combined together. The disclosure is merely an example, and it is apparent that an appropriate change that can be acquired by a person skilled in the art with the main concept of the present invention being maintained is within the scope of the present invention. While the drawings are for further clarification of the description, and there are cases where the width, the thickness, the shape, and the like of elements are illustrated more schematically than those of an actual form, these are merely examples, and the the present invention is not limited thereto. In the present specification and drawings, the same reference numeral is assigned to each element similar to that described in a former drawing, and detailed description thereof may be appropriately omitted.

In this disclosure, when an element is described as being "on" another element, the element can be directly on the other element, or there can be one or more elements between the element and the other element.

Configuration of Display Apparatus

Figure 2:
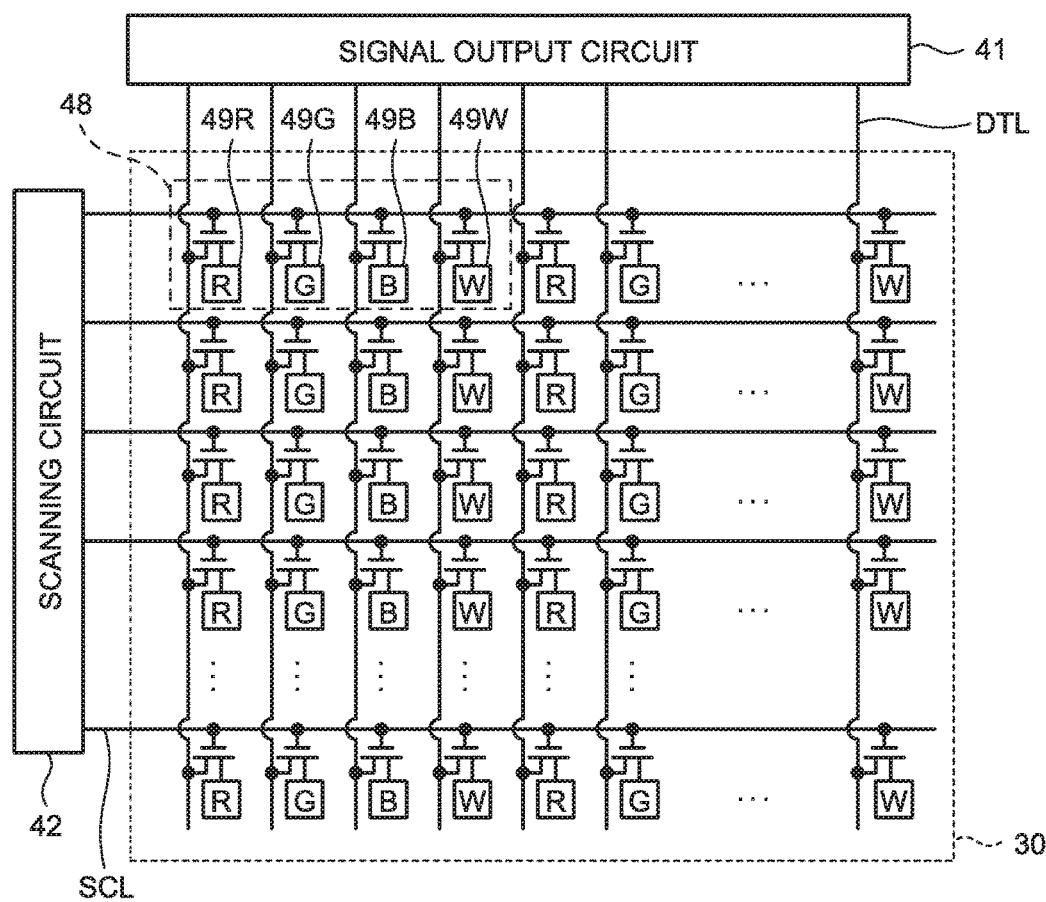
FIG. 2 is a diagram that illustrates the arrangement of pixels in an image display panel according to the embodiment.

FIG. 1 is a block diagram that illustrates an example of the configuration of a display apparatus 10 according to an embodiment. FIG. 2 is a diagram that illustrates the arrangement of pixels in an image display panel 30 according to the embodiment.

As illustrated in FIG. 1, the display apparatus 10 includes a signal processor 20, the image display panel (display device) 30, an image display panel driver 40, a planar light source device 50, and a planar light source device controller 60. The signal processor 20 receives a tone curve setting value (to be described later) and a first signal RGB that is an input signal of an original image from a control device 11. The signal processor 20 transmits a third signal RGBW as an output signal to each component of the display apparatus 10 to control each component. The image display panel (display device) 30 displays an image based on the third signal RGBW output from the signal processor 20. The image display panel driver 40 controls the driving of the image display panel 30. The planar light source device 50 emits light to the image display panel 30 from the rear side. The planar light source device controller 60 controls the driving of the planar light source device 50. The control device 11, the signal processor 20, and the planar light source device controller 60, for example, are included in a semiconductor integrated circuit (IC). The control device 11, the signal processor 20, and the planar light source device controller 60 may be included in one integrated circuit (IC) or in different semiconductor integrated circuits (ICs). The present invention is not limited to the configuration of the control device 11, the signal processor 20, and the planar light source device controller 60.

The signal processor 20 is an operation processor that controls the operations of the image display panel 30 and the planar light source device 50. The signal processor 20 is coupled to the image display panel driver 40, which is used for driving the image display panel 30, and the planar light source device controller 60, which is used for driving the planar light source device 50. The signal processor 20 processes the first signal RGB input from the control device 11 to generate the third signal RGBW and a planar light source device control signal BL. In other words, the signal processor 20 converts an input value (first signal) of an input HSV color space of the first signal RGB into an extended value (third signal) of an extended HSV color space extended using a first color, a second color, a third color, and a fourth color to be generated, and outputs the generated third signal RGBW to the image display panel 30. The signal processor 20 outputs the generated third signal RGBW to the image display panel driver 40 and outputs the generated planar light source device control signal BL to the planar light source device controller 60.

As illustrated in FIG. 1, in the image display panel 30, $P_0 \times Q_0$ pixels 48 ($P_0$ pixels in the row direction and $Q_0$ pixels in the column direction) are arranged in a two-dimensional matrix pattern (row-column configuration). FIG. 1 illustrates an example in which a plurality of the pixels 48 are arranged in a matrix pattern in a two-dimensional XY coordinate system. In this example, the row direction is the X direction, and the column direction is the Y direction.

As illustrated in FIG. 2, each of the pixels 48 includes a first sub-pixel 49R, a second sub-pixel 49G, a third sub-pixel 49B, and a fourth sub-pixel 49W. The first sub-pixel 49R displays a first primary color (for example, a red color). The second sub-pixel 49G displays a second primary color (for example, a green color). The third sub-pixel 49B displays a third primary color (for example, a blue color). The fourth sub-pixel 49W displays a fourth primary color (for example, a white color). In this way, each of the pixels 48 arranged in a matrix pattern (row-column configuration) in the image display panel 30 includes the first sub-pixel 49R displaying the first color, the second sub-pixel 49G displaying the second color, the third sub-pixel 49B displaying the third color, and the fourth sub-pixel 49W displaying the fourth color. The first color, the second color, the third color, and the fourth color are not respectively limited to the first primary color, the second primary color, the third primary color, and the white color but may be different colors such as complementary colors. On the condition that light is emitted with the same light source light amount, it is preferable that the fourth sub-pixel 49W displaying the fourth color is brighter than the first sub-pixel 49R displaying the first color, the second sub-pixel 49G displaying the second color, and the third sub-pixel 49B displaying the third color. In the following description, when the first sub-pixel 49R, the second sub-pixel 49G, the third sub-pixel 49B, and the fourth sub-pixel 49W do not need to be distinguished from one another, each will be referred to as a sub-pixel 49.

More specifically, the display apparatus 10 is a transmissive color liquid crystal display apparatus. As illustrated in FIG. 2, the image display panel 30 is a color liquid crystal display panel. In the image display panel 30, a first color filter passing the first primary color is arranged between the first sub-pixel 49R and an image observer, a second color filter passing the second primary color is arranged between the second sub-pixel 49G and the image observer, and a third color filter passing the third primary color is arranged between the third sub-pixel 49B and the image observer. In addition, in the image display panel 30, a color filter is not arranged between the fourth sub-pixel 49W and the image observer. In this case, a large gap is generated above the fourth sub-pixel 49W. For this reason, for the fourth sub-pixel 49W, a transparent resin layer may be arranged instead of the color filter. In such a case, the generation of a large gap above the fourth sub-pixel 49W can be prevented.

The image display panel driver 40 illustrated in FIGS. 1 and 2 is included in a controller according to the embodiment and includes a signal output circuit 41 and a scanning circuit 42. The image display panel driver 40 maintains a video signal by using the signal output circuit 41 and sequentially outputs video signals to the image display panel 30. The signal output circuit 41 is electrically coupled to the image display panel 30 through signal lines DTL. The image display panel driver 40 selects a sub-pixel 49 in the image display panel 30 by using the scanning circuit 42 and controls On and Off of a switching device (for example, a thin film transistor (TFT)) used for controlling the operation (light transmittance) of the sub-pixel 49. The scanning circuit 42 is electrically coupled to the image display panel 30 through scanning lines SCL.

Figure 3:
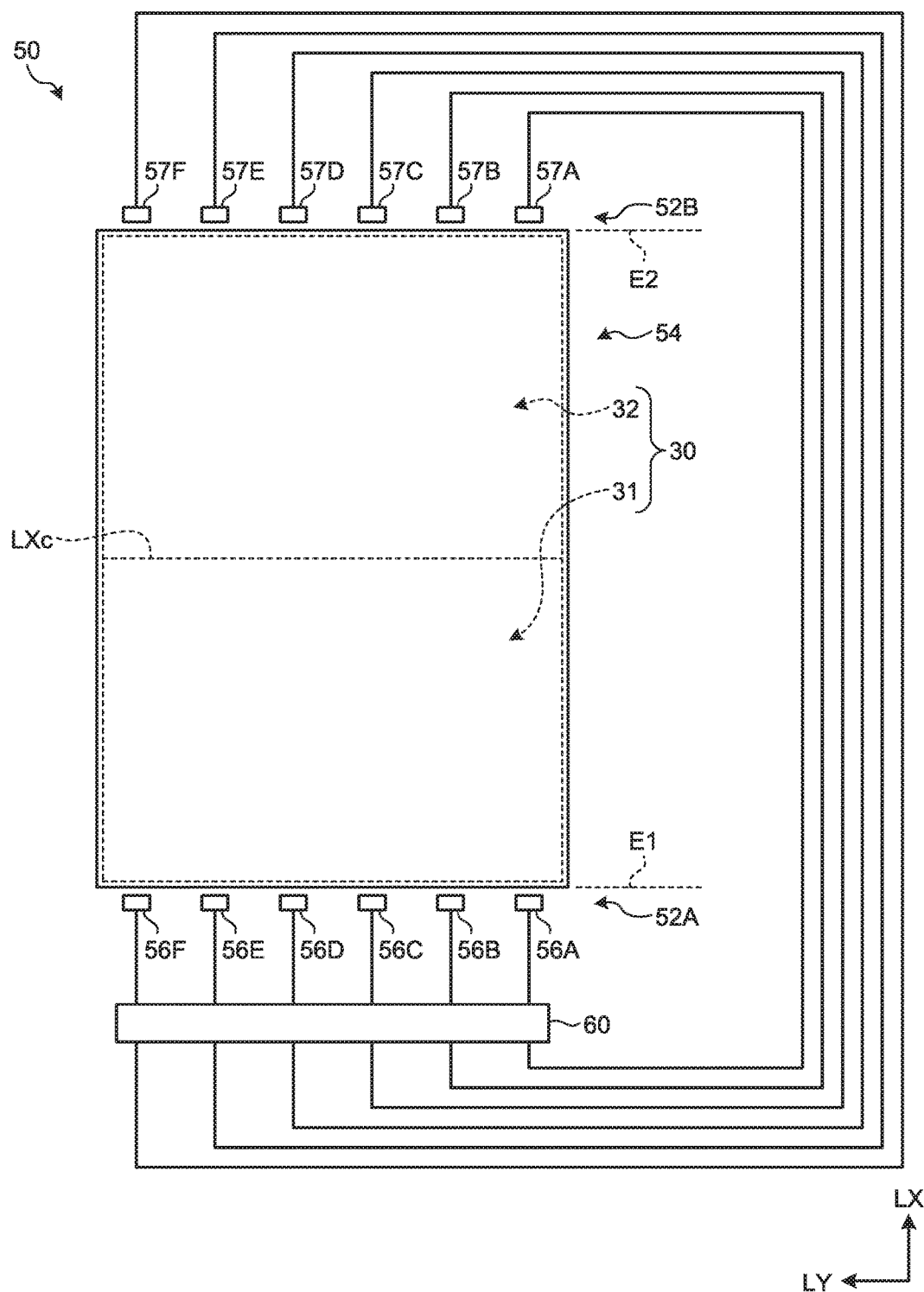
FIG. 3 is an explanatory diagram of a light guiding plate and side light sources according to the embodiment.

The planar light source device 50 is arranged on the rear side of the image display panel 30 and illuminates the image display panel 30 by emitting light toward the image display panel 30. FIG. 3 is an explanatory diagram of a light guiding plate 54 and side light sources according to the embodiment. A first incident surface E1 and a second incident surface E2 are arranged one on each of side surfaces of the light guiding plate 54. The planar light source device 50 includes a first side light source 52A in which a plurality of light sources 56A, 56B, 56C, 56D, 56E, and 56F are arranged at positions facing the first incident surface E1.

In addition, the planar light source device 50 includes a second side light source 52B in which a plurality of light sources 57A, 57B, 57C, 57D, 57E, and 57F are arranged at positions facing the second incident surface E2.

The first side light source 52A and the second side light source 52B are arranged such that the light sources 56A, 56B, 56C, 56D, 56E, and 56F and the light sources 57A, 57B, 57C, 57D, 57E, and 57F have line symmetry with respect to a center line LXc indicating the center of the whole display surface in an light incident direction LX.

The light sources 56A, 56B, 56C, 56D, 56E, 56F, 57A, 57B, 57C, 57D, 57E, and 57F, for example, are light emitting diodes (LEDs) emitting light in the same color (for example, a white color).

The plurality of light sources 56A, 56B, 56C, 56D, 56E, and 56F are aligned along one side surface of the light guiding plate 54. Assume a case where a light source arrangement direction in which the light sources 56A, 56B, 56C, 56D, 56E, and 56F are aligned is denoted by LY. In this case, light emitted from the light sources 56A, 56B, 56C, 56D, 56E, and 56F is incident on the first incident surface E1 of the light guiding plate 54 along the light incident direction LX that is orthogonal to the light source arrangement direction LY.

Similarly, the light sources 57A, 57B, 57C, 57D, 57E, and 57F are aligned along the other side surface of the light guiding plate 54. Assume a case where a light source arrangement direction in which the light sources 57A, 57B, 57C, 57D, 57E, and 57F is denoted by LY. In this case, light emitted from the light sources 57A, 57B, 57C, 57D, 57E, and 57F is incident on the second incident surface E2 of the light guiding plate 54 along the light incident direction LX that is orthogonal to the light source arrangement direction LY.

The planar light source device controller 60 controls the light intensity of light emitted from the planar light source device 50. The planar light source device controller 60 is included in the controller according to the embodiment. More specifically, the planar light source device controller 60 controls the amount of light (the intensity of light) emitted to the image display panel 30 by controlling a value of the current supplied to the planar light source device 50 based on the planar light source device control signal BL output from the signal processor 20.

The control of a current value supplied to the planar light source device 50 is performed by controlling the on/off duty ratio of a voltage or a current applied to the light sources 56A, 56B, 56C, 56D, 56E, 56F, 57A, 57B, 57C, 57D, 57E, and 57F. In other words, the planar light source device controller 60 can perform individual drive control of light sources. In the individual drive control, the planar light source device controller 60 individually controls the on/off duty ratio of a voltage or a current that is applied to each of the light sources 56A, 56B, 56C, 56D, 56E, 56F, 57A, 57B, 57C, 57D, 57E, and 57F illustrated in FIG. 3. Thus, the light source light amount (the intensity of light) of light emitted to each of the light sources 56A, 56B, 56C, 56D, 56E, 56F, 57A, 57B, 57C, 57D, 57E, and 57F is individually controlled.

As described above, the planar light source device controller 60 independently controls the brightness of each light source of the first side light source 52A and independently controls the brightness of each light source of the second side light source 52B.

Here, the planar light source device controller 60 handles two areas as a first display surface 31 and a second display surface 32, the two areas being acquired by virtually dividing the whole surface of the display surface of the image display panel 30 using the center line LXc of the light incident direction LX as a boundary. The first display surface 31 is an area of the display surface of the image display panel 30 that is close to the first side light source 52A. The first display surface 31 is influenced more by light emitted from the first side light source 52A than by light emitted from the second side light source 52B. The second display surface 32 is an area of the display surface of the image display panel 30 that is closed to the second side light source 52B. The second display surface 32 is influenced more by light emitted from the second side light source 52B than by light emitted from the first side light source 52A.

In the following description, an example will be described in which one light source of the first side light source 52A operates for the first display surface 31 illustrated in FIG. 3. The first side light source 52A and the second side light source 52B are arranged such that the light sources 56A, 56B, 56C, 56D, 56E, and 56F and the light sources 57A, 57B, 57C, 57D, 57E, and 57F have line symmetry with respect to the center line LXc indicating the center of the whole display surface in the light incident direction LX. For this reason, a description regarding the light sources 57A, 57B, 57C, 57D, 57E, and 57F becomes the same as a description made by replacing the light sources 56A, 56B, 56C, 56D, 56E, and 56F by the light sources 57A, 57B, 57C, 57D, 57E, and 57F. Thus, a detailed description of an example in which one light source of the second side light source 52B operates for the second display surface 32 illustrated in FIG. 3 may be omitted in some cases.

Figure 4:
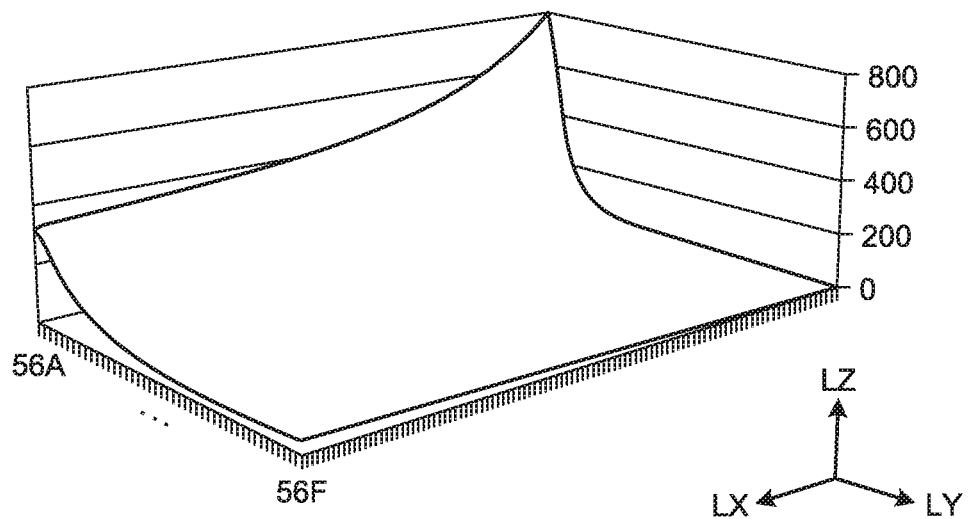
FIG. 4 is an explanatory diagram that illustrates an example of an intensity distribution of light operated by one light source of the side light sources according to the embodiment.
Figure 5:
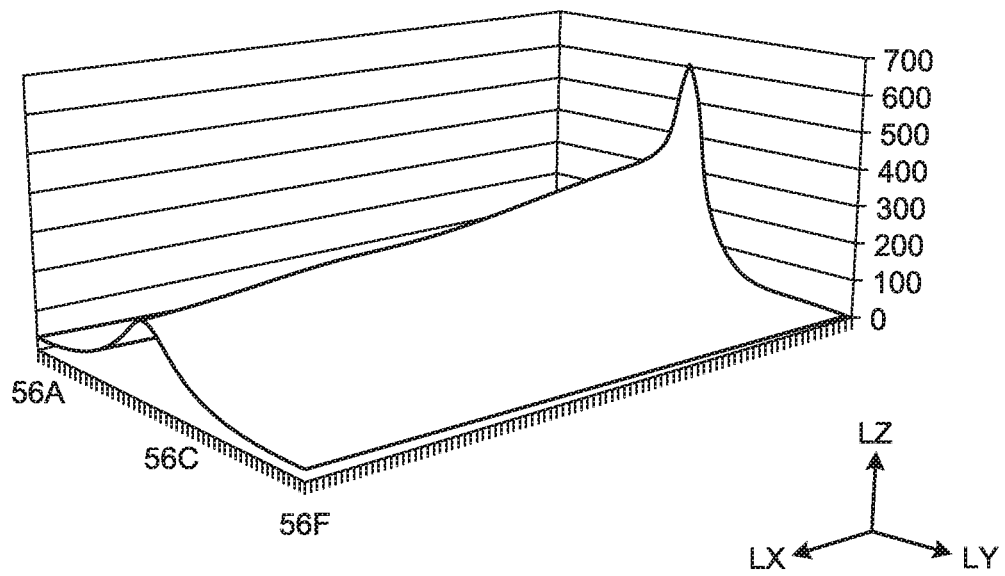
FIG. 5 is an explanatory diagram that illustrates an example of an intensity distribution of light operated by one light source of the side light sources according to the embodiment.

FIGS. 4 and 5 are explanatory diagrams that illustrate examples of an intensity distribution of light operated by one light source of the side light sources according to the embodiment. FIG. 4 illustrates information on a light intensity distribution of incident light when only the light source 56A illustrated in FIG. 3 is lit, the incident light being incident from the light source 56A on the light guiding plate 54 and traveling from the light guiding plate 54 to the flat surface of the image display panel 30. The light from the light source 56A is incident on the first incident surface E1 of the light guiding plate 54 along the light incident direction LX that is orthogonal to the light source arrangement direction LY, and the light guiding plate 54 guides the incident light in a lighting direction LZ in which the image display panel 30 is illuminated from the rear side. In the embodiment, the lighting direction LZ is orthogonal to the light source arrangement direction LY and the light incident direction LX.

FIG. 5 illustrates information on a light intensity distribution of incident light incident when only the light source 56C illustrated in FIG. 3 is lit, the incident light being incident from the light source 56C on the light guiding plate 54 and traveling from the light guiding plate 54 to the flat surface of the image display panel 30. The light from the light source 56C is incident on the first incident surface E1 of the light guiding plate 54 along the light incident direction LX that is orthogonal to the light source arrangement direction LY, and the light guiding plate 54 guides the incident light in the lighting direction LZ in which the image display panel 30 is illuminated from the rear side.

In the light guiding plate 54, since light is reflected by both end surfaces in the light source arrangement direction LY, there is a difference between the intensity distribution of light emitted from the light source 56A or the light source 56F and the intensity distribution of light, for example, emitted from the light source 56C. The light source 56A and the light source 56F are close to the respective end surfaces in the light source arrangement direction LY, and the light source 56C is arranged between the light source 56A and the light source 56F. For this reason, as will be described later, the planar light source device controller 60 according to the embodiment needs to independently control the current or the on/off duty ratio of each of the light sources 56A, 56B, 56C, 56D, 56E, and 56F illustrated in FIG. 3 so as to control the light source light amount (the light intensity) of light emitted according to the light intensity distribution of each of the light sources 56A, 56B, 56C, 56D, 56E, and 56F.

Next, the processing operation performed by the display apparatus 10 (more specifically, the signal processor 20) will be described.

Processing Operation of Display Apparatus

Figure 6:
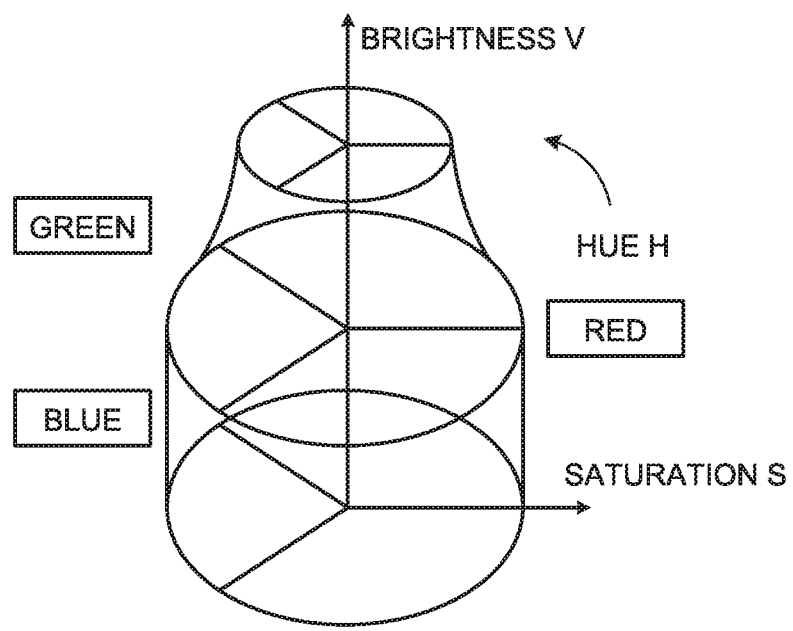
FIG. 6 is a conceptual diagram of an extended HSV color space that can be reproduced by the display apparatus according to the embodiment.
Figure 7:
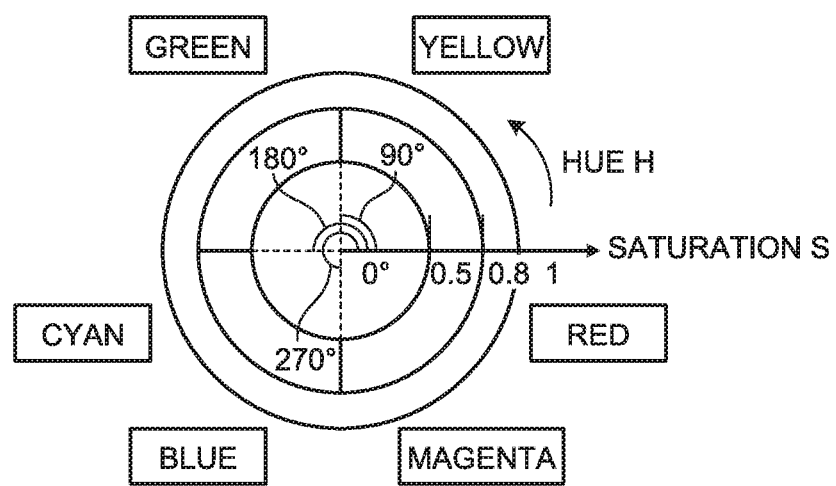
FIG. 7 is a conceptual diagram that illustrates a relation between the hue and the saturation of the extended HSV color space.
Figure 8:
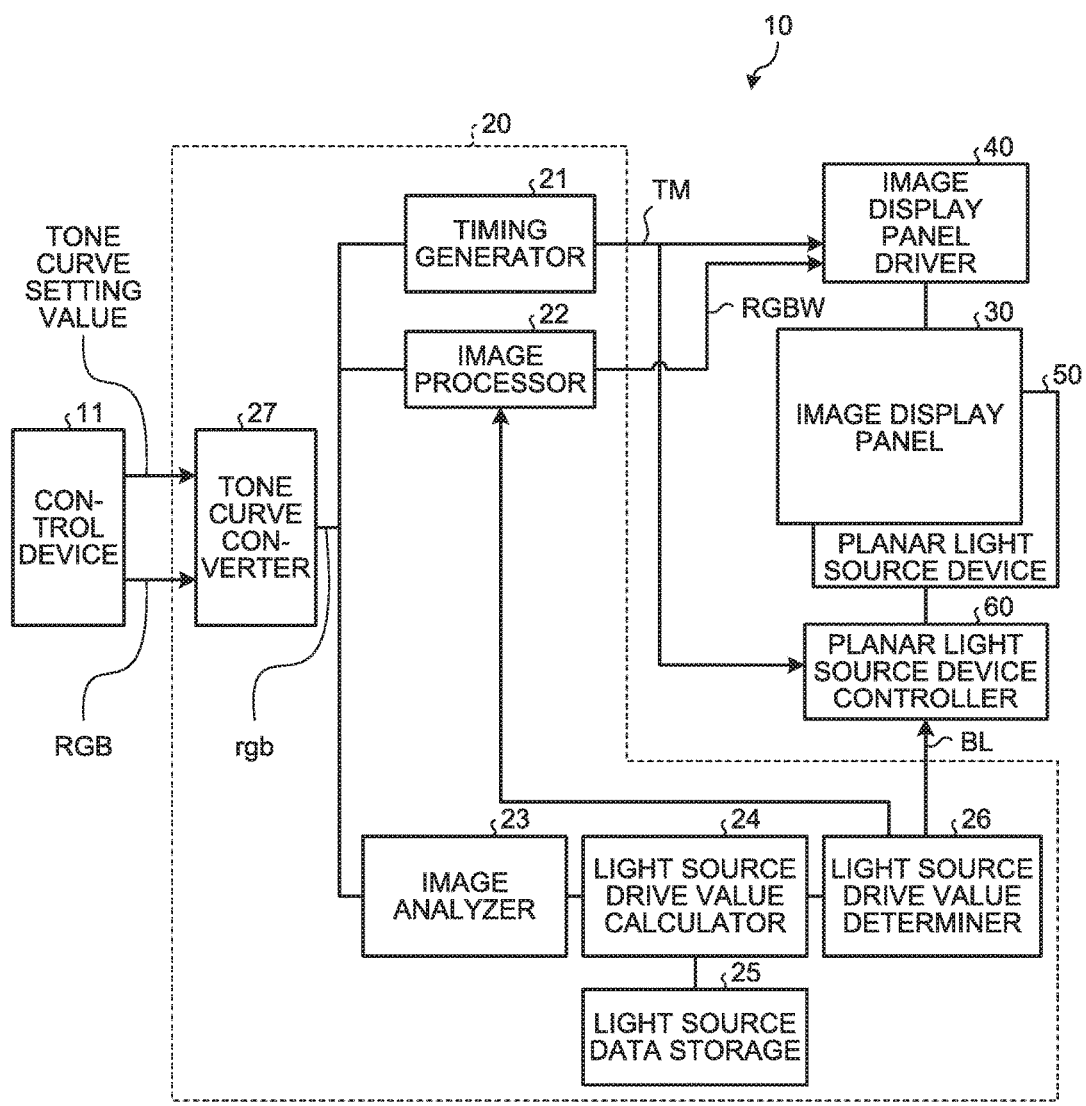
FIG. 8 is a block diagram that illustrates a signal processor according to the embodiment.
Figure 9:
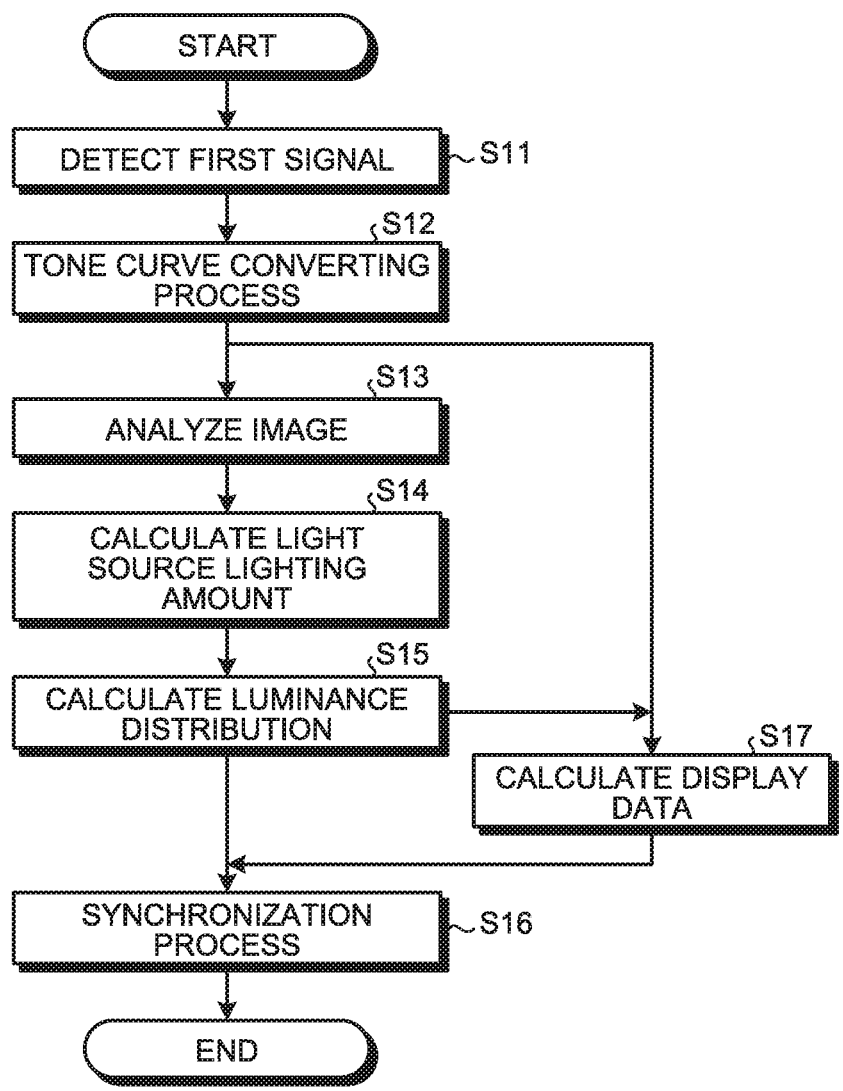
FIG. 9 is a flowchart that illustrates a method of driving the display apparatus according to the embodiment.

FIG. 6 is a conceptual diagram of an extended HSV color space that can be reproduced by the display apparatus according to the embodiment. FIG. 7 is a conceptual diagram that illustrates a relation between the hue and the saturation of the extended HSV color space. FIG. 8 is a block diagram that illustrates a signal processor according to the embodiment. As illustrated in FIG. 1, the signal processor 20 receives a first signal RGB from the control device 11. FIG. 9 is a flowchart that illustrates a method of driving the display apparatus according to the embodiment. The first signal RGB includes information on images (colors) displayed at the respective positions of the pixels 48. More specifically, in the image display panel 30 in which $P_0 \times Q_0$ pixels 48 are arranged in a matrix pattern (row-column configuration), the signal processor 20 receives the first signal RGB including a signal value R(p, q) of each first sub-pixel 49R, a signal value G(p, q) of each second sub-pixel 49G, and a signal value B(p, q) of each third sub-pixel 49B for a (p, q)-th pixel 48 (here, $1 \leq p \leq P_0$ and $1 \leq q \leq Q_0$). As illustrated in FIG. 8, the signal processor 20 includes a timing generator 21, an image processor 22, an image analyzer 23, a light source drive value calculator 24, a light source data storage 25, a light source drive value determiner 26, and a tone curve converter 27.

As illustrated in FIG. 9, the signal processor 20 illustrated in FIGS. 1 and 8 detects the first signal RGB (Step S11). The tone curve converter 27 converts the tone curve of the first signal RGB into a second signal rgb and outputs the second signal rgb (Step S12). The second signal rgb includes a signal value $x_{1-(p, q)}$ of each first sub-pixel 49R, a signal value $x_{2-(p, q)}$ of each second sub-pixel 49G, and a signal value $x_{3-(p, q)}$ of each third sub-pixel 49B. Then, the timing generator 21 processes the second signal rgb and transmits a synchronization signal TM to the image display panel driver 40 and the planar light source device controller 60 for each frame. The synchronization signal is a signal for synchronizing the operation timings of the image display panel driver 40 and the planar light source device controller 60 with each other. A tone curve converting process performed by the tone curve converter 27 in Step S12 will be described later.

The image processor 22 of the signal processor 20 processes a calculation step (Step S17) of display data to be output to the image display panel driver 40. In the calculation step, the image processor 22 processes the second signal rgb to generate a third signal RGBW including a third signal (signal value $X_{1-(p, q)}$) of the first sub-pixel 49R, a third signal (signal value $X_{2-(p, q)}$) of the second sub-pixel 49G, a third signal (signal value $X_{3-(p, q)}$) of the third sub-pixel 49B, and a third signal (signal value $X_{4-(p, q)}$) of the fourth sub-pixel 49W and calculates the display data to be output to the image display panel driver 40. The third signal (signal value $X_{1-(p, q)}$) of the first sub-pixel 49R is a signal for determining the display gradation of the first sub-pixel 49R. The third signal (signal value $X_{2-(p, q)}$) of the second sub-pixel 49G is a signal for determining the display gradation of the second sub-pixel 49G. The third signal (signal value $X_{3-(p, q)}$) of the third sub-pixel 49B is a signal for determining the display gradation of the third sub-pixel 49B. The third signal (signal value $X_{4-(p, q)}$) of the fourth sub-pixel 49W is a signal for determining the display gradation of the fourth sub-pixel 49W. The following describes the calculation step (Step S17) of display data according to the embodiment in detail.

The display apparatus 10 includes the fourth sub-pixel 49W outputting the fourth color (white color) to the pixel 48 as illustrated in FIG. 6. Thus, the display apparatus 10 can broaden the dynamic range of Value (also called as Brightness) V in an HSV color space (extended HSV color space). In other words, as illustrated in FIG. 6, the extended HSV color space has a shape in which a certain color space is placed on a cylindrical HSV color space, the certain color space having a substantially truncated cone shape in which a maximum value of the brightness V is lower as the saturation S is higher, the cylindrical HSV color space being a color space that can be displayed by the first sub-pixel 49R, the second sub-pixel 49G, and the third sub-pixel 49B.

The signal processor 20 stores a maximum value Vmax (S) of the brightness having the saturation S as a variable in the extended HSV color space extended by adding the fourth color (white color) by the image processor 22 of the signal processor 20. In other words, the signal processor 20 stores the maximum value Vmax(S) of the brightness for each coordinates set (coordinate values) of the saturation S and the hue H, with respect to the three-dimensional shape of the HSV color space illustrated in FIG. 6. Since the second signal rgb includes the second signals of the first sub-pixel 49R, the second sub-pixel 49G, and the third sub-pixel 49B, the HSV color space of the second signal has a cylindrical shape, in other words, the same shape as the cylindrical shape portion of the extended HSV color space.

Next, the image processor 22 of the signal processor 20 calculates the third signal (signal value $X_{1-(p, q)}$) of the first sub-pixel 49R based on at least the second signal (signal value $x_{1-(p, q)}$) of the first sub-pixel 49R and the expansion coefficient α, and outputs the calculated third signal (signal value $X_{1-(p, q)}$) of the first sub-pixel 49R to the first sub-pixel 49R. In addition, the signal processor 20 calculates the third signal (signal value $X_{2-(p, q)}$) of the second sub-pixel 49G based on at least the second signal (signal value $x_{2-(p, q)}$) of the second sub-pixel 49G and the expansion coefficient α, and outputs the calculated third signal (signal value $X_{2-(p, q)}$) of the second sub-pixel 49G to the second sub-pixel 49G. Furthermore, the signal processor 20 calculates the third signal (signal value $X_{3-(p, q)}$) of the third sub-pixel 49B based on at least the second signal (signal value $x_{3-(p, q)}$) of the third sub-pixel 49B and the expansion coefficient α, and outputs the calculated third signal (signal value $X_{3-(p, q)}$) of the third sub-pixel 49B to the third sub-pixel 49B. In addition, the signal processor 20 calculates the third signal (signal value $X_{4-(p, q)}$) of the fourth sub-pixel 49W based on at least the second signal (signal value $x_{1-(p, q)}$) of the first sub-pixel 49R, the second signal (signal value $x_{2-(p, q)}$) of the second sub-pixel 49G, and the second signal (signal value $x_{3-(p, q)}$) of the third sub-pixel 49B. The signal processor 20 outputs the calculated third signal (signal value $X_{4-(p, q)}$) of the fourth sub-pixel 49W to the fourth sub-pixel 49W.

More specifically, the image processor 22 of the signal processor 20 calculates the third signal of the first sub-pixel 49R based on the expansion coefficient α of the first sub-pixel 49R and the third signal of the fourth sub-pixel 49W. The image processor 22 calculates the third signal of the second sub-pixel 49G based on the expansion coefficient α of the second sub-pixel 49G and the third signal of the fourth sub-pixel 49W. The image processor 22 calculates the third signal of the third sub-pixel 49B based on the expansion coefficient α of the third sub-pixel 49B and the third signal of the fourth sub-pixel 49W.

In other words, when a constant depending on the display apparatus is denoted by $\chi$, the signal processor 20 acquires a signal value $X_{1-(p, q)}$ that is the third signal of the first sub-pixel 49R, a signal value $X_{2-(p, q)}$ that is the third signal of the second sub-pixel 49G, and a signal value $X_{3-(p, q)}$ that is the third signal of the third sub-pixel 49B for a (p, q)-th pixel 48 (or a set of the first sub-pixel 49R, the second sub-pixel 49G, and the third sub-pixel 49B) by using Equations (1) to (3) represented below.

$$X_{1-(p,q)} = \alpha \cdot x_{1-(p,q)} - \chi \cdot X_{4-(p,q)} \quad (1)$$

$$X_{2-(p,q)} = \alpha \cdot x_{2-(p,q)} - \chi \cdot X_{4-(p,q)} \quad (2)$$

$$X_{3-(p,q)} = \alpha \cdot x_{3-(p,q)} - \chi \cdot X_{4-(p,q)} \quad (3)$$

The signal processor 20 acquires a maximum value Vmax(S) of the brightness having the saturation S as a variable in the extended HSV color space extended by adding the fourth color, and acquires the saturation S and the brightness V(S) of a plurality of pixels 48 based on the second signal values of the sub-pixels 49 of the pixels 48.

The saturation S and the brightness V(S) are represented as S=(Max−Min)/Max and V(S)=Max. The saturation S takes values of 0 to 1, and the brightness V(S) takes values of 0 to ($2^n$−1). Here, n represents the number of display gradation bits. In addition, Max represents a maximum value of the second signal value of the first sub-pixel 49R, the second signal value of the second sub-pixel 49G, and the second signal value of the third sub-pixel 49B for the pixel 48. Furthermore, Min represents a minimum value of the second signal value of the first sub-pixel 49R, the second signal value of the second sub-pixel 49G, and the second signal value of the third sub-pixel 49B for the pixel 48. In addition, the hue H is represented in a range of 00 to 3600 as illustrated in FIG. 7. From 00 toward 3600, the color is red, yellow, green, cyan, blue, magenta, and red.

In the embodiment, the signal value $X_{4-(p, q)}$ can be acquired based on the product of $Min_{(p, q)}$ and the expansion coefficient $\alpha$. More specifically, the signal value $X_{4-(p, q)}$ can be acquired based on the following Equation (4). In Equation (4), the product of $Min_{(p, q)}$ and the expansion coefficient $\alpha$ is divided by $\chi$. However, the equation is not limited thereto. $\chi$ will be described later.

$$X_{4-(p,q)} = Min_{(p,q)} \cdot \alpha / \chi \quad (4)$$

Generally, with respect to a (p, q)-th pixel, the saturation $S_{(p, q)}$ and the brightness $V(S)_{(p, q)}$ in the cylindrical HSV color space can be acquired based on the second signal (signal value $x_{1-(p, q)}$ of the first sub-pixel 49R, the second signal (signal value $x_{2-(p, q)}$ of the second sub-pixel 49G, and the second signal (signal value $x_{3-(p, q)}$) of the third sub-pixel 49B, by using the following Equation (5) and Equation (6).

$$S_{(p,q)} = (Max_{(p,q)} - Min_{(p,q)})/Max_{(p,q)} \quad (5)$$

$$V(S)_{(p,q)} = Max_{(p,q)} \quad (6)$$

Here, $Max_{(p, q)}$ is a maximum value of the second signal values of three sub-pixels 49 of ($x_{1-(p, q)}$, $x_{2-(p, q)}$, and $x_{3-(p, q)}$), and $Min_{(p, q)}$ is a minimum value of the second signal values of three sub-pixels 49 of ($x_{1-(p, q)}$, $x_{2-(p, q)}$, and $x_{3-(p, q)}$).

In the embodiment, no color filter is arranged for the fourth sub-pixel 49W displaying the white color. On the condition that light is emitted with the same light source light amount, the fourth sub-pixel 49W displaying the fourth color is brighter than the first sub-pixel 49R displaying the first color, the second sub-pixel 49G displaying the second color, and the third sub-pixel 49B displaying the third pixel.

Assume that $BN_{1-3}$ denotes the luminance of an aggregate of the first sub-pixel 49R, the second sub-pixel 49G, and the third sub-pixel 49B included in a pixel 48 or a group of pixels 48 at the time when a signal corresponding to the maximum signal value of the third signal of the first sub-pixel 49R is input to the first sub-pixel 49R, a signal corresponding to the maximum signal value of the third pixel signal of the second sub-pixel 49G is input to the second sub-pixel 49G, and a signal corresponding to the maximum signal value of the third signal value of the third sub-pixel 49B is input to the third sub-pixel 49B. In addition, assume that $BN_4$ denotes the luminance of the fourth sub-pixel 49W at the time when a signal corresponding to the maximum signal value of the third signal values of the fourth sub-pixels 49W is input to the fourth sub-pixel 49W included in a pixel 48 or a group of pixels 48. In other words, $BN_{1-3}$ denotes the maximum luminance of white color that is displayed by the aggregate of the first sub-pixel 49R, the second sub-pixel 49G, and the third sub-pixel 49B. Then, when $\chi$ is a constant depending on the display apparatus, the constant $\chi$ is represented as $\chi = BN_4/BN_{1-3}$.

More specifically, the luminance $BN_4$ when the second signal having a maximum display gradation value is assumed to be input to the fourth sub-pixel 49W is, for example, 1.5 times the luminance $BN_{1-3}$ of the white color when a maximum value of the signal value $x_{1-(p, q)}$, a maximum value of the signal value $x_{2-(p, q)}$, and a maximum value of the signal value $x_{3-(p, q)}$ are input to the aggregate of the first sub-pixel 49R, the second sub-pixel 49G, and the third sub-pixel 49B. The signal value $x_{1-(p, q)}$, the signal value $x_{2-(p, q)}$, and the signal value $x_{1-(p, q)}$ serve as the second signals. In other words, in the embodiment, $\chi=1.5$.

When the signal value $X_{4-(p, q)}$ is given according to Equation (4) described above, the maximum value Vmax(S) of the brightness can be represented by the following Equation (7) and Equation (8).

In the case of $S \leq S_0$, $$Vmax(S) = (\chi + 1) \cdot (2^n - 1) \quad (7)$$

In the case of $S_0 < S \leq 1$, $$Vmax(S) = (2^n - 1) \cdot (1/S) \quad (8)$$

where, $S_0 = 1/(\chi + 1)$ is satisfied. In other words, $S_0$ is a threshold for the saturation S. When the saturation S of the second signal value is $S_0$ or less, the brightness of a case where the fourth sub-pixel 49W is maximally lit can be reproduced. On the other hand, in a case where the saturation S of the second signal value is higher than $S_0$, the brightness of a case where the fourth sub-pixel 49W is maximally lit cannot be reproduced.

The maximum value Vmax(S) of the brightness having the saturation S as a variable in the HSV color space extended by adding the fourth color, for example, is stored as a kind of lookup table in the signal processor 20. Alternatively, the maximum value Vmax(S) of the brightness having the saturation S as a variable in the extended HSV color space is acquired by the signal processor 20 as occasion demands.

Next, a method of acquiring signal values $X_{1-(p, q)}$, $X_{2-(p, q)}$, $X_{3-(p, q)}$, and $X_{4-(p, q)}$ that are the third signals of the (p, q)-th pixel 48 (expanding process) will be described. The following process is performed such that a ratio of the luminance of the first primary color displayed by (the first sub-pixel 49R+the fourth sub-pixel 49W), the luminance of the second primary color displayed by (the second sub-pixel 49G+the fourth sub-pixel 49W), and the luminance of the third primary color displayed by (the third sub-pixel 49B+ the fourth sub-pixel 49W) is maintained. In addition, the process is performed such that the hue is maintained. Furthermore, the process is performed such that gradation-luminance characteristics (a gamma characteristic, a γ characteristic) are maintained. In addition, when all the second signal values for a certain pixel 48 or a certain group of pixels 48 are "0" or small, the expansion coefficient α may be acquired without including the certain pixel 48 or the certain group of pixels 48.

First Process

First, based on the second signal values of the sub-pixels 49 of a plurality of pixels 48, the signal processor 20 acquires the saturation S and the brightness V(S) of the plurality of pixels 48. More specifically, based on a signal value $x_{1-(p, q)}$ that is the second signal of the first sub-pixel 49R, a signal value $x_{2-(p, q)}$ that is the second signal of the second sub-pixel 49G, and a signal value $x_{3-(p, q)}$ that is the second signal of the third sub-pixel 49B for the (p, q)-th pixel 48, the signal processor 20 acquires $S_{(p, q)}$ and $V(S)_{(p, q)}$ by using Equation (7) and Equation (8) The signal processor 20 performs this process for all the pixels 48.

Second Process

Thereafter, the signal processor 20, based on Vmax(S)/V(S) of the plurality of pixels 48, acquires the expansion coefficient α(S) by using the following Equation (9).

$$\alpha(S) = V\max(S)/V(S) \qquad (9)$$

Third Process

Next, the signal processor 20 acquires the signal value $X_{4-(p, q)}$ of the (p, q)-th pixel 48 based on at least the signal value $x_{1-(p, q)}$, the signal value $x_{2-(p, q)}$, and the signal value $x_{3-(p, q)}$. In the embodiment, the signal processor 20 determines the signal value $X_{4-(p, q)}$, based on $\text{Min}_{(p, q)}$, the expansion coefficient α, and the constant χ. More specifically, as described above, the signal processor 20 acquires the signal value $X_{4-(p, q)}$ based on Equation (4) described above. The signal processor 20 acquires the signal values $X_{4-(p, q)}$ for all the $P_0 \times Q_0$ pixels 48.

Fourth Process

Thereafter, the signal processor 20 acquires a signal value $X_{1-(p, q)}$ of the (p, q)-th pixel 48 based on the signal value $x_{1-(p, q)}$, the expansion coefficient α, and the signal value $X_{4-(p, q)}$. The signal processor 20 acquires a signal value $X_{2-(p, q)}$ of the (p, q)-th pixel 48 based on the signal value $x_{2-(p, q)}$, the expansion coefficient α, and the signal value $X_{4-(p, q)}$. The signal processor 20 acquires a signal value $X_{3-(p, q)}$ of the (p, q)-th pixel 48 based on the signal value $x_{3-(p, q)}$, the expansion coefficient α, and the signal value $X_{4-(p, q)}$. More specifically, the signal processor 20 acquires the signal value $X_{1-(p, q)}$, the signal value $X_{2-(p, q)}$, and the signal value $X_{3-(p, q)}$ of the (p, q)-th pixel 48 based on Equations (1) to (3) described above.

As represented in Equation (4), the signal processor 20 expands the value of $\text{Min}_{(p, q)}$ by using the expansion coefficient α. Thus, the value of $\text{Min}_{(p, q)}$, is expanded by using the expansion coefficient α, and thereby not only the luminance of a white display sub-pixel (the fourth sub-pixel 49W) is increased, but also the luminances of a red display sub-pixel, a green display sub-pixel, and a blue display sub-pixel (respectively correspond to the first sub-pixel 49R, the second sub-pixel 49G, and the third sub-pixel 49B) are increased, as represented in the equation described above. For this reason, a problem such as occurrence of dullness of colors cannot be avoided. In other words, when the value of $\text{Min}_{(p, q)}$ is expanded by using the expansion coefficient α, the luminance becomes a times the luminance of a case where the value of $\text{Min}_{(p, q)}$ is not expanded. Accordingly, for example, a still image or the like can be displayed with a high luminance, which is preferable.

As illustrated in FIG. 9, the signal processor 20 performs an image analysis of the second signal rgb (Step S13) as well as a display data calculating step (Step S17). The image analysis (Step S13) of the second signal rgb performed by the image analyzer 23 will be described below.

Figure 10:
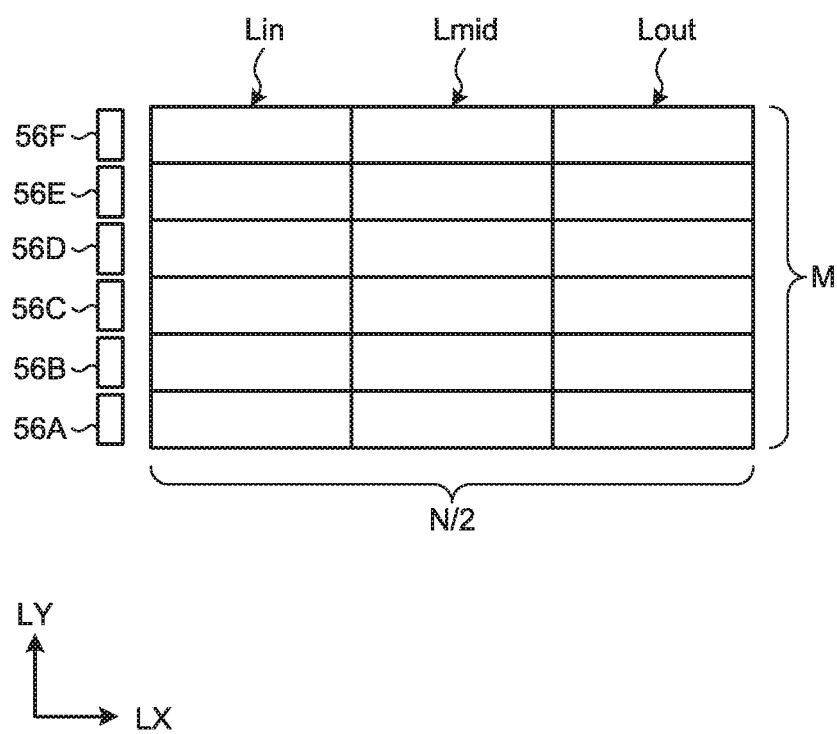
FIG. 10 is a diagram that illustrates an example of luminance determination blocks according to the embodiment.

The image analyzer 23 acquires an expansion coefficient $\alpha_b$ for each luminance determination block (each of blocks acquired by dividing the display area of the image display panel 30 into a plurality of division areas) based on a second signal rgb, and outputs the acquired expansion coefficient to the image processor 22. The luminance determination blocks will be described below. FIG. 10 is a diagram that illustrates an example of the luminance determination blocks according to the embodiment.

In the embodiment, control of the panel luminance is individually performed on the light sources 56A, 56B, 56C, 56D, 56E, and 56F. For this reason, in the embodiment, an expansion coefficient and a reciprocal thereof are calculated for each luminance determination block by the image analyzer 23 based on the second signal values of pixels 48 in the corresponding luminance determination block. Hereinafter, the expansion coefficient for each luminance determination block will be denoted by $\alpha_b$, and the reciprocal thereof will be denoted by $(1/\alpha_b)$.

In the embodiment, a plurality of columns each including of a light incident part Lin, a middle part Lmid, and an outer part Lout aligned in the light incident direction LX are arranged in the light source arrangement direction LY, as illustrated in FIG. 10. The light incident part Lin, the middle part Lmid, and the outer part Lout are luminance determination blocks (also referred simply to as blocks) acquired by virtually dividing the first display surface 31 (see FIG. 3) of the image display panel 30 into a plurality of parts in a matrix pattern in the light source arrangement direction LY and the light incident direction LX (row-column configuration). As the luminance determination blocks according to the embodiment, six rows of luminance determination blocks are arranged in the light source arrangement direction LY, and three columns of luminance determination blocks are arranged in the light incident direction LX. The number of the rows of the luminance determination blocks in the light source arrangement direction LY corresponds to the number of the light sources 56A, 56B, 56C, 56D, 56E, and 56F, each of the rows of the luminance determination blocks being made up of the light incident part Lin, the middle part Lmid, and the outer part Lout as illustrated in FIG. 10. In the luminance determination blocks illustrated in FIG. 10, the number of the luminance determination blocks in the light incident direction LX is three corresponding to the light incident part Lin, the middle part Lmid, and the outer part Lout. The outer part Lout, the middle part Lmid, and the light incident part Lin are closer to the center line LXc indicating the center of the whole display surface in the light incident direction LX in this order. In the embodiment, three blocks (the light incident part Lin, the middle part Lmid, and the outer part Lout) having the same position in the light source arrangement direction LY are handled as one group. Accordingly, a plurality of groups are aligned in the light source arrangement direction LY. Each of the groups is sequentially set as a group of interest, and a process to be described later is performed on each group.

The image analyzer 23 calculates the expansion coefficient $\alpha_b$ to be applied to the pixels 48 in each luminance determination block and calculates a $(1/\alpha_b)$ value of each luminance determination block, based on the second signal values of the pixels 48 included in the corresponding luminance determination block.

The expansion coefficient $\alpha_b$ to be applied to the pixels 48 in each luminance determination block can be calculated using the following Equation (9)' that is acquired by modifying Equation (9). In Equation (9)', $V\max_b$ represents a maximum value of the brightness in each luminance determination block, and $V_b$ represents the brightness of a plurality of pixels 48 in each luminance determination block.

$$\alpha_b = V\max_b / V_b \qquad (9)'$$

Figure 11:
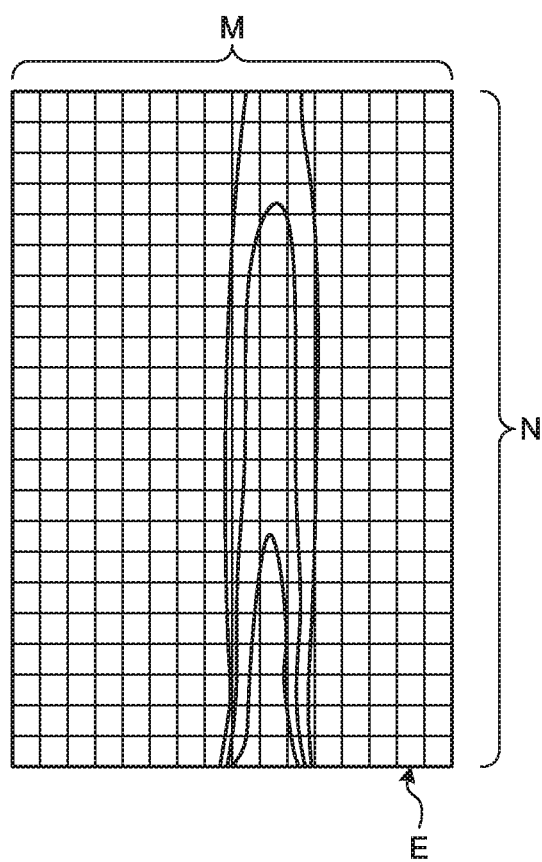
FIG. 11 is a schematic diagram that illustrates information on a light intensity distribution of incident light emitted from a certain light source and traveling from the light guiding plate to a flat surface of the image display panel.
Figure 12:
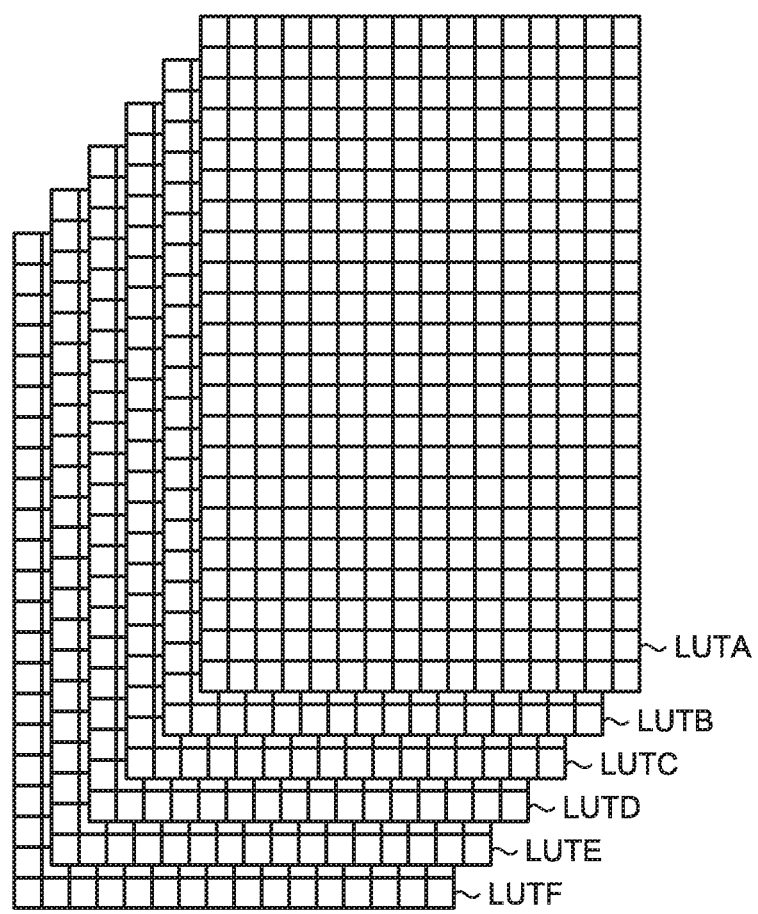
FIG. 12 is a schematic diagram that illustrates a lookup table.

The following describes the lookup table used for the process described later. FIG. 11 is a schematic diagram that illustrates information on a light intensity distribution of incident light emitted from a certain light source and traveling from the light guiding plate to a flat surface of the image display panel. FIG. 12 is a schematic diagram that illustrates the lookup table. In the embodiment, the light source data storage 25 stores a plurality of lookup tables (LUTs). Each of the lookup tables is array data consisting of M×N array elements and stores a representative value of the light intensity in each array element. M represents the number of array elements in the light source arrangement direction LY (the number of rows), and N represents the number of array elements in the light incident direction LX (the number of columns). While the M×N array elements correspond to the pixels 48, for example, the number of the array elements may be reduced by dropping some array elements at equal intervals from the array elements corresponding to all the pixels 48 and storing the remaining array elements. Alternatively, a representative value of the light intensity of each division area obtained by virtually dividing the flat surface of the image display panel 30 into M×N areas may be stored in each lookup table. In this case, the representative value may be an average value of the light intensity of the division area, a median value of the light intensity of the division area, or a value of light intensity at a certain position in the division area. In this example, the data of the lookup table is a representative value for each division area, but the data is not limited thereto.

In the embodiment, a representative value of the light intensity of each division area obtained by virtually dividing the flat surface of the image display panel 30 illustrated in FIG. 3 into M×N areas is stored in each lookup table. The light source data storage 25 stores the lookup tables of the respective light sources. For example, as illustrated in FIG. 12, the light source data storage 25 stores a lookup table LUTA. The lookup table LUTA indicates the information on the light intensity distribution of incident light obtained when only the light source 56A illustrated in FIG. 3 is turned on with a predetermined light source light amount (refer to FIG. 4), the incident light being incident from the light source 56A on the light guide plate 54 and traveling from the light guide plate 54 to the flat surface of the image display panel 30. The light source data storage 25 also stores therein a lookup table LUTB. The lookup table LUTB indicates the information on the light intensity distribution of incident light obtained when only the light source 56B illustrated in FIG. 3 is turned on with the predetermined light source light amount, the incident light being incident from the light source 56B on the light guide plate 54 and traveling from the light guide plate 54 to the flat surface of the image display panel 30. The light source data storage 25 also stores therein a lookup table LUTC. The lookup table LUTC indicates the information on the light intensity distribution of incident light obtained when only the light source 56C illustrated in FIG. 3 is turned on with the predetermined light source light amount, the incident light being incident from the light source 56C on the light guide plate 54 and traveling from the light guide plate 54 to the flat surface of the image display panel 30. The light source data storage 25 also stores therein a lookup table LUTD. The lookup table LUTD indicates the information on the light intensity distribution of incident light obtained when only the light source 56D illustrated in FIG. 3 is turned on with the predetermined light source light amount, the incident light being incident from the light source 56D on the light guide plate 54 and traveling from the light guide plate 54 to the flat surface of the image display panel 30. The light source data storage 25 also stores therein a lookup table LUTE. The lookup table LUTE indicates the information on the light intensity distribution of incident light obtained when only the light source 56E illustrated in FIG. 3 is turned on with the predetermined light source light amount, the incident light being incident from the light source 56E on the light guide plate 54 and traveling from the light guide plate 54 to the flat surface of the image display panel 30. The light source data storage 25 also stores therein a lookup table LUTF. The lookup table LUTF indicates the information on the light intensity distribution of incident light obtained when only the light source 56F illustrated in FIG. 3 is turned on with the predetermined light source light amount, the incident light being incident from the light source 56F on the light guide plate 54 and traveling from the light guide plate 54 to the flat surface of the image display panel 30.

The lookup tables LUTA, LUTB, LUTC, LUTD, LUTE, and LUTF according to the embodiment respectively correspond to the light sources 56A, 56B, 56C, 56D, 56E, and 56F. The light source data storage 25 according to the embodiment may store a lookup table of a case where a pair of the light sources 56A and 56B is simultaneously turned on, a lookup table of a case where a pair of the light sources 56C and 56D is simultaneously turned on, and a lookup table of a case where a pair of the light sources 56E and 56F is simultaneously turned on. In this way, the work load necessary to create lookup tables can be reduced, and the storage capacity of the light source data storage 25 can be decreased. As a result, the size of an integrated circuit in which the light source data storage 25 is included can be decreased.

The light source drive value calculator 24 refers to the lookup tables LUTA, LUTB, LUTC, LUTD, LUTE, and LUTF in the light source data storage 25 and calculates the light source light amounts of the light sources 56A, 56B, 56C, 56D, 56E, and 56F (Step S14) by superimposing the lookup tables LUTA, LUTB, LUTC, LUTD, LUTE, and LUTF such that each light source light amount becomes close to $(1/\alpha_b)$ times the value of each block. For example, representative luminance obtained by superimposing values of the (i, j)-th array elements (here, $1 \le i \le N$ and $1 \le j \le M$) in the lookup tables LUTA, LUTB, LUTC, LUTD, LUTE, and LUTF can be calculated using the following Equation (10).

$$L_{(i,j)} = \sum_{k=0}^{n} \{(Ic/\alpha_{k(i,j)}) \times LUTm(P, Q)\} \qquad (10)$$

$LUTm(P, Q)$: Look up table data of each light source $Ic/\alpha_k$: Each light source current $m$: A to F Accordingly, the light source drive value calculator 24 can decrease the calculation amount by substituting a complicated calculation process with a simple process of referring to the lookup tables LUTA, LUTB, LUTC, LUTD, LUTE, and LUTF.

As described above, in order to cause the image display panel 30 to display an image, the image display panel driver 40 requires a luminance distribution in units of pixels 48. Thus, the light source drive value determiner 26 calculates a luminance distribution in units of pixels 48 based on the light source light amounts of the light sources 56A, 56B, 56C, 56D, 56E, and 56F acquired in Step S14 and the lookup tables LUTA, LUTB, LUTC, LUTD, LUTE, and LUTF (Step S15). In the calculation process of the luminance distribution in units of pixels 48, information on luminance in units of pixels 48 is calculated by performing an interpolation calculation. Accordingly, while the information in units of pixels 48 has a very large information amount, the lookup tables LUTA, LUTB, LUTC, LUTD, LUTE, and LUTF in the embodiment are created by using the representative values the number of which is less than that of all the pixels, the calculation load can be decreased.

Figure 13:
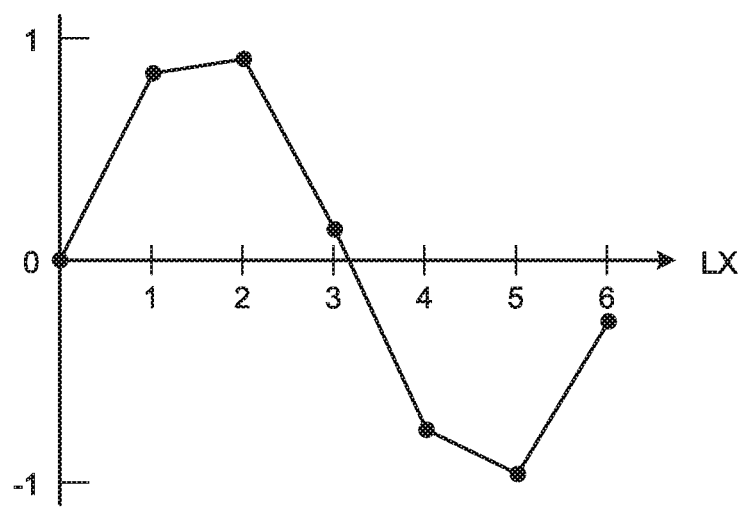
FIG. 13 is an explanatory diagram that illustrates calculation of linear interpolation.
Figure 14:
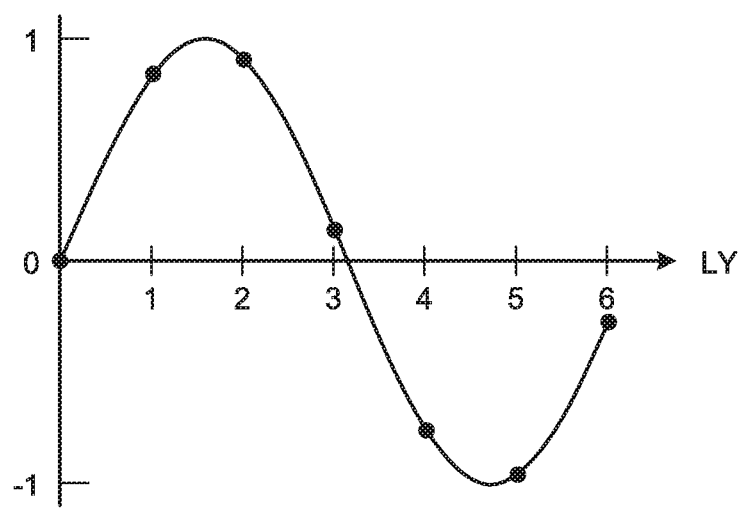
FIG. 14 is an explanatory diagram that illustrates calculation of polynomial interpolation.

The luminance information of each pixel 48 has a sharp change in the light source arrangement direction LY and has a gentle change in the light incident direction LX. FIG. 13 is an explanatory diagram that illustrates calculation of linear interpolation. FIG. 14 is an explanatory diagram that illustrates calculation of polynomial interpolation. The luminance information of each of the pixels 48 in the light incident direction LX is obtained by performing the linear interpolation illustrated in FIG. 13. The luminance information of each of the pixels 48 in the light source arrangement direction LY is obtained by performing the polynomial interpolation illustrated in FIG. 14. The polynomial interpolation, for example, is cubic interpolation. Accordingly, the lookup tables LUTA, LUTB, LUTC, LUTD, LUTE, and LUTF may store values of light intensity at least at peak positions of light from the respective light sources and at positions between adjacent light sources in the light source arrangement direction LY.

Figure 15:
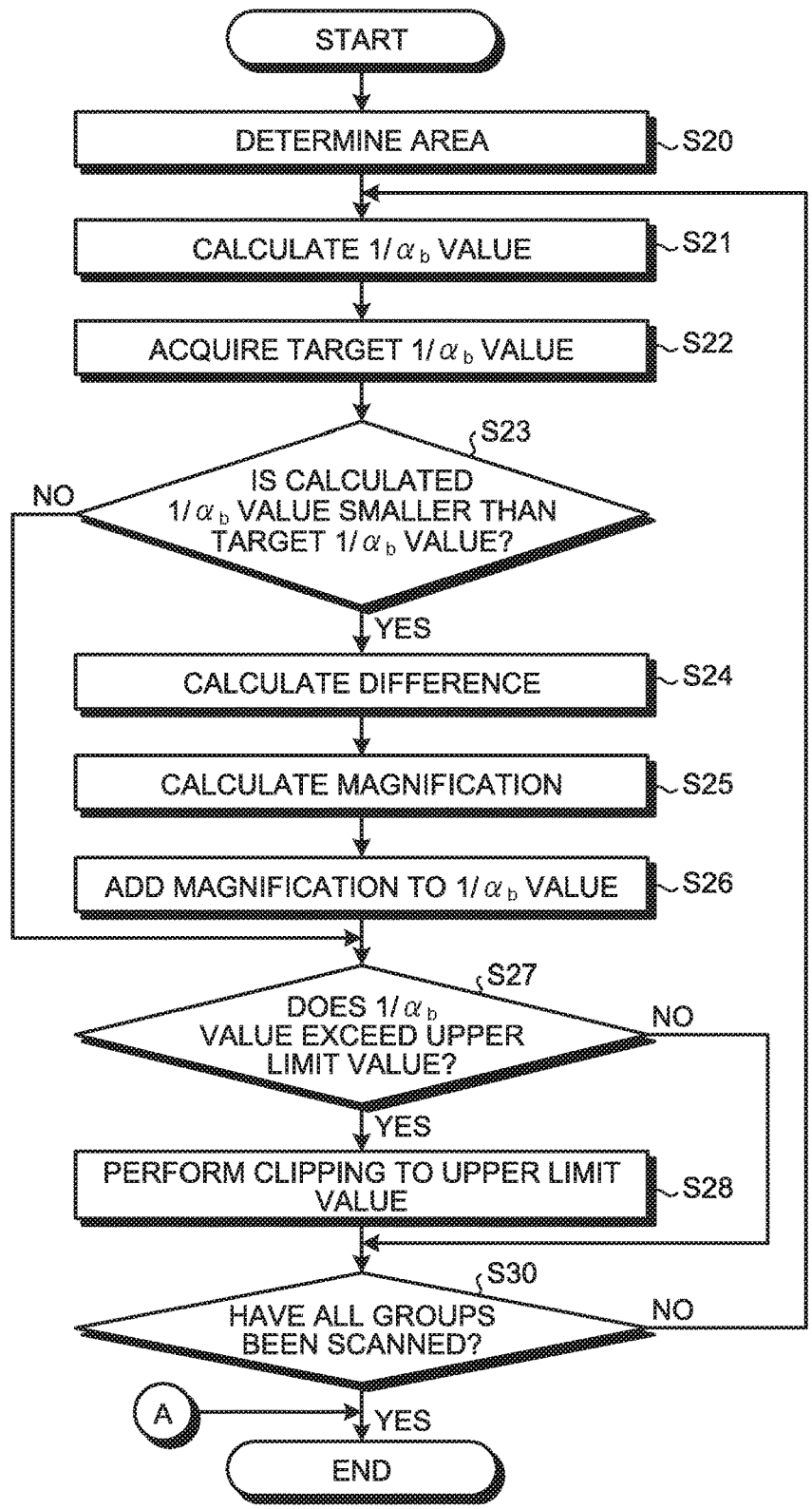
FIG. 15 is a detailed flowchart of an image analyzing and light source drive value calculating step according to the embodiment.
Figure 16:
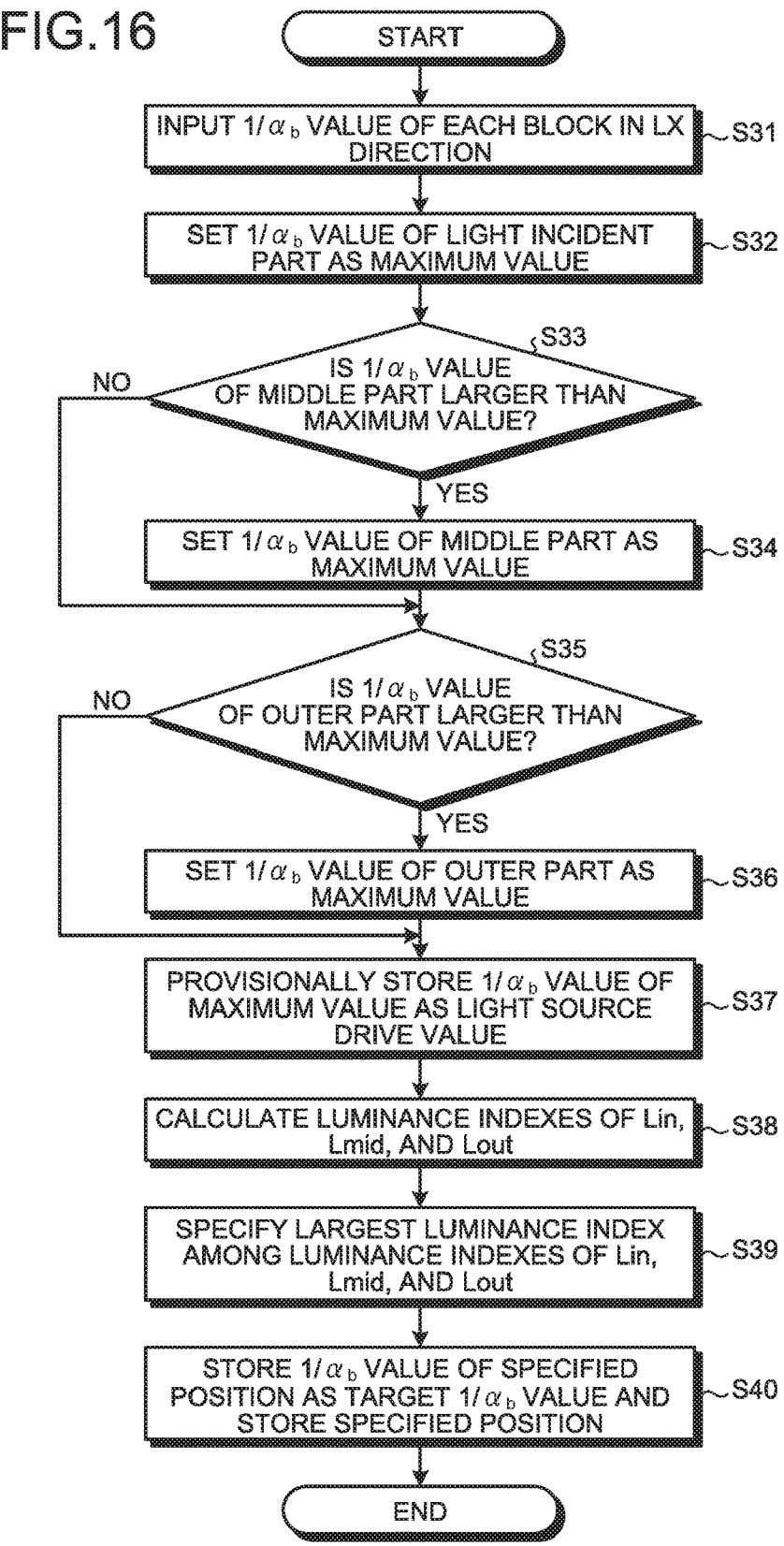
FIG. 16 is a flowchart that illustrates a step for determining a drive value of each light source according to the embodiment.
Figure 17:
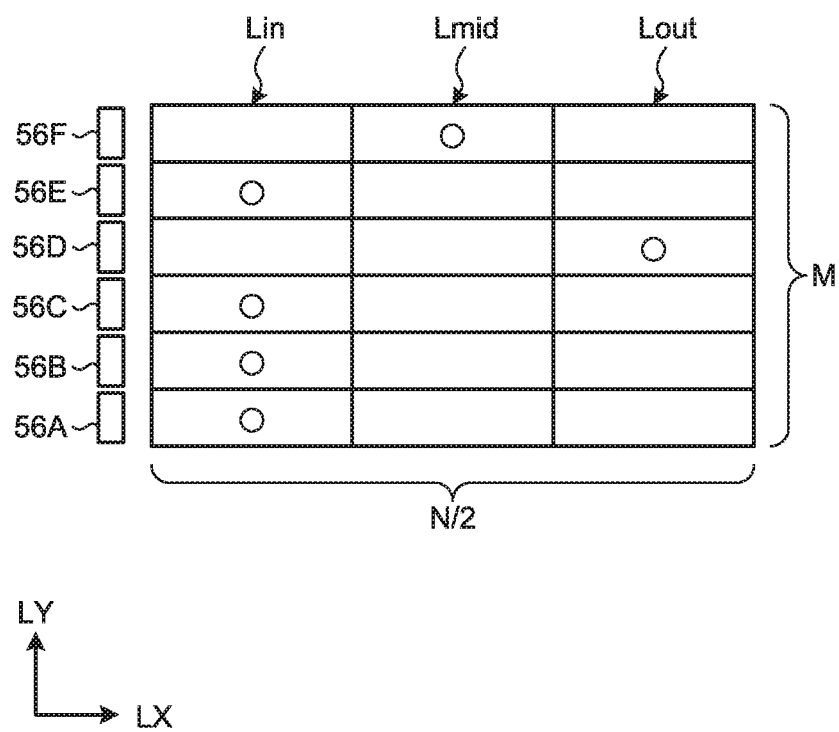
FIG. 17 is an explanatory diagram that illustrates an identified (flagged) luminance determination block according to the embodiment.

FIG. 15 is a detailed flowchart of an image analyzing and light source drive value calculating step according to the embodiment. FIG. 16 is a flowchart that illustrates a step for determining a drive value of each light source according to the embodiment. FIG. 17 is an explanatory diagram that illustrates an identified (flagged) luminance determination block according to the embodiment. The following describes the image analyzing and light source drive value calculating step with reference to FIGS. 15 to 17.

The image analyzer 23 calculates $(1/\alpha_b)$ values of the luminance determination blocks based on the corresponding second signal values in the luminance determination blocks as described above. After setting one group as a group of interest, the light source drive value calculator 24 receives (acquires) the above-described $(1/\alpha_b)$ value of each block (each of blocks aligned in the light incident direction LX) of the group of interest (Step S31) as illustrated in FIG. 16, and sets the $(1/\alpha_b)$ value of the light incident part Lin as a maximum value (Step S32). Next, when the $(1/\alpha_b)$ value of the middle part Lmid in the group of interest is larger than the maximum value (Step S33, Yes), the $(1/\alpha_b)$ value of the middle part Lmid is set as the maximum value (Step S34). The middle part Lmid in the group of interest is located at the same position in the light source arrangement direction LY as that of the light incident part Lin having its value set as the maximum value at Step S32. On the other hand, when the $(1/\alpha_b)$ value of the middle part Lmid in the group of interest is equal to or less than the maximum value (Step S33, No), the $(1/\alpha_b)$ value of the light incident part Lin is maintained as the maximum value, and the process proceeds to Step S35.

Next, when the $(1/\alpha_b)$ value of the outer part Lout in the group of interest is larger than the maximum value (Step S35, Yes), the $(1/\alpha_b)$ value of the outer part Lout is set as the maximum value (Step S36). The outer part Lout in the group of interest is located at the same position in the light source arrangement direction LY as that of the light incident part Lin having its value set as the maximum value at Step S32. When the $(1/\alpha_b)$ value of the outer part Lout in the group of interest is equal to or less than the maximum value (Step S35, No), the process proceeds to Step S37 without changing the maximum value.

The light source drive value calculator 24 provisionally sets and stores the $(1/\alpha_b)$ value, which has been determined to be the maximum value, as a light source drive value (Step S37). As described above, the $(1/\alpha_b)$ values of the luminance determination blocks calculated based on the second signal values of the corresponding luminance determination blocks are compared with each other, and the maximum value of the group of interest is specified. However, the present disclosure is not limited thereto. For example, the light source drive value calculator 24 may multiply $1/\alpha_b$ values of the luminance determination blocks calculated based on the second signal values of the luminance determination blocks by the light intensity values at the positions corresponding to the respective luminance determination blocks stored in the lookup table. The light source drive value calculator 24 then may compare the values obtained by the multiplication to specify the maximum value of each group.

Assume that the light source drive value is represented as $(1/\alpha_{i-max})$. In this case, the light source drive value calculator 24 calculates luminance indexes of the light incident part Lin, the middle part Lmid, and the outer part Lout included in the group of interest by using the following Equations (11) to (13) (Step S38). In the following Equations (11), (12), and (13), $LUTm(P_{Lin}, Q_{Lin})$ represents data of the $P_{Lin}$-th row and the $Q_{Lin}$-th column in the lookup table m. The data of the $P_{Lin}$-th row and the $Q_{Lin}$-th column may be data of each pixel, data of each luminance determination block, or data of each division area acquired by virtually dividing the image display panel $$\text{Luminance index of } Lin = \quad (11)$$

$$(1/\alpha_{Lin})/\sum \{(1/\alpha_{i-max}) \times LUTm(P_{Lin}, Q_{Lin})\}$$

$(1/\alpha_{Lin})$: $(1/\alpha)$ value of block of $Lin$ $(1/\alpha_{i-max})$: Light source drive value $LUTm(P_{Lin}, Q_{Lin})$: Lookup table data of each light source $m$: A to F $$\text{Luminance index of } Lmid = \quad (12)$$

$$(1/\alpha_{Lmid})/\sum \{(1/\alpha_{i-max}) \times LUTm(P_{Lmid}, Q_{Lmid})\}$$

$(1/\alpha_{Lmid})$: $(1/\alpha)$ value of block of $Lmid$ $(1/\alpha_{i-max})$: Light source drive value -continued LUTm($P_{Lmid}$, $Q_{Lmid}$): Lookup table data of each light source m: A to F Luminance index of Lout = (13)

$$(1/\alpha_{Lout})/\sum \{(1/\alpha_{i-max}) \times LUTm(P_{Lout}, Q_{Lout})\}$$

($1/\alpha_{Lout}$): ($1/\alpha$)value of block of Lout ($1/\alpha_{i-max}$): Light source drive value LUTm($P_{Lout}$, $Q_{Lout}$): Lookup table data of each light source m: A to F The light source drive value calculator 24 specifies the largest luminance index among luminance indexes of the light incident part Lin, the middle part Lmid, and the outer part Lout acquired in Step S38 (Step S39).

Next, the light source drive value calculator 24 stores ($1/\alpha_b$) corresponding to the luminance index specified in Step S39 as a target ($1/\alpha_b$) value, and stores information on the position of a specified block (Step S40) The specified block corresponds to the specified luminance index and is one block among the light incident part Lin, the middle part Lmid, and the outer part Lout within the group of interest. The specified block is handled as a luminance determination block that is a target for a luminance correction, and ($1/\alpha_b$) of the specified luminance determination block is determined to be a target ($1/\alpha_b$) value for the group to which the luminance determination block belongs. Hereinafter, "a block that is a target for a luminance correction" may be simply referred to as "a luminance correction target block".

The example illustrated in FIG. 17 indicates that luminance determination blocks each identified using a flag of a circle have the maximum value.

After determining the target ($1/\alpha_b$) value, as illustrated in FIG. 15, the image analyzer 23 performs an area determination of the luminance determination block (Step S20). Then, a group of interest is set, and the light source drive value calculator 24 calculates the ($1/\alpha_b$) value of the luminance correction target block in the set group of interest (Step S21). The ($1/\alpha_b$) value calculated here is a value corresponding to the luminance of the luminance correction target bock when assuming that the light sources are turned on with the respective light source drive values that are provisionally set as described above (or corrected by a process to be described later), and is different from the light source drive value of each luminance correction target block (each light source). This ($1/\alpha_b$) value can be calculated using the light intensity values in the lookup tables corresponding to the light sources 56A, 56B, 56C, 56D, 56E, and 56F. For example, the ($1/\alpha_b$) value of the luminance correction target block is calculated using the following Equation (14).

$$1/\alpha_G = \sum_{k=0}^{n} \{(1/\alpha_k) \times LUTm(P, Q)\}$$ (14)

LUTm(P, Q): Lookup table data of each light source

-continued $1/\alpha_k$: Light source drive value of luminance correction target block m: A to F In Equation (14) described above, ($1/\alpha_G$) represents the result of the calculation of the ($1/\alpha_b$) value of the luminance correction target block in Step S21. LUTm(P, Q) represents data (light intensity value) of the P-th row and the Q-th column in the lookup table m; ($1/\alpha_k$) is the light source drive value ($1/\alpha_b$) of the luminance correction target block of each group. In this example, each group corresponds to one of the light sources 56A, 56B, 56C, 56D, 56E, and 56F, and lookup tables LUTA to LUTF respectively correspond to the light sources 56A to 56F. Accordingly, in Equation (14) described above, first, a light source drive value of the luminance correction target block of each group is multiplied by the data of the position (P, Q) of the luminance correction target block in the lookup table corresponding to the group (light source). Then, by calculating a sum of values acquired through the multiplication, a ($1/\alpha_b$) value (the ($1/\alpha_G$) value in Equation (14) described above) with the influences of light from all the light sources taken into consideration can be calculated. The latest ($1/\alpha_b$) value of the luminance correction target block of each group is used as ($1/\alpha_k$). In other words, after luminance correction (correction of the ($1/\alpha_b$) value) of the luminance correction target block of the group of interest is performed through a process to be described later, the ($1/\alpha_b$) value resulting from the luminance correction is used as the ($1/\alpha_k$) value of the luminance correction target block of the group of interest to perform the calculation process of Step S21 on a luminance correction target block of another group. The luminance correction target block of the other group is a block subjected to the luminance correction after the luminance correction of the group of interest.

Next, as illustrated in FIG. 15, the light source drive value calculator 24 acquires a target ($1/\alpha_b$) value of the group of interest (Step S22) and performs a luminance correcting process (a process of correcting a light source drive value) described below.

FIGS. 18 to 22 schematically illustrate the light source light amounts in the lighting direction LZ of the light incident part Lin, the middle part Lmid, and the outer part Lout arranged at the same position in the light source arrangement direction LY. Assume that the ($1/\alpha_b$) value and the luminance index of the light incident part Lin of the light incident part Lin, the middle part Lmid, and the outer part Lout arranged at the same position in the light source arrangement direction LY are maximum values. In this case, a curve Ua illustrated in FIG. 18 is similar to a curve Ub illustrated in FIG. 19. The curve Ua represents the light source light amount of an ideal light source, and the curve Ub represents the light source light amount of an actual light source. The reason for this is that light emitted from a light source has a characteristic that the light source light amount decreases as the light travels further away from the first incident surface E1.

Figure 20:
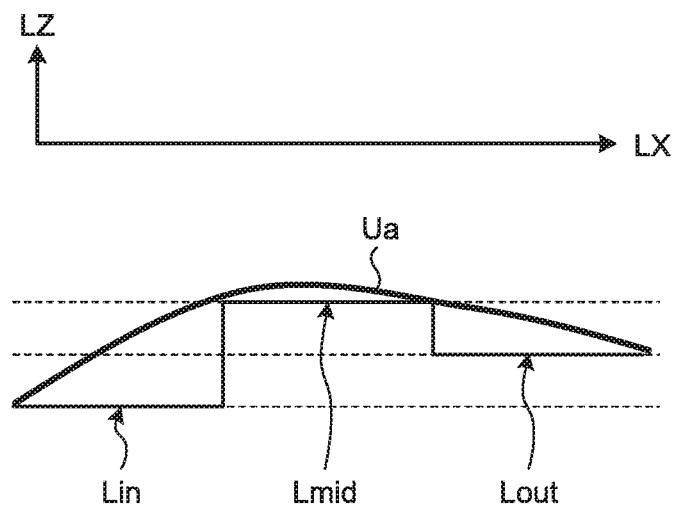
FIG. 20 is an explanatory diagram that illustrates a case where the luminance is highest at a middle part of a luminance determination block according to the embodiment.
Figure 21:
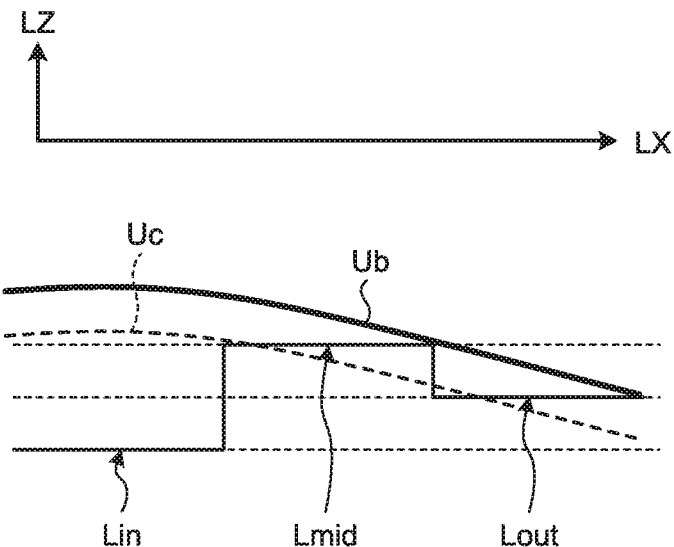
FIG. 21 is an explanatory diagram that illustrates the actual luminance of the luminance determination block illustrated in FIG. 20.

For this reason, as illustrated in FIG. 20, when the ($1/\alpha_b$) value of the middle part Lmid out of the light incident part Lin, the middle part Lmid, and the outer part Lout arranged at the same position in the light source arrangement direction LY is a maximum value, luminance indicated by the curve Ua, which represents the light source light amount of the ideal light source, is hard to be ensured by using a single light source. To address this, it is necessary to increase the luminance in the light incident part Lin, which originally need not be increased, thereby making $1/\alpha_b$ value of the light incident part Lin the largest as indicated by the curve $U_b$ representing the light source light amount of the actual light source illustrated in FIG. 21. Accordingly, in this case, the luminance index of the middle part Lmid has a maximum value.

When the luminance index is calculated by using the intensity value of light at a position closest to the light source out of positions in the middle part Lmid, there is a possibility that the $(1/\alpha_b)$ values of the middle part Lmid and the outer part Lout are deficient as indicated by a curve Uc representing the light source light amount. Accordingly, it is necessary to calculate the luminance index by using the intensity value of light at a position farthest from the light source in each block.

Figure 22:
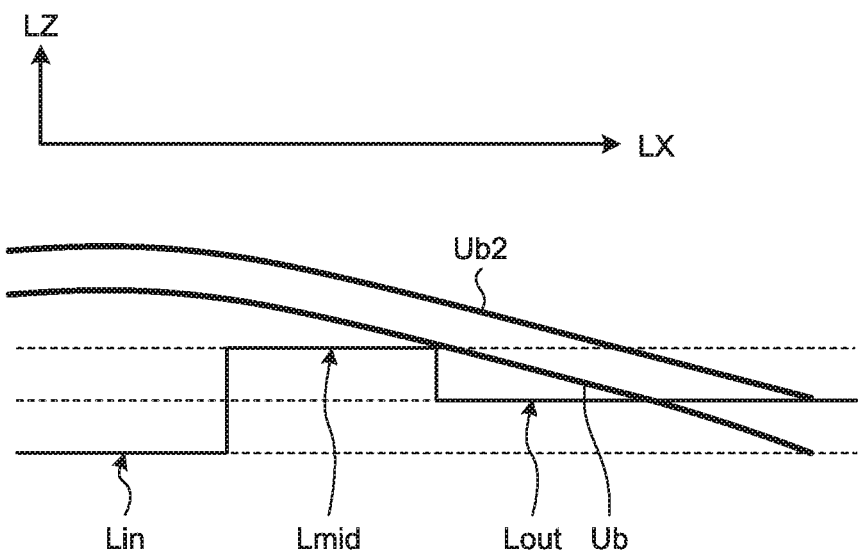
FIG. 22 is an explanatory diagram that illustrates the actual luminance of the luminance determination block illustrated in FIG. 20.

Furthermore, as illustrated in FIG. 22, when $1/\alpha_b$ of the middle part Lmid is the largest, the characteristics of light become similar to the curve Ub, and there are cases where a luminance required for the outer part Lout is not supplied even though the light source light amount is set to be a luminance such that the middle part Lmid has required luminance. In such cases, it is necessary to control the light source light amount such that the characteristics of light become similar to the characteristics represented by a curve Ub2, and the luminance index is used to determine whether the light source light amount is set in this manner. In this case, the luminance index of the outer part Lout is maximal.

Figure 23:
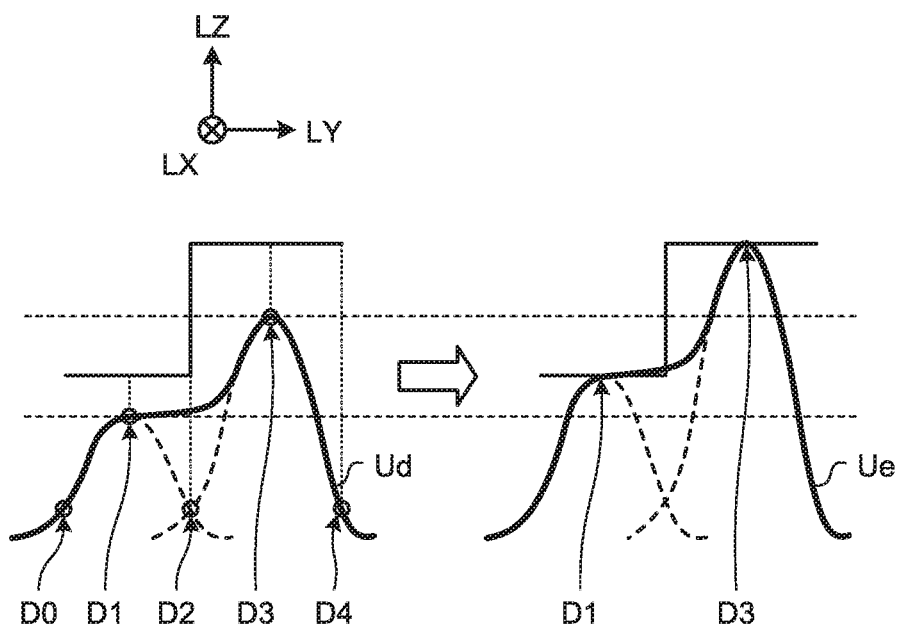
FIG. 23 is a conceptual diagram that illustrates an increase in a light source light amount compensating for a luminance deficiency according to the embodiment.

In addition, the first side light source 52A according to the embodiment can perform individual drive control of the light sources 56A, 56B, 56C, 56D, 56E, and 56F. With this control, a curve Ud representing the light source light amount of the light source is corrected to a curve Ue as illustrated in FIG. 23. As illustrated in FIG. 23, at least data positions and luminance of peaks and valleys (D0 to D4) in the luminance are maintained in the light source arrangement direction LY, and at least one or more pieces of data of the light incident part Lin, the middle part Lmid, and the outer part Lout are maintained in the light incident direction LX. Then, when the curve Ud illustrated in FIG. 23 is corrected to the curve Ue, the luminance levels of the peaks D1 and D3 among the peaks and the valleys (D0 to D4) in luminance are changed.

When a $(1/\alpha_b)$ value, which is calculated in Step S21 described above, of the luminance correction target block included in the group of interest is smaller than the above-described target $(1/\alpha_b)$ of the group of interest (Step S23, Yes), a difference between the calculated $(1/\alpha_b)$ value and the target $(1/\alpha_b)$ is calculated (Step S24). Next, the light source drive value calculator 24 calculates the magnification of the difference (Step S25). The light source drive value calculator 24 calculates how many times larger the difference is than the value in the lookup table at that position. More specifically, the light source drive value calculator 24 reads data corresponding to the position of the block that is the target for the luminance correction from the lookup table of the light source corresponding to the position of the block that is a target for the luminance correction in the light source arrangement direction LY. The read data will be referred to as Percentage for the convenience of description. Then, the difference Sub between the $(1/\alpha_b)$ value calculated above and the target $(1/\alpha_b)$ is divided by the Percentage, and the value resulting from the division is the magnification. In the embodiment, a light intensity distribution of a case where the light source is turned on with a maximum output (output of 100%) is stored in each of the lookup tables LUTA to LUTF. Accordingly, by dividing the difference by the light intensity value of the lookup table, the ratio (magnification) of the difference to the light intensity value of 100% is acquired.

Next, the magnification of the difference calculated above is added to the $(1/\alpha_b)$ value that is calculated based on the second signal and is provisionally set in Step S37 described above (Step S26). In other words, when the $(1/\alpha_b)$ value calculated in Step S21 is smaller than the target $(1/\alpha_b)$ value of the block, the light source drive value calculator 24 adds the magnification of the difference to the provisionally-set $(1/\alpha_b)$ value described above (Step S26), thereby compensating the luminance of a block that is deficient in luminance. Next, the process proceeds to Step S27.

On the other hand, when the $(1/\alpha_b)$ value calculated in Step S21 is equal to or larger than the above-described target $(1/\alpha_b)$ value of the group of interest (Step S23, No), Steps S24 to S26 are skipped, and the process proceeds to Step S27. Next, when the $(1/\alpha_b)$ value of the luminance correction target block exceeds an upper limit value (Step S27, Yes), clipping in which the $(1/\alpha_b)$ value is changed to the upper limit value is performed (Step S28). When positive determination ("Yes") is made in Step S23, the $(1/\alpha_b)$ value of the luminance correction target block compared with the upper limit value in Step S27 is the light source drive value $(1/\alpha_b)$ resulting from the correction performed in Step S26. By contrast, when negative determination ("No") is made in Step S23, the $(1/\alpha_b)$ value of the luminance correction target block compared with the upper limit value in Step S27 is the light source drive value $(1/\alpha_b)$ that is provisionally set. The upper limit value is set in advance as an upper limit value of the light source drive value used in the light source control. Then, after Step S28, the process proceeds to Step S30. On the other hand, when the $(1/\alpha_b)$ value of the luminance correction target block does not exceed the upper limit value (Step S27, No), Step S28 is skipped, and the process proceeds to Step S30. When scanning of all the group ends (Step S30, Yes), the process illustrated in FIG. 15 ends. On the other hand, when scanning of all the groups has not ended (Step S30, No), a next group is set as a group of interest, and the process is returned to Step S21. According to the process described above, the light source drive value $(1/\alpha_b)$ for each block that is provisionally set in Step S37 is corrected. However, when negative determination ("No") is made in Steps S23 and S27, it may not be possible for the light source drive value that is provisionally set to be corrected. In such a case, the light source drive value that is provisionally set is used for the control of the light source light amount of the light source without any change. The light source light amount is calculated based on the $(1/\alpha_b)$ value for each block acquired in this way. $(1/\alpha_b)$ of each luminance correction target block calculated in this way is used as the light source drive value $(1/\alpha_k)$ of each light source. Then, the light source drive value $(1/\alpha_k)$ of each of the light sources 56A, 56B, 56C, 56D, 56E, and 56F can be calculated. Based on the light source drive value $(1/\alpha_k)$ and the lookup table, the representative luminance is calculated by using Equation (10) described above.

Similarly, the representative luminance for each of the light sources 57A, 57B, 57C, 57D, 57E, and 57F of the second side light source 52B can be calculated. In this way, the $(1/\alpha_b)$ value that is provisionally set is corrected such that the $(1/\alpha_b)$ value of each luminance correction target block is equal to the corresponding target $(1/\alpha_b)$ value. The light source light amount of each light source is controlled based on the corrected $(1/\alpha_b)$ value. In other words, according to this, the light source light amount of each light source is controlled such that the luminance of each luminance correction target block satisfies the target luminance.

The calculation process of the light source drive value described above can be applied also to a display apparatus in which a side light source is arranged only at a position facing an incident surface (for example, E1) on one side surface of the light guiding plate 54 as illustrated in FIG. 17. The calculation process can be applied also to a display apparatus in which side light sources (a first side light source 52A and a second side light source 52B) are respectively arranged at positions facing incident surfaces (for example, E1 and E2) on both side surfaces of the light guiding plate 54 as illustrated in FIG. 3. In such a case, the calculation process can be applied to a case where an image is displayed by turning on only one of the first side light source 52A and the second side light source 52B. In addition, the calculation process can be applied also to a case where an image is displayed by turning on both the first side light source 52A and the second side light source 52B. However, the first display surface 31 is influenced not only by light emitted from the first side light source 52A but also by light emitted from the second side light source 52B, and the second display surface 32 is influenced by not only light emitted from the second side light source 52B but also light emitted from the first side light source 52A. Accordingly, it is preferable that the light source drive values ($1/\alpha_b$) are calculated in consideration of the mutual influence of the two side light sources instead of calculating the light source drive values ($1/\alpha_b$) of the two side light sources independently from each other.

The embodiment described below is an example in which the light source drive value ($1/\alpha_b$) of each light source is calculated more accurately in consideration of light mutually contributed by the light sources of the first side light source 52A and the light sources of the second side light source 52B.

Figure 24:
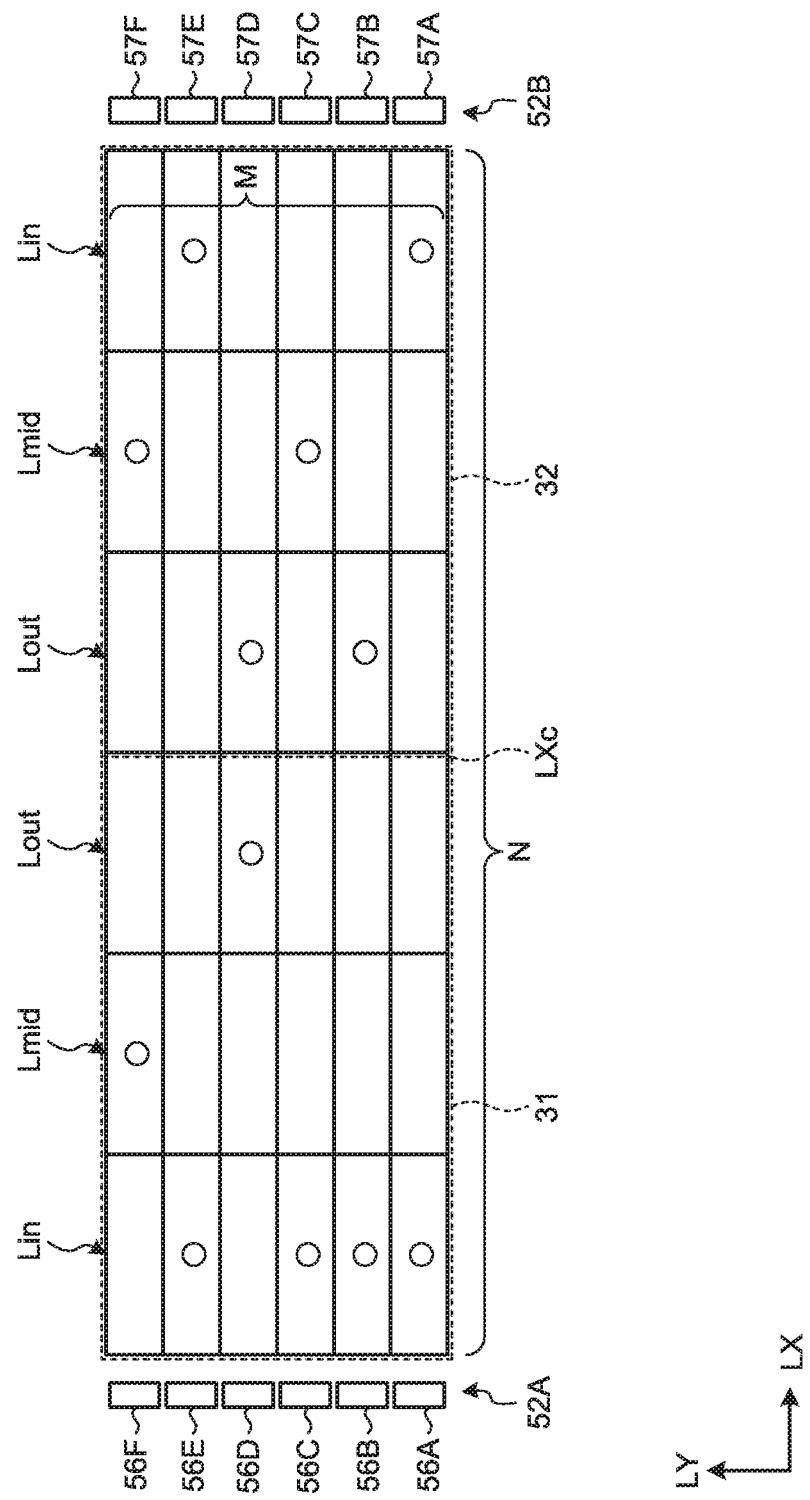
FIG. 24 is an explanatory diagram that illustrates identified (flagged) luminance determination blocks according to the embodiment.

FIG. 24 is an explanatory diagram that illustrates identified (flagged) luminance determination blocks according to the embodiment. The following describes arrangement of blocks in a case where the light sources of the first sidelight light source 52A and the light sources of the second sidelight light source 52B are used. The second display surface 32 of the image display panel 30 also has light incident parts Lin, middle parts Lmid, and outer parts Lout obtained by virtually dividing the second display surface 32 into a plurality of parts in a matrix pattern (row-column configuration) in the light source arrangement direction LY and the light incident direction LX. On the second display surface 32 of the image display panel 30, the outer part Lout parts, the middle part Lmid, and the light incident part Lin are closer to the center line LXc indicating the center of the whole display surface in the light incident direction LX in this order. Accordingly, three blocks (the light incident part Lin, the middle part Lmid, and the outer part Lout) having the same position in the light source arrangement direction LY have line symmetry with respect to the center line LXc indicating the center of the whole display surface in the light incident direction LX. In the second display surface 32 illustrated in FIG. 24, the number of columns of the luminance determination blocks in the light source arrangement direction LY corresponds to the number of the light sources 57A, 57B, 57C, 57D, 57E, and 57F, each of the columns of the luminance determination blocks being made up of the light incident part Lin, the middle part Lmid, and the outer part Lout.

On the second display surface 32, three blocks (the light incident part Lin, the middle part Lmid, and the outer part Lout) having the same position in the light source arrangement direction LY are handled as one group. Accordingly, a plurality of groups are aligned in the light source arrangement direction LY. The plurality of groups of the second display surface 32 are included in "all the groups" in Step S30. Thus, in the process illustrated in FIG. 16, a light source drive value is provisionally set and a target ($1/\alpha_b$) is acquired for each of the groups of the first display surface 31 and the groups of the second display surface 32. In the process illustrated in FIG. 15, even when the scanning of the groups of the first display surface 31 ends, in a case where the scanning of the groups of the second display surface 32 has not ended (Step S30, No), a next group is set as a group of interest, and the process is returned to Step S21.

Figure 25:
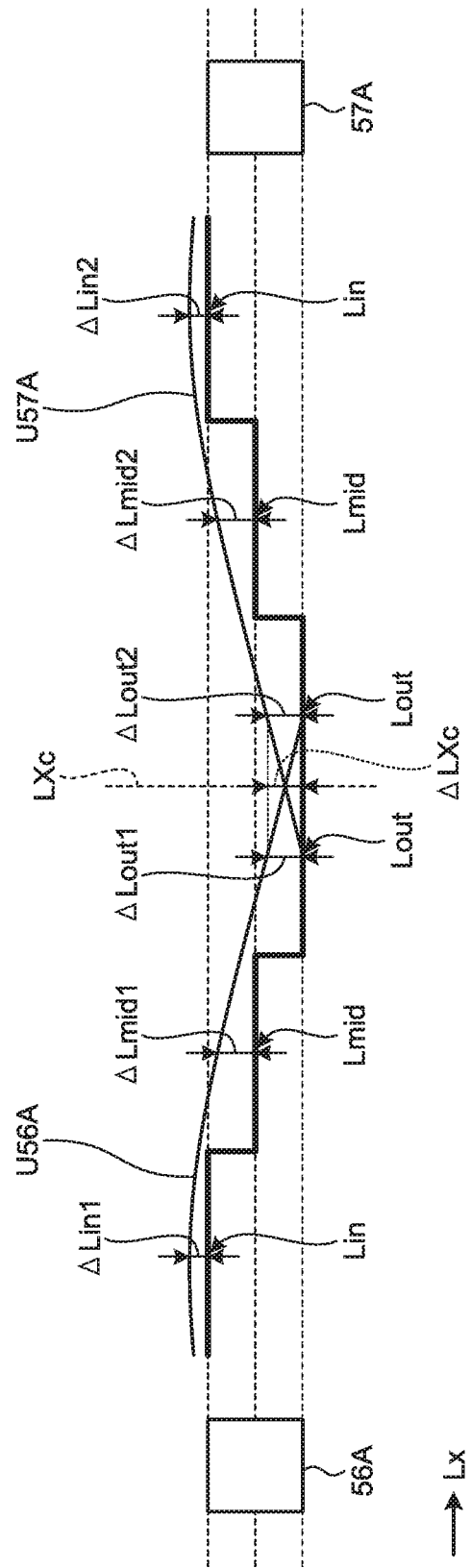
FIG. 25 is an explanatory diagram that illustrates the actual luminances of luminance determination blocks.

As a result, as illustrated in FIG. 24, luminance determination blocks each identified with a flag of a circle are independently set in the first display surface 31 and the second display surface 32. For example, in each of two groups corresponding to the light source 56A and the light source 57A illustrated in FIG. 24, the luminance of the light incident part Lin is high as illustrated in FIG. 19 described above as an example. FIG. 25 is an explanatory diagram that illustrates the actual luminances of luminance determination blocks. It is ideal that light source light amount differences ΔLin1, ΔLmid1, and ΔLout1 of the light incident part Lin, the middle part Lmid, and the outer part Lout are minimal in a curve U56A representing the light source light amount of a light source 56A on the first display surface 31 side. Similarly, it is ideal that light source light amount differences ΔLin2, ΔLmid2, and ΔLout2 of the light incident part Lin, the middle part Lmid, and the outer part Lout are minimal in a curve U57A representing the light source light amount of a light source 57A on the second display surface 32 side. However, even if the light source 56A is turned on such that the luminance falls on an ideal curve U56A, there is a possibility that light emitted from the light source 57A opposite thereto has an influence on the first display surface 31. Similarly, even if the light source 57A is turned on such that the luminance falls on an ideal curve U57A, there is a possibility that light emitted from the light source 56A opposite thereto has an influence on the second display surface 32. To decrease an unintended light source light amount difference ΔLXc as illustrated in FIG. 25, for example, it is necessary to set the light source drive value ($1/\alpha_k$) of the light source 56A while taking into consideration the influence of not only the light sources 56B, 56C, 56D, 56E, and 56F but also the light sources 57A, 57B, 57C, 57D, 57E, and 57F.

In the embodiment, the process is performed as below. First, the image analyzer 23 calculates the ($1/\alpha_b$) value of each luminance determination block based on a second signal value in each luminance determination block as described above. After setting one group as a group of interest, the light source drive value calculator 24 receives (acquires) the above-calculated ($1/\alpha_b$) value of each block (each of blocks aligned in the light incident direction LX) of the group of interest (Step S31), and sets the ($1/\alpha_b$) value of the light incident part Lin as a maximum value, as illustrated in FIG. 16 (Step S32). Next, when the ($1/\alpha_b$) value of the middle part Lmid in the group of interest, is larger than the maximum value (Step S33, Yes), the ($1/\alpha_b$) value of the middle part Lmid is set as the maximum value (Step S34). The middle part Lmid located at the same position in the light source arrangement direction LY as the position of the light incident part Lin set in Step S32. On the other hand, when the ($1/\alpha_b$) value of the middle part Lmid in the group of interest is equal to or less than the maximum value (Step S33, No), the $(1/\alpha_b)$ value of the light incident part Lin is maintained as the maximum value the process proceeds to Step S35.

Next, when the $(1/\alpha_b)$ value of the outer part Lout in the group of interest is larger than the maximum value (Step S35, Yes), the $(1/\alpha_b)$ value of the outer part Lout is set as the maximum value (Step S36). The outer part Lout located at the same position in the light source arrangement direction LY as the position of the light incident part Lin set in Step S32. On the other hand, when the $(1/\alpha_b)$ value of the outer part Lout in the group of interest is equal to or less than the maximum value (Step S35, No), the maximum value is not changed, and the process proceeds to Step S37.

The light source drive value calculator 24 provisionally sets and stores the $(1/\alpha_b)$ value, which has been determined to be the maximum value, as a light source drive value (Step S37). Also in this example in which the first side light source 52A and the second side light source 52B are used, the light source drive value calculator 24 compares the $(1/\alpha_b)$ values of the luminance determination blocks calculated based on the second signal values of the luminance determination blocks to specify the maximum value for each group. However, the present disclosure is not limited thereto. For example, the light source drive value calculator 24 may multiply $1/\alpha_b$ values of the luminance determination blocks calculated based on the second signal values of the luminance determination blocks by the light intensity values at the positions corresponding to the respective luminance determination blocks stored in the lookup table. The light source drive value calculator 24 then may compare the values obtained by the multiplication to specify the maximum value of each group.

The light source drive value of each light source of the first side light source 52A is set as $(1/\alpha_{i1-max})$, the light source drive value of each light source of the second side light source 52B as $(1/\alpha_{i2-max})$. The light source drive value calculator 24 calculates the luminance indexes of the light incident part Lin, the middle part Lmid, and the outer part Lout included in the group of interest by using Equations (11) to (13) described above (Step S38). It is assumed that lookup tables LUTA, LUTB, LUTC, LUTD, LUTE, LUTF, LUTG, LUTH, LUTI, LUTJ, LUTK, and LUTL respectively corresponding to the light sources 56A to 56F of the first side light source 52A and the light sources 57A to 57F of the second side light source 52B are stored in advance. Accordingly, in this example, m of LUTm representing a lookup table takes not values of A to F but values of A to L. Thus, the light source drive value calculator 24 can calculate a luminance index on which the contributions of light from the light sources of the first side light source 52A and the second side light source 52B are reflected. In addition, In the following Equations, $LUTm(P_{Lin}, Q_{Lin})$ represents data of the $P_{Lin}$-th row and $Q_{Lin}$-th column in the lookup table m. The data of the $P_{Lin}$-th row and the $Q_{Lin}$-th column may be data of each pixel 48, data of each luminance determination block, or data of each division area acquired by virtually dividing the image display panel 30 into predetermined areas. This format similarly applies to $LUTm(P_{Lmid}, Q_{Lmid})$ and $LUTm(P_{Lout}, Q_{Lout})$. In this example, $(P_{Lin}, Q_{Lin})$ represents coordinate values represented in an absolute coordinate system that is common to the lookup tables.

The present disclosure is not limited to an example in which a lookup table is arranged for each light source as described above. For example, the light source data storing storage 25 may store only lookup tables corresponding to the light sources of one of the first side light source 52A and the second side light source 52B. The information on the light intensity distribution of the lookup table of a case where only one light source on the second incident surface E2 side is turned on and light emitted from this light source travels from the light guiding plate 54 to the flat surface of the image display panel 30, is the same as the information on the light intensity distribution of the lookup table of the light source on the first incident surface E1 side having line symmetry with respect to the turned-on light source with respect to the center line LXc indicating the center of the whole display surface in the light incident direction LX. As described above, the lookup tables LUTA, LUTB, LUTC, LUTD, LUTE, and LUTF according to the embodiment respectively correspond to the light sources 56A, 56B, 56C, 56D, 56E, and 56F. When the light source data storage 25 stores the lookup tables LUTA, LUTB, LUTC, LUTD, LUTE, and LUTF, the light source drive value calculator 24 can calculate the light source light amount of each light source not only for the first side light source 52A but also for the second side light source 52B, by using the lookup tables LUTA, LUTB, LUTC, LUTD, LUTE, and LUTF stored in the light source data storage 25. More specifically, the light source drive value calculator 24 can calculate the light source light amounts of the light sources 57A, 57B, 57C, 57D, 57E, and 57F by inverting the lookup tables LUTA, LUTB, LUTC, LUTD, LUTE, and LUTF in a manner line-symmetric with respect to the center line LXc and superimposing the lookup tables. In this case, the luminance indexes can be calculated by using the following Equations (15-1), (16-1), and (17-1) instead of Equations (11), (12), and (13) described above.

Luminance index of $Lin =$ (15-1)

$$(1/\alpha_{Lin})/\left[\sum \{(1/\alpha_{i1-max}) \times LUTm(P_{Lin}, Q_{Lin})\} + \sum \{(1/\alpha_{i2-max}) \times LUTm(P_{Lin}, MAXQ - Q_{Lin})\}\right]$$

$(1/\alpha_{Lin})$: $(1/\alpha)$value of block of $Lin$ $(1/\alpha_{i1-max})$: Light source drive value of first side light source $(1/\alpha_{i2-max})$: Light source drive value of second side light source $LUTm(P_{Lin}, Q_{Lin}), LUTm(P_{Lin}, MAXQ - Q_{Lin})$:

Lookup table data of each light source m: A to F

Luminance index of $Lmid =$ (16-1)

$$(1/\alpha_{Lmid})/\left[\sum \{(1/\alpha_{i1-max}) \times LUTm(P_{Lmid}, Q_{Lmid})\} + \sum \{(1/\alpha_{i2-max}) \times LUTm(P_{Lmid}, MAXQ - Q_{Lmid})\}\right]$$

$(1/\alpha_{Lmid})$: $(1/\alpha)$value of block of $Lmid$ $(1/\alpha_{i1-max})$: Light source drive value of first side light source $(1/\alpha_{i2-max})$: Light source drive value of second side light source $LUTm(P_{Lin}, Q_{Lin}), LUTm(P_{Lin}, MAXQ - Q_{Lin})$:

-continued

Lookup table data of each light source m: A to F

Luminance index of $L_{out}$ = (17-1)

$$(1/\alpha_{Lout})/\left[\sum \{(1/\alpha_{i1-max}) \times LUTm(P_{Lout}, Q_{Lout})\} + \sum \{(1/\alpha_{i2-max}) \times LUTm(P_{Lout}, MAXQ - Q_{Lout})\}\right]$$

$(1/\alpha_{Lout})$: $(1/\alpha)$value of block of $L_{out}$ $(1/\alpha_{i1-max})$: Light source drive value of first side light source $(1/\alpha_{i2-max})$: Light source drive value of second side light source $LUTm(P_{Lout}, Q_{Lout})$, $LUTm(P_{Lout}, MAXQ - Q_{Lout})$:

Lookup table data of each light source m: A to F

Figure 27:
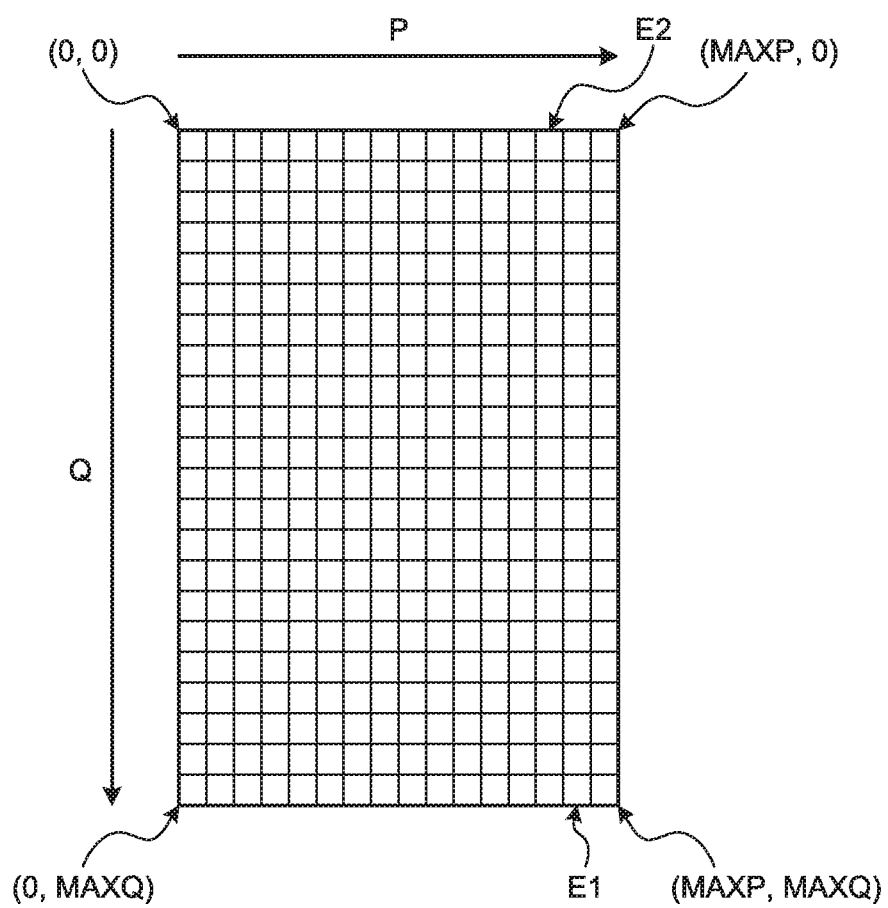
FIG. 27 is a diagram that illustrates an example of absolute coordinate values of a lookup table according to the embodiment.

In Equations (15-1), (16-1), and (17-1), a coordinate conversion is performed to use the lookup table representing a light intensity distribution at the time when the light sources on the first side light source 52A side are turned on as a lookup table representing a light intensity distribution at the time when the light sources on the second side light source 52B side are turned on. The following describes the coordinate conversion with reference to FIG. 27. In the equations described above, coordinate values are represented to be identified according to positions in the light incident direction LX such as $(P_{Lin}, Q_{Lin})$, $(P_{Lmid}, Q_{Lmid})$, and $(P_{Lout}, Q_{Lout})$. However, the concept of the coordinate conversion is the same regardless of the position in the light incident direction LX, and accordingly, coordinate values will be simply denoted by (P, Q) in the following description.

In LUTm (P, Q) indicating data in the P-th column and the Q-th row in the lookup table m, P denotes a position in the light source array direction LY, whereas Q denotes a position in the light incident direction LX. Assume that P takes a range of values from 0 to MAXP, and Q takes a range of values from 0 to MAXQ. Also assume that the coordinate values of an array element disposed at one corner on the second side light source 52B side among the array elements of the lookup table m are (P, Q)=(0, 0). In such a case, the coordinate values of an array element at the other corner can be represented as (MAXP, 0). In addition, the coordinate values of an array element at one corner on the first side light source 52A side can be represented as (0, MAXQ), and the coordinate values of an array element at the other corner can be represented as (MAXP, MAXQ). In a case where the lookup tables LUTA, LUTB, LUTC, LUTD, LUTE, and LUTF are used by inverting them with respect to the center line LXc, and where the absolute coordinate values on the lookup tables LUTA, LUTB, LUTC, LUTD, LUTE, and LUTF are denoted as (P, Q), data of the coordinates values (P, MAXQ-Q) is read from the lookup tables LUTA, LUTB, LUTC, LUTD, LUTE, and LUTF and is used (coordinate conversion). In Equations (15-1), (16-1), and (17-1), the data that is read and used is represented as LUTm(P, MAXQ-Q).

In this way, by reading data at a line-symmetric position with a processing target block with respect to the center line LXc from the lookup tables LUTA, LUTB, LUTC, LUTD, LUTE, and LUTF, the lookup tables LUTA, LUTB, LUTC, LUTD, LUTE, and LUTF can be used in such a manner that the lookup tables LUTA, LUTB, LUTC, LUTD, LUTE, and LUTF are inverted with respect to the center line LXc.

The light source drive value calculator 24 specifies the largest luminance index from among the luminance indexes of the light incident part Lin, the middle part Lmid, and the outer part Lout acquired in Step S38 (Step S39).

Next, the light source drive value calculator 24 stores $(1/\alpha_b)$ corresponding to the luminance index specified in Step S39 as a target $(1/\alpha_b)$ value, and stores information on the position of a specified block(Step S40). The specified block corresponds to the specified luminance index and is one block among the light incident part Lin, the middle part Lmid, and the outer part Lout within a group of interest. In this way, the specified block is handled as a luminance determination block that is a target for a luminance correction, and $(1/\alpha_b)$ of the specified luminance determination block is determined to be the target $(1/\alpha_b)$ value for a group to which the luminance determination block belongs.

The example illustrated in FIG. 24 indicates that luminance determination blocks each identified by the flag of a circle have the maximum value.

After determining the target $(1/\alpha_b)$ value, as illustrated in FIG. 15, the image analyzer 23 performs an area determination of the luminance determination block (Step S20). Then, a group of interest is set, and the light source drive value calculator 24 calculates the $(1/\alpha_b)$ value of the luminance correction target block in the set group of interest (Step S21). The $(1/\alpha_b)$ value calculated here is a value corresponding to the luminance of the luminance correction target block when assuming that the light sources are turned on with the respective light source drive values that are provisionally set (or corrected by a process to be described later), and is different from the light source drive value of each luminance correction target block (each light source). This $(1/\alpha_b)$ value can be calculated using the light intensity value in the lookup tables corresponding to the light sources of the first side light source 52A and the second side light source 52B. Here, in a case where the lookup tables LUTA, LUTB, LUTC, LUTD, LUTE, LUTF, LUTG, LUTH, LUTI, LUTJ, LUTK, and LUTL respectively corresponding to the light sources 56A to 56F of the first side light source 52A and the light sources 57A to 57F of the second side light source 52B are stored in advance, the $(1/\alpha_b)$ value of the luminance correction target block is calculated using Equation (14) described above. However, in this case, m of LUTm representing a lookup table takes not values of A to F but values of A to L. In this way, the $(1/\alpha_b)$ value (the $(1/\alpha_G)$ value in Equation (14) described above) with the influences of light from all the light sources taken into consideration can be calculated. In a similar manner to Equation (14), the value of a latest $(1/\alpha_b)$ value of the luminance correction target block of each group is used as $(1/\alpha_k)$. In other words, after the luminance correction (correction of the $(1/\alpha_b)$ value) of the luminance correction target block of the group of interest is performed through a process to be described later, the $(1/\alpha_b)$ value resulting from the luminance correction is used as the $(1/\alpha_k)$ value of the luminance correction target block of the group of interest to perform the calculation process of Step S21 on the luminance correction target block of another group. The luminance correction target block of the other group is a block subjected to the luminance correction after the luminance correction of the group of interest.

As described above, the light source data storage 25 may store only the lookup tables representing the light intensity distribution at the time of turning on the light sources of the first side light source 52A and does not necessarily store the lookup tables representing the light intensity distribution at the time of turning on the light sources of the second side light source 52B. In such a case, in order to use the lookup tables representing the light intensity distribution at the time of turning on the light sources of the first side light source 52A also as lookup tables representing the light intensity distribution at the time of turning on the light sources of the second side light source 52B, the $(1/\alpha_b)$ value of the luminance correction target block is calculated using the following Equation (18-1) instead of Equation (14) in Step S21.

$$1/\alpha_G = \sum \{(1/\alpha_{k1}) \times LUTm(P, Q)\} + \sum \{(1/\alpha_{k2}) \times LUTm(P, \text{MAX}Q - Q)\} \quad (18\text{-}1)$$

$(1/\alpha_{k1})$: Light source drive value of luminance correction target block of first side light source side $(1/\alpha_{k1})$: Light source drive value of luminance correction target block of second side light source side $LUTm(P, Q)$: Lookup table data of each light source $m$: A to F Also in Equation (18-1) described above, coordinate conversion similar to Equations (15-1), (16-1), and (17-1) is performed. In other words, in a case where lookup tables representing a light intensity distribution at the time of turning on the light sources of the first side light source 52A are also used as lookup tables representing a light intensity distribution at the time of turning on the light sources of the second side light source 52B, and where the absolute coordinate values on the lookup table of a block that is a processing target are represented by (P, Q), data of coordinate values (P, MAXQ-Q) is read from a lookup table corresponding to the position of the block that is the processing target in the light source arrangement direction LY and is used (coordinate conversion). In Equation (18-1), the data that is read and used is represented as LUTm(P, MAXQ-Q). In this way, by reading data at a line-symmetric position with the block serving as the processing target with respect to the center line LXc from the lookup tables LUTA, LUTB, LUTC, LUTD, LUTE, and LUTF, the lookup tables LUTA, LUTB, LUTC, LUTD, LUTE, and LUTF can be used in such a manner that the the lookup tables LUTA, LUTB, LUTC, LUTD, LUTE, and LUTF are inverted with respect to the center line LXc.

Next, as illustrated in FIG. 15, the light source drive value calculator 24 acquires a target $(1/\alpha_b)$ value of the group of interest (Step S22) and performs a luminance correcting process (a process of correcting a light source drive value) described below.

When the $(1/\alpha_b)$ value, which is calculated in Step S21 described above, of the luminance correction target block included in the group of interest is smaller than the above-described target $(1/\alpha_b)$ of the group of interest (Step S23, Yes), a difference between the calculated $(1/\alpha_b)$ value and the target $(1/\alpha_b)$ is calculated (Step S24). Next, the light source drive value calculator 24 calculates a magnification of the difference (Step S25). The light source drive value calculator 24 calculates how many times larger the difference is than the value in the lookup table at that position. More specifically, the light source drive value calculator 24 reads data corresponding to the position of the luminance correction target block from the lookup table of the light source corresponding to the position of the luminance correction target block in the light source arrangement direction LY. The read data will be referred to as a Percentage for the convenience of description. A difference Sub between the $(1/\alpha_b)$ value calculated above and the target $(1/\alpha_b)$ is divided by the Percentage, and the value resulting from the division is the magnification. In the embodiment, a light intensity distribution of a case where the light source is turned on with a maximum output (output of 100%) is stored in the lookup table. Thus, by dividing the difference by the light intensity value of the lookup table, the ratio (magnification) of the difference to the light intensity value of 100% is acquired. In addition, in a case where the lookup table representing a light intensity distribution at the time of turning on the light sources of the first side light source 52A is used also as a lookup table representing a light intensity distribution at the time of turning on the light sources of the second side light source 52B, a coordinate conversion is performed when the Percentage is read as described above. In other words, in a case where the absolute coordinate values of the luminance correction target block are (P, Q), data of the coordinate values (P, MAXQ-Q) is read from a lookup table corresponding to the position of the luminance correction target block in the light source arrangement direction LY, and is used as the percentage.

Next, the magnification of the difference calculated above is added to the $(1/\alpha_b)$ value that is calculated based on the second signal and is provisionally set in Step S37 described above (Step S26). In other words, when the $(1/\alpha_b)$ value calculated in Step S21 is smaller than the target $(1/\alpha_b)$ value of the block, the light source drive value calculator 24 adds the magnification of the difference to the $(1/\alpha_b)$ value that is provisionally set as described above (Step S26), thereby compensating the luminance of a block that is deficient in luminance.

Figure 26:
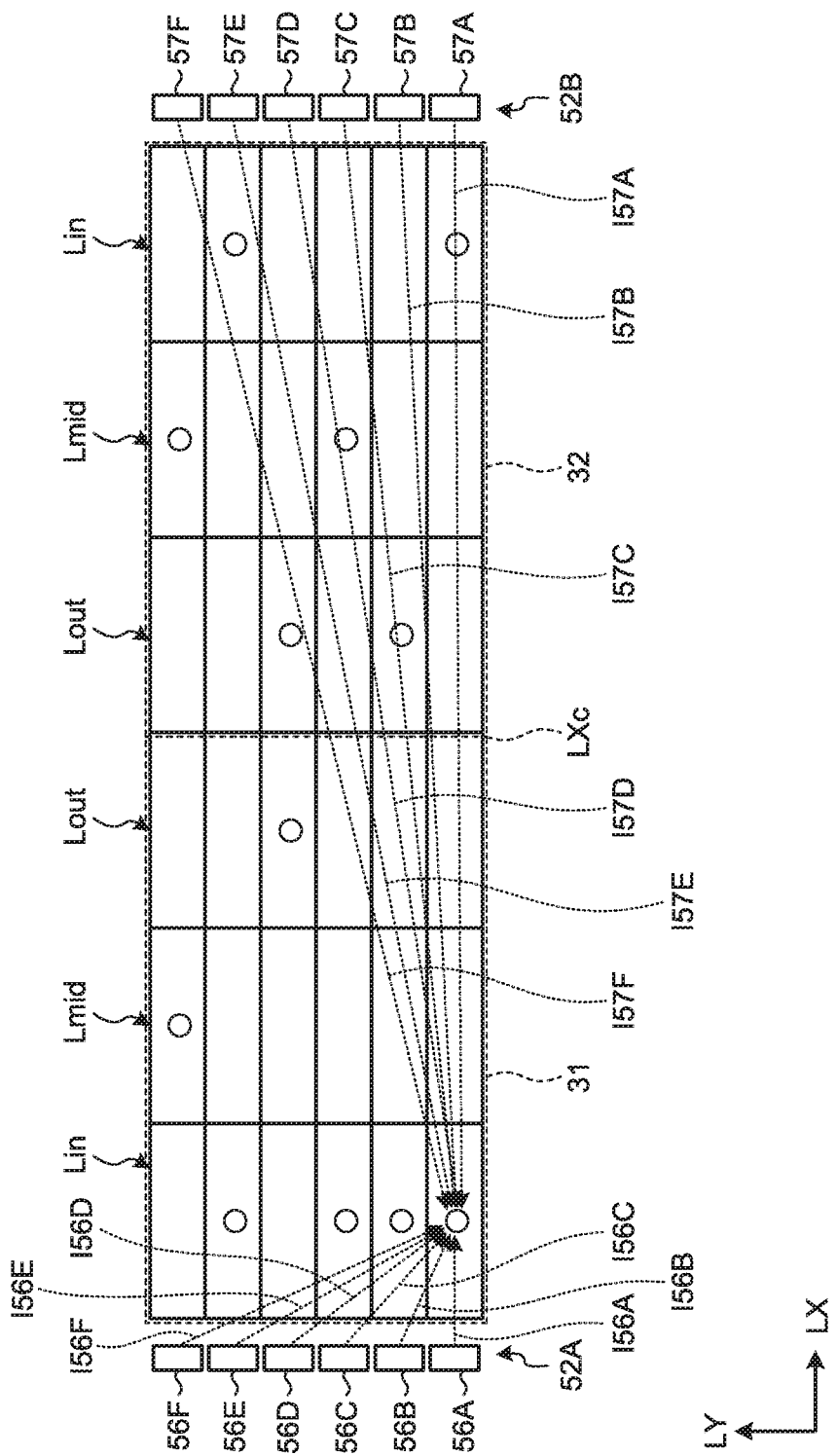
FIG. 26 is an explanatory diagram that illustrates the influence of each light source on a corresponding luminance determination block that is one target for a luminance correction.

FIG. 26 is an explanatory diagram that illustrates the influence of each light source on a corresponding luminance determination block that is one target for a luminance correction. When the luminance determination block illustrated in FIG. 26 is the light incident part Lin of the first display surface 31 that is closest to the light source 56A, a representative luminance of the luminance determination block is acquired by adding up the luminances I56A to I56F and I57A to I57F of the luminance determination blocks according to incident light emitted from the light sources 56A to 56F and 57A to 57F. For example, as illustrated in FIG. 26, the light source drive value calculator 24 recalculates the light source drive value of the light source 56A for which a light source drive value is desired to be acquired such that a total sum of the luminance generated by the light source 56A and luminances generated by the light sources 56B to 56F and 57A to 57F other than the light source 56A is equal to the target luminance. Then, the recalculated light source drive values are stored. More specifically, as described above, the light source drive value calculator 24 calculates a difference Sub by subtracting the $(1/\alpha_b)$ calculated in Step S21, from the target $(1/\alpha_b)$ value. The $(1/\alpha_b)$ value calculated in Step S21 is a $(1/\alpha_b)$ value corresponding to the total sum of the luminances to be obtained when the light sources 56A to 56F and the light sources 57A to 57F are turned on. Then, the light source drive value calculator 24 divides the difference Sub by the Percentage of a lookup table corresponding to the light source 56A, thereby calculating the magnification. The light source drive value calculator 24 adds the magnification to the $(1/\alpha_b)$ value that is provisionally set as a light source drive value for the light source 56A. Thus, the light source drive value of the light source 56A is recalculated and is stored. This process is performed for each light source. In this way, the curve Ud illustrated in FIG. 23 is corrected to the curve Ue, for example. As a result, the luminance levels of the peaks D1 and D3 among the peaks and the valleys (D0 to D4) in luminance are changed, and the luminance is increased. Next, the process proceeds to Step S27.

On the other hand, when the $(1/\alpha_b)$ value calculated in Step S21 is equal to or larger than the target $(1/\alpha_b)$ value of the group of interest (Step S23, No), Steps S24 to S26 are skipped, and the process proceeds to Step S27. Next, when the $(1/\alpha_b)$ value of the luminance correction target block exceeds an upper limit value (Step S27, Yes), clipping in which the $(1/\alpha_b)$ value is changed to the upper limit value is performed (Step S28). When positive determination ("Yes") is made in Step S23, the $(1/\alpha_b)$ value of the luminance correction target block compared with the upper limit value in Step S27 is the light source drive value $(1/\alpha_b)$ resulting from the correction performed in Step S26. By contrast, when negative determination ("No") is made in Step S23, the $(1/\alpha_b)$ value of the luminance correction target block compared with the upper limit value in Step S27 is the light source drive value $(1/\alpha_b)$ that is provisionally set. The upper limit value is set in advance as an upper limit value of the light source drive value used in the light source control. Then, after Step S28, the process proceeds to Step S30. On the other hand, when the $(1/\alpha_b)$ value of the luminance correction target block does not exceed the upper limit value (Step S27, No), Step S28 is skipped, and the process proceeds to Step S30. When the scanning of all the groups ends (Step S30, Yes), the process illustrated in FIG. 15 ends. On the other hand, when the scanning of all the groups has not ended (Step S30, No), a next group is set as the group of interest, and the process is returned to Step S21. According to the process described above, the light source drive value $(1/\alpha_b)$ for each block that is provisionally set in Step S37 is corrected. However, when negative determination ("No") is made in Steps S23 and S27, the light source drive value that is provisionally set may not possibly be corrected. In such a case, the light source drive value that is provisionally set is used for the control of the light source light amount of the light source without any change. The light source light amount is calculated based on the $(1/\alpha_b)$ value of each block acquired in this way. $(1/\alpha_b)$ of each luminance correction target block calculated in this way is used as the light source drive value $(1/\alpha_k)$ of each light source. That is, the light source drive value $(1/\alpha_k)$ of each of the light sources 56A, 56B, 56C, 56D, 56E, 56F, 57A, 57B, 57C, 57D, 57E, and 57F can be calculated. Based on this light source drive value $(1/\alpha_k)$ and the lookup table, a representative luminance is calculated by Equation (10) described above. Thus, each $(1/\alpha_b)$ value that is provisionally set is corrected such that the $(1/\alpha_b)$ value of each luminance correction target block is equal to each target $(1/\alpha_b)$ value. The lighting source lighting amount of each light source is controlled based on the corrected each $(1/\alpha_b)$ value. In other words, the light source light amount of each light source is controlled such that the luminance of each luminance correction target block satisfies the target luminance.

In order to use lookup tables representing a light intensity distribution at the time of turning on the light sources of the first side light source 52A as lookup tables representing a light intensity distribution at the time of turning on the light sources of the second side light source 52B, it is necessary to incorporate the calculation for the coordinate conversion into Equation (10). As described above, the representative luminance is calculated by multiplying light source currents and data of the lookup tables of the respective light sources and by adding up all the values resulting from the multiplication. Accordingly, when the lookup tables are shared by the first side light source 52A and the second side light source 52B, the light source drive value calculator 24 can calculate the representative luminance by using an equation in which the light source currents is multiplied by data of the lookup tables of the respective light sources and then the sum of the values resulting from the multiplication is calculated for both of the first sidelight light source 52A and the second sidelight light source 52B. The light source currents of the second sidelight light source 52B are multiplied by data of the coordinate value (P, MAXQ-Q) instead of the coordinate value (P, Q) in the lookup tables.

While the display apparatus 10 of the present embodiment has the lookup tables representing a light intensity distribution at the time of turning on the light sources of the first side light source 52A, and has no lookup tables representing a light intensity distribution at the time of turning on the light sources of the second side light source 52B, the present disclosure is not limited to this example. For example, the display apparatus 10 of the present embodiment may have the lookup tables representing a light intensity distribution at the time of turning on the light sources of the second side light source 52B and have no lookup tables representing a light intensity distribution at the time of turning on the light sources of the first side light source 52A.

The calculation of the light source drive value $(1/\alpha_k)$ of the light source (luminance correction, that is, correction of the light source drive value) may be performed in the order of the light sources 56A, 56B, 56C, 56D, 56E, 56F, 57A, 57B, 57C, 57D, 57E, and 57F. Alternatively, the calculation of the light source drive value $(1/\alpha_k)$ of the light source may be performed in the order of the light sources 56A, 56B, 56C, 56D, 56E, 56F, 57F, 57E, 57D, 57C, 57B, and 57A. However, the order of calculating the light source drive value $(1/\alpha_k)$ of the light source is not limited thereto. When the luminance of the light source drive value $(1/\alpha_k)$ of one light source among the light sources 56A, 56B, 56C, 56D, 56E, 56F, 57A, 57B, 57C, 57D, 57E, and 57F is corrected in the process of Step S26 illustrated in FIG. 15, the light source drive values $(1/\alpha_k)$ of the other light sources are re-calculated. Specifically, the light source drive value calculator 24 calculates the light source drive values $(1/\alpha_k)$ of the light sources 56A, 56B, 56C, 56D, 56E, 56F, 57A, 57B, 57C, 57D, 57E, and 57F in order, while sequentially reflecting the light source drive values $(1/\alpha_k)$ of the light sources calculated earlier on the light source drive values $(1/\alpha_k)$ of the light sources calculated later. Thereby, the representative luminance for each light source is calculated with high accuracy.

The order of correction of the light source drive value may be determined based on the characteristics or the setting of a backlight, for example. When a light source is affected more by the effect of light emitted from light sources aligned with the light source in the light source arrangement direction LY (light sources included in the same side light source) than by the effect of light emitted from light sources opposite to the light source in the light incident direction LX, for example, the light source drive value calculator 24 may calculate the light source drive value in order of arrangement of the light sources in the light source arrangement direction LY. In such a case, the light source drive value calculator 24 may calculate the light source drive value in order of the light sources 56A, 56B, 56C, 56D, 56E, 56F, 57A, 57B, 57C, 57D, 57E, and 57F or in order of the light sources 56A, 56B, 56C, 56D, 56E, 56F, 57F, 57E, 57D, 57C, 57B, and 57A, for example.

When a light source is affected less by the effect of light emitted from light sources aligned with the light source in the light source arrangement direction LY (light sources included in the same side light source) than by the effect of light emitted from light sources opposite to the light source in the light incident direction LX, for example, the light source drive value calculator 24 may alternately correct the light source drive value of the light sources in the first sidelight light source 52A and the light source drive value of the light sources in the second sidelight light source 52B. In such a case, the light source drive value calculator 24 may calculate the light source drive value may be corrected in order of the light sources 56A, 57A, 56B, 57B, 56C, 57C, 56D, 57D, 56E, 57E, 56F, and 57F, for example.

Furthermore, the correction of the light source drive value may be performed a plurality of times. For example, the light source drive value corrected in the first correction of the light source drive value may be reflected on the second correction of the light source drive value, for example. Thus, the light source drive value can be calculated with higher accuracy. In this case, the light source drive value may be corrected so as to increase the luminance in the first correction; the light source drive value may be corrected so as to decrease the luminance in the second correction.

The light source drive value determiner 26 transmits the light source drive values ($1/\alpha_k$) of the light sources 56A, 56B, 56C, 56D, 56E, 56F, 57A, 57B, 57C, 57D, 57E, and 57F acquired as described above to the planar light source device controller 60, and transmits the expansion coefficient $\alpha_k$ for each pixel 48 to the image processor 22 as the luminance information for each pixel 48 (Step S15).

Next, the tone curve converting process (Step S12) performed by the tone curve converter 27 will be described. In the embodiment, as illustrated in FIG. 8, the tone curve converter 27 is provided at the input stage of the image processor 22. In the embodiment, the tone curve converter 27 sets a gain according to the luminance of the pixel 48 of the first signal RGB, thereby obtaining the second signal rgb used in the process of the later stage. The gain is a value by which the signal value R(p, q) of the first sub-pixel 49R, the signal value G(p, q) of the second sub-pixel 49G, and the signal value B(p, q) of the third sub-pixel 49B of the pixel 48 of the first signal RGB are multiplied.

In the embodiment, when acquiring the second signal rgb, the tone curve converter 27 causes the gain to vary based on the luminance of the pixel 48 of the first signal RGB.

More specifically, in the embodiment, a first luminance threshold Yth1 is set for the luminance of the first signal RGB. The tone curve converter 27 specifies a first area and a second area. The first area is an area in which the luminance of the first signal RGB is equal to or less than the first luminance threshold Yth1, and the second area is an area in which the luminance of the first signal RGB is higher than the first luminance threshold Yth1. Then, with respect to the second area, the tone curve converter 27 increases the gain used for the multiplication according to the luminance of the pixel 48 of the first signal RGB, the pixels 48 in the second area having the luminance of the first signal RGB higher than the first luminance threshold Yth1.

In the embodiment, the tone curve converter 27 changes the gain used for the multiplication according to a ratio P of the number npix to the number Npix (P=npix/Npix). The number Npix is the number of all the pixels 48 of one frame of the first signal RGB. The number npix is the number of pixels 48 that have the luminance (the luminance on a pixel basis) equal to or higher than a second luminance threshold Yth2 and are included in all the pixels 48 of one frame of the first signal RGB. Hereinafter, the ratio P of the number npix of pixels 48 having the luminance equal to or higher than the second luminance threshold Yth2 to the number Npix of all the pixels 48 of one frame of the first signal RGB will be also referred to as a "high luminance pixel ratio".

More specifically, a first ratio threshold P1 and a second ratio threshold P2 higher than the first ratio threshold P1 are set for the high luminance pixel ratio P described above. A maximum value of the gain used for the multiplication for the first area is referred to as a first maximum value. A maximum value of the gain used for the multiplication for the first signal RGB having a maximum luminance in the second area is referred to as a second maximum value. A minimum value of the gain used for the multiplication for the first area is referred to as a first minimum value. A minimum value of the gain used for the multiplication for the first signal RGB having a maximum luminance in the second area is referred to as a second minimum value.

When the high luminance pixel ratio P is lower than the first ratio threshold P1 (P<P1), the tone curve converter 27 sets the gain for the first area to be the first minimum value, and sets the gain for the first signal RGB having the maximum luminance in the second area to be the second maximum value. On the other hand, when the high luminance pixel ratio P is higher than the second ratio threshold P2 (P>P2), the tone curve converter 27 sets the gain for the first area to be the first maximum value, and sets the gain for the first signal RGB having the maximum luminance in the second area becomes the second minimum value. In addition, the tone curve converter 27 sets the gain such that the gain for the first area is the same as the gain for the second area. On the other hand, when the high luminance pixel ratio P is a value in the range equal to or higher than the first ratio threshold P1 and equal to or lower than the second ratio threshold P2 (P1≤P≤P2), the tone curve converter 27 sets the gain for the first area to be gradually increased, and sets the gain for the first signal RGB having the maximum luminance in the second area to be gradually decreased as the high luminance pixel ratio P increases.

The following describes the tone curve converting process more specifically.

Figure 28:
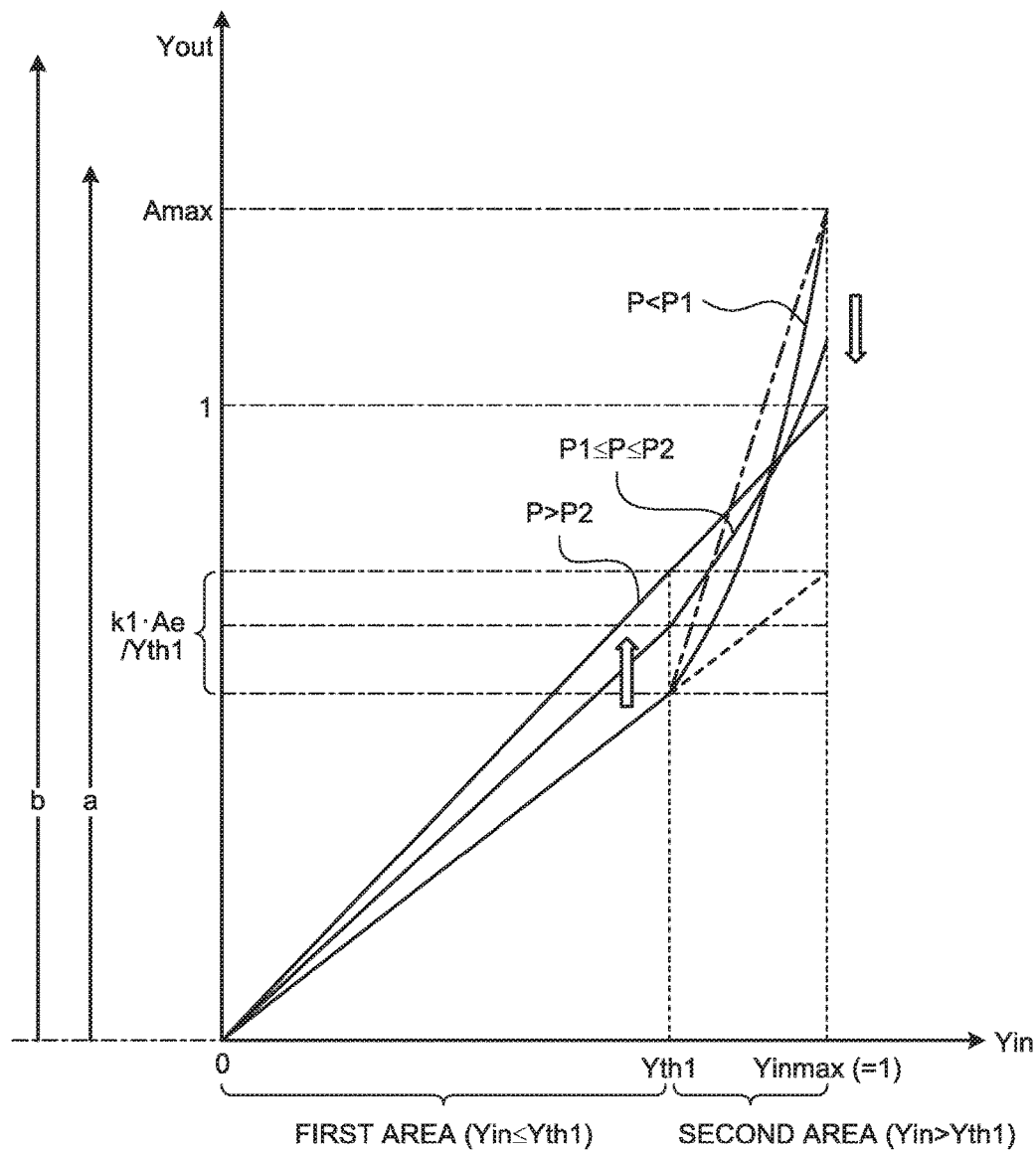
FIG. 28 is a diagram that illustrates an example of tone curve converting processing characteristics according to the embodiment.

FIG. 28 is a diagram that illustrates an example of tone curve converting processing characteristics according to the embodiment. In the example illustrated in FIG. 28, the horizontal axis represents Yin that is the luminance of the first signal RGB as the input signal for the tone curve converter 27, and the vertical axis represents Yout that is the luminance of the second signal rgb as the output signal after the tone curve converting process has been performed by the tone curve converter 27. FIG. 28 illustrates an example that is normalized with respect to the maximum value (maximum luminance Yinmax) of the luminance Yin of the first signal RGB.

Figure 29:
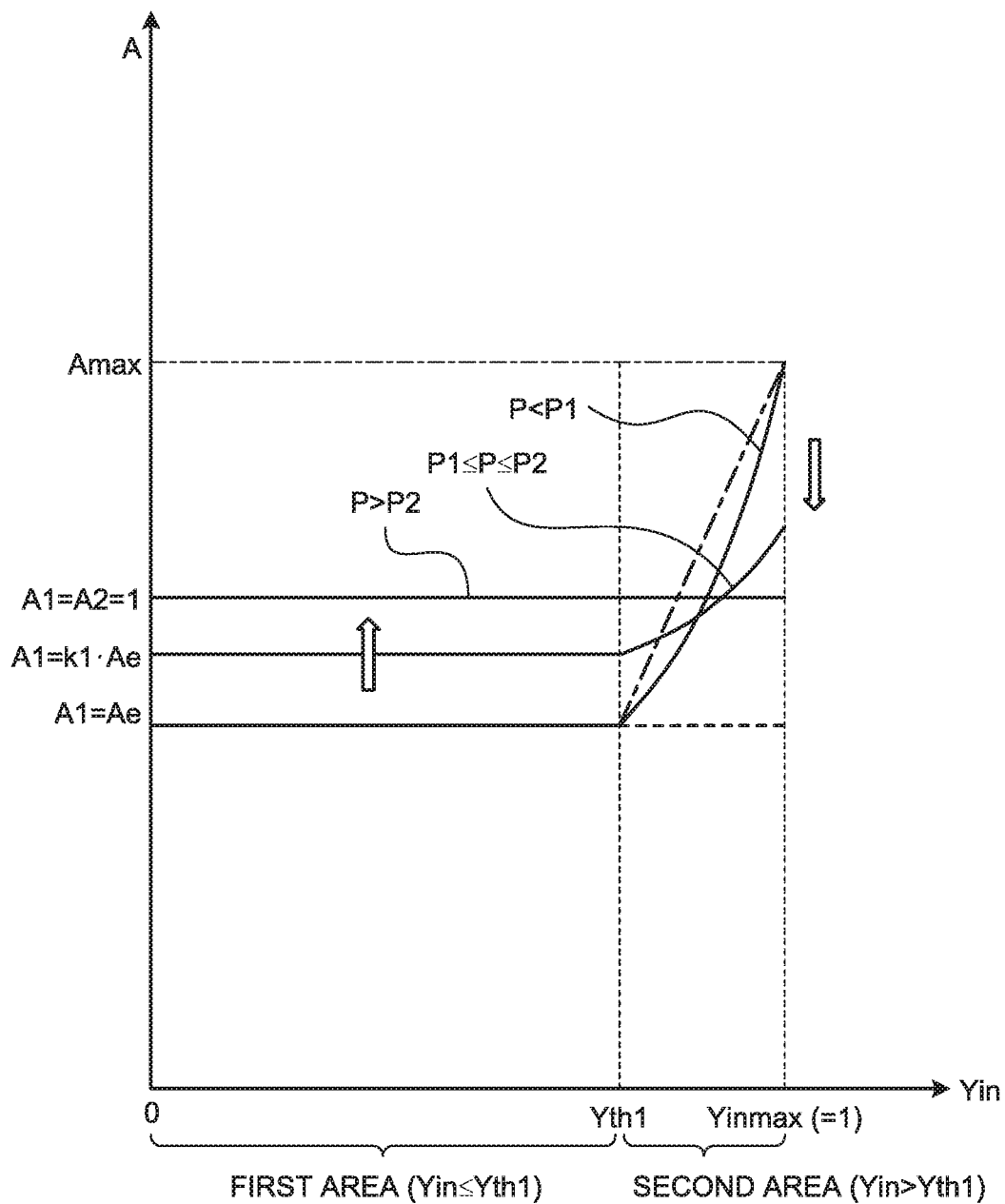
FIG. 29 is a diagram that illustrates an example of gain characteristics in a tone curve converting process according to the embodiment.

FIG. 29 is a diagram that illustrates an example of gain characteristics in a tone curve converting process according to the embodiment. FIG. 29 illustrates an example in which the maximum value of the gain A at the maximum value (maximum luminance Yinmax=1) of the luminance Yin of the first signal RGB is represented as Amax.

Figure 30:
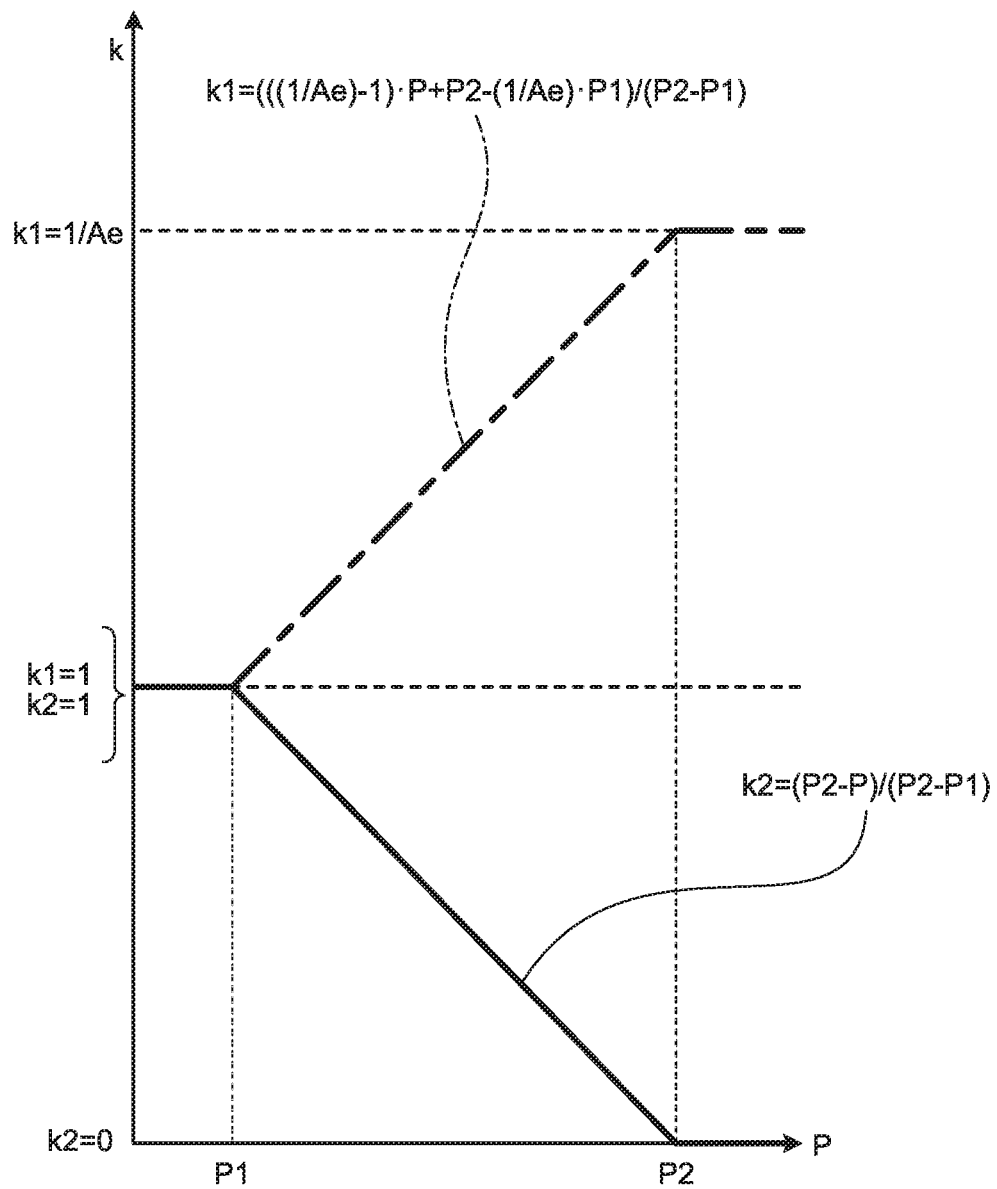
FIG. 30 is a diagram that illustrates an example of characteristics of a gain coefficient in the tone curve converting process according to the embodiment.

FIG. 30 is a diagram that illustrates an example of characteristics of a gain coefficient in the tone curve converting process according to the embodiment. In the example illustrated in FIG. 30, the horizontal axis represents the ratio P (=npix/Npix) of the number npix to the number Npix. As described above, the number Npix is the number of all the pixels 48 of one frame of the first signal RGB. The number npix is the number of pixels 48 that have the luminance (the luminance on a pixel basis) equal to or higher than the second luminance threshold Yth2 and that are included in all the pixels 48 of one frame of the first signal RGB. The vertical axis represents a gain coefficient k for the gain A. In the example illustrated in FIG. 30, a gain for the first area is represented as A1, and a gain coefficient for the gain A1 is represented as k1. In the example illustrated in FIG. 30, a gain for the second area is represented A2, and a gain coefficient for the gain A2 is represented as k2.

As illustrated in FIGS. 28 and 29, in the embodiment, the first luminance threshold Yth1 is set for the luminance Yin of the first signal RGB as the input signal for the tone curve converter 27. The tone curve converter 27 specifies the first area and the second area. The first area is an area in which the luminance Yin of the first signal RGB is equal to or less than the first luminance threshold Yth1, and the second area is an area in which the luminance Yin of the first signal RGB is higher than the first luminance threshold Yth1.

In the embodiment, the gain A1 of the luminance Yout after the tone curve converting process for the luminance Yin of the first signal RGB in the first area is represented by the following Equation (19) using a predetermined reference gain Ae.

$$A1 = k1 \cdot Ae \quad (19)$$

In addition, in the embodiment, the gain A2 of the luminance Yout after the tone curve converting process for the luminance Yin of the first signal RGB in the second area is represented by the following Equation (20).

$$A2 = k2 \cdot ((A\max - A1)/(1 - Yth1)^c) \cdot ((Yin - Yth1)^c) + A1 \quad (20)$$

As illustrated in FIG. 30, in a case where the high luminance pixel ratio P is lower than the first ratio threshold P1 (P<P1), the coefficient k1 of the gain k1·A1 of the luminance Yout after the tone curve converting process for the luminance Yin of the first signal RGB in the first area becomes "1", and the coefficient k2 of the gain k2·A2 of the luminance Yout after the tone curve converting process for the luminance Yin of the first signal RGB in the second area becomes "1". In this case, the gain A1 of the luminance Yout after the tone curve converting process for the luminance Yin of the first signal RGB in the first area is represented by the following Equation (21), and the gain A2 of the luminance Yout after the tone curve converting process for the luminance Yin of the first signal RGB in the second area is represented by the following Equation (22).

$$A1 = Ae \quad (21)$$

$$A2 = ((A\max - A1)/(1 - Yth1)^c) \cdot (Yin - Yth1)^c) + A1 \quad (22)$$

On the other hand, as illustrated in FIG. 30, in a case where the high luminance pixel ratio P is higher than the second ratio threshold P2 (P>P2), the coefficient k1 of the gain A1 of the luminance Yout after the tone curve converting process for the luminance Yin of the first signal RGB in the first area becomes 1/Ae, and the coefficient k2 of the gain A2 of the luminance Yout after the tone curve converting process for the luminance Yin of the first signal RGB in the second area becomes "0". In this case, the gain A1 of the luminance Yout after the tone curve converting process for the luminance Yin of the first signal RGB in the first area and the gain A2 of the luminance Yout after the tone curve converting process for the luminance Yin of the first signal RGB in the second area are represented by the following Equation (23).

$$A1 = A2 = 1 \quad (23)$$

In other words, in a case where the high luminance pixel ratio P is higher than the second ratio threshold P2 (P>P2), the gain is "1" in all the areas including the first area and the second area as illustrated in FIG. 29. As illustrated in FIG. 28, the luminance Yin of the first signal RGB before the tone curve converting process is the same as the luminance Yout of the second signal rgb after the tone curve converting process.

In a case where the high luminance pixel ratio P is a value in the range equal to or higher than the first ratio threshold P1 and equal to or lower than the second ratio threshold P2 (P1≤P≤P2), the gain coefficients k1 and k2 are respectively represented by the following Equations (24) and (25).

$$k1 = (((1/Ae) - 1) \cdot P + P2 - (1/Ae) \cdot P1)/(P2 - P1) \quad (24)$$

$$k2 = (P2 - P)/(P2 - P1) \quad (25)$$

As can be understood from Equations (19), (20), (21), (22), (23), (24), and (25), in a case where the high luminance pixel ratio P is lower than the first ratio threshold P1 (P<P1), the gain A1 for the first area becomes equal to the reference gain Ae that is a minimum (first minimum value), and the gain A2 at the maximum luminance Yinmax (=1) of the first signal RGB in the second area becomes a maximum (second maximum value).

On the other hand, in a case where the high luminance pixel ratio P is a value in the range equal to or higher than the first ratio threshold P1 and equal to or lower than the second ratio threshold P2 (P1≤P≤P2), the gain for the first area is gradually increased in accordance with an increase in the high luminance pixel ratio P as denoted by an upward arrow in FIG. 29, and the characteristic of the tone curve converting process in the first area gradually increases as denoted by an upward arrow in FIG. 28. In addition, the gain at the maximum luminance Yinmax (=1) of the first signal RGB in the second area is gradually decreased in accordance with an increase in the high luminance pixel ratio P as denoted by a downward arrow in FIG. 29, and the characteristic of the tone curve converting process at the maximum luminance Yinmax (=1) of the first signal RGB in the second area gradually decreases as denoted by a downward arrow in FIG. 28.

In a case where the high luminance pixel ratio P is higher than the second ratio threshold P2 (P>P2), the gain A1 for the first area becomes a maximum (first maximum value), and the gain A2 at the maximum luminance Yinmax (=1) of the first signal RGB for the second area becomes a minimum (second minimum value). In this case, both the gain A1 for the first area and the gain A2 for the second area are "1" as described above.

In Equation (20) described above, when the index c=1, the following Equation (26) is acquired.

$$A2 = k2 \cdot ((A\max - A1)/(1 - Yth1)) \cdot ((Yin - Yth1)) + A1 \quad (26)$$

Specifically, the gain A2 of the luminance Yout after the tone curve converting process for the luminance Yin of the first signal RGB for the second area is represented by a linear function having a slope of k2·((Amax−A1)/(1−Yth1)) at the time when the index c=1. More specifically, in a case where the high luminance pixel ratio P is lower than the first ratio threshold P1 (P<P1), and where k2=1, a gain characteristic denoted by an alternate long and short dashed straight line in FIG. 28 is acquired for the second area. In addition, a characteristic of a tone curve converting process denoted by an alternate long and short dashed straight line in FIG. 29 is acquired for the second area.

Figure 31:
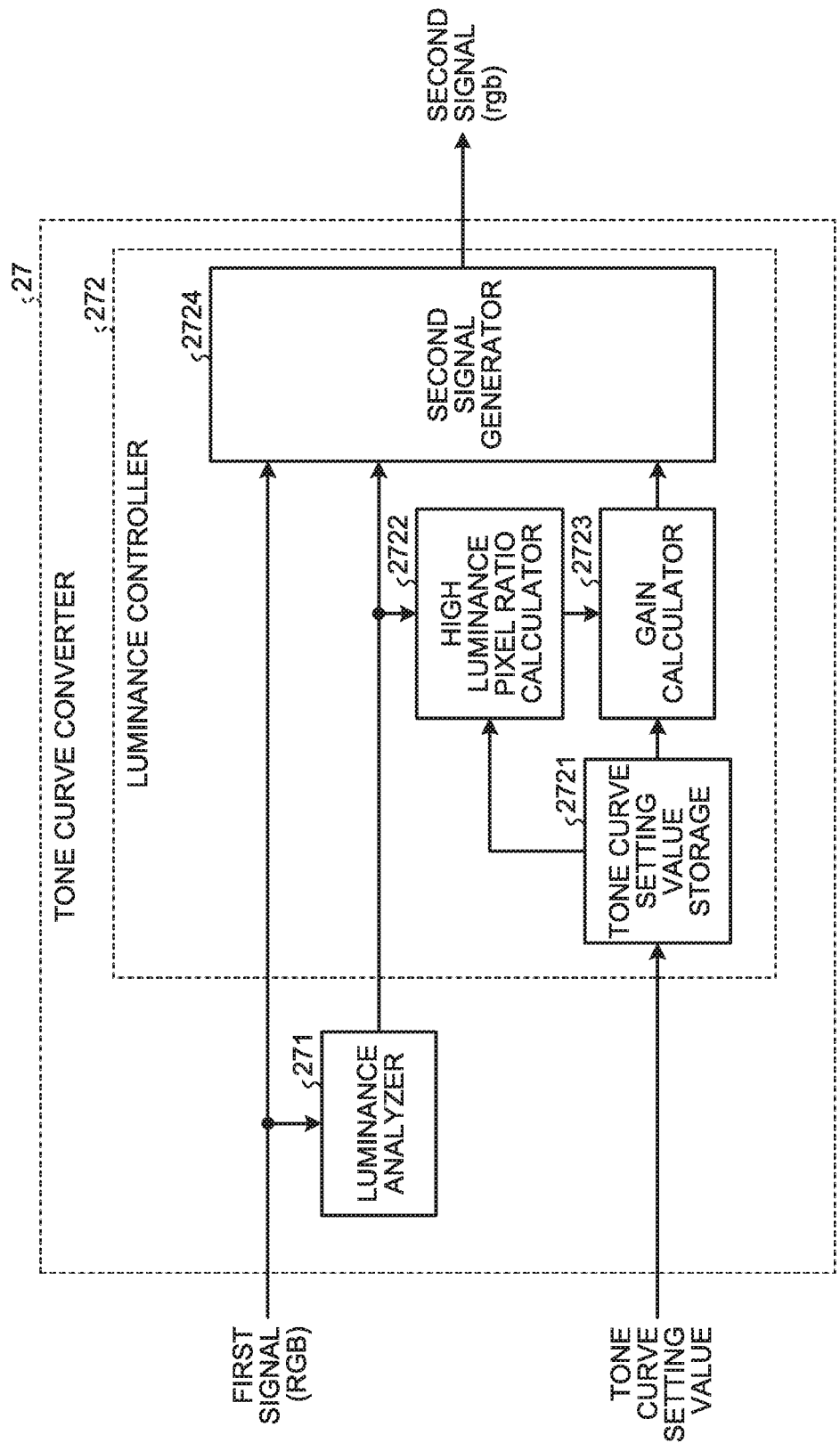
FIG. 31 is a block diagram that illustrates a configuration example of a tone curve converter according to the embodiment.
Figure 32:
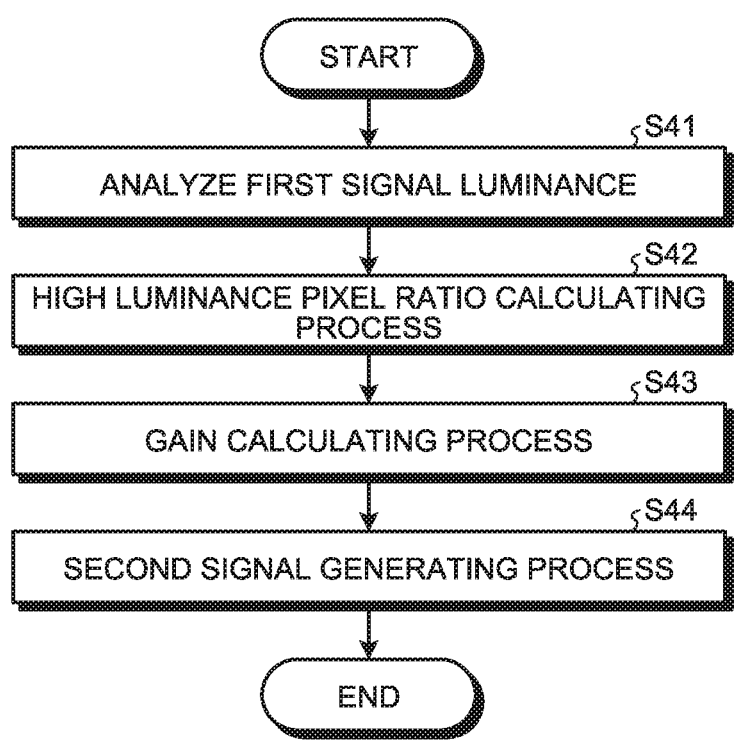
FIG. 32 is a flowchart that illustrates an example of the tone curve converting process.

FIG. 31 is a block diagram that illustrates a configuration example of the tone curve converter 27 according to the embodiment. FIG. 32 is a flowchart that illustrates an example of the tone curve converting process.

As illustrated in FIG. 31, the tone curve converter 27 according to the embodiment includes a luminance analyzer 271 and a luminance controller 272. The luminance controller 272 includes a tone curve setting value storage 2721, a high luminance pixel ratio calculator 2722, a gain calculator 2723, and a second signal generator 2724.

The luminance analyzer 271 analyzes the luminance Yin of each pixel 48 of the first signal RGB based on the information on the first signal RGB as the input signal of an image (Step S41). The luminance Yin of each pixel 48 of the first signal RGB is acquired using the following Equation (27), for example.

$$Yin = Kr \cdot R(p,q) + Kb \cdot G(p,q) + Kg \cdot B(p,q) \tag{27}$$

In Equation (27) described above, coefficients Kr, Kg, and Kb are coefficients used for converting an RGB value into a luminance Y in an XYZ color system. The values of the coefficients are different according to the standard used for converting an RGB value into the XYZ color system. For example, when an RGB value is converted into a value of the XYZ color system of an sRGB (D65) standard, the coefficients Kr, Kg, and Kb are set such that Kr=0.2126, Kg=0.7152, and Kb=0.0722. When an RGB value is converted into a value of the XYZ color system of an Adobe RGB standard, the coefficients Kr, Kg, and Kb are set such that Kr=0.3070, Kg=0.6170, and Kb=0.0761.

When analyzing the luminance Yin of each pixel 48 of the first signal RGB, the luminance analyzer 271 may convert an RGB value into a luminance Y in a YCbCr color system. For example, when an RGB value is converted into a value of the YCbCr color system of an ITU-R BT. 601 standard, the coefficients Kr, Kg, and Kb are set such that Kr=0.299, Kg=0.5870, and Kb=0.1140. When an RGB value is converted into a value of the YCbCr color system of an ITU-R BT. 709 standard, for example, the coefficients Kr, Kg, and Kb are set such that Kr=0.2126, Kg=0.7152, and Kb=0.0722. When an RGB value is converted into a value of the YCbCr color system of an ITU-R BT. 2020 standard, for example, the coefficients Kr, Kg, and Kb are set such that Kr=0.2627, Kg=0.6780, and Kb=0.0593. However, the present invention is not limited to the system (standard) in which an RGB value is converted into a luminance Y.

The tone curve setting value storage 2721 stores tone curve setting values input from the external control device 11. The tone curve setting values are setting values used for acquiring the tone curve converting processing characteristics illustrated in FIG. 28. The tone curve setting values include the first luminance threshold Yth1, the reference gain Ae, the maximum value Amax, the index c, the second luminance threshold Yth2, the first ratio threshold P1, and the second ratio threshold P2. The first luminance threshold Yth1 is a threshold used for dividing the tone curve converting processing characteristics illustrated in FIG. 28 into the first area and the second area. The reference gain Ae is a reference gain for the first area. The maximum value Amax is the maximum value of the gain at the maximum luminance Yinmax (=1) of the first signal RGB in the second area. The index c is an index used for acquiring the gain A2 of the luminance Yout after the tone curve converting process for the luminance Yin of the first signal RGB in the second area by using Equation (20) and the like. The second luminance threshold Yth2 is used when the high luminance pixel ratio calculator 2722 acquires the high luminance pixel ratio P. The first ratio threshold P1 and the second ratio threshold P2 are thresholds with which the high luminance pixel ratio P in the gain coefficient characteristics illustrated in FIG. 30 is compared.

In order to effectively increase the dynamic range of a display image, it is preferable to increase the gain for a pixel 48 including a white component when the luminance Yin of each pixel 48 of the first signal RGB is acquired using Equation (27). In the first signal RGB, at least the signal value R(p, q) of the first sub-pixel 49R, the signal value G(p, q) of the second sub-pixel 49G, and the signal value B(p, q) of the third sub-pixel 49B of the pixel 48 including a white component are all greater than 0. Accordingly, it is preferable that the first luminance threshold Yth1 is in the range equal to or higher than 0.7 and less than 1.0. For example, when an RGB value is converted into a value of the XYZ color system of the sRGB (D65) standard, it is more preferable that the first luminance threshold Yth1 has a value greater than 0.7874 acquired by adding Kg=0.7152 and Kb=0.0722. When an RGB value is converted into a value of the XYZ color system of the Adobe RGB standard, it is more preferable that the first luminance threshold Yth1 has a value greater than 0.6931 acquired by adding Kg=0.6170 and Kb=0.0761. When an RGB value is converted into a value of the YCbCr color system of the ITU-R BT.601 standard, it is more preferable that the first luminance threshold Yth1 has a value greater than 0.7010 acquired by adding Kg=0.5870 and Kb=0.1140. When an RGB value is converted into a value of the YCbCr color system of the ITU-R BT.709 standard, it is more preferable that the first luminance threshold Yth1 has a value greater than 0.7874 acquired by adding Kg=0.7152 and Kb=0.0722. When an RGB value is converted into a value of the YCbCr color system of the ITU-R BT.2020 standard, it is more preferable that the first luminance threshold Yth1 has a value greater than 0.7373 acquired by adding Kg=0.6780 and Kb=0.0593.

In the embodiment, the pixel 48 includes the fourth sub-pixel 49W as described above. The image processor 22 is configured to convert a second signal rgb of three colors including red, green, and blue into a third signal RGBW of four colors including red, green, blue, and white. With this configuration, the display can be performed with a higher luminance that is, for example, 1.5 times that of a case where the display is performed on an image display panel that is made up of sub-pixels of three colors including red, green, and blue and is illuminated with the same light source light amount. Therefore, according to the configuration of the embodiment described above, the maximum value Amax of the gain can be increased by 1.5 times without increasing the light source light amount.

Even if the display is performed by using sub-pixels of three colors including red, green, and blue, the display can be performed with a high luminance by increasing the lighting source lighting amount.

In the embodiment, the panel luminance control is independently performed individually for the light sources 56A, 56B, 56C, 56D, 56E, and 56F. For this reason, reproduction can be performed in a panel luminance range "b" broader than a panel luminance range "a" that can be reproduced in a case where the panel luminance control is performed using a single light source (see FIG. 28). For this reason, the maximum value Amax of the gain can be set to a higher value.

In the embodiment, the reference gain Ae of the pixel 48 in the first area is set to 1 or less, such that a contrast ratio of a high luminance pixel 48 in the second area to the pixel 48 in the first area can be improved. As a result, the high luminance pixel can be displayed more distinguishably.

The high luminance pixel ratio calculator 2722 calculates the ratio (high luminance pixel ratio) P of the number npix to the number Npix (Step S42). The number Npix is the number of all the pixels 48 of one frame of the first signal RGB. The number of npix is the number of pixels among all the pixels 48 of one frame of the first signal RGB and having the luminance (the luminance on a pixel basis) equal to or higher than the second luminance threshold Yth2, the luminance being calculated by using Equation (27). The high luminance pixel ratio P can be acquired using the following Equation (28).

$$P = npix/Npix \quad (28)$$

The gain calculator 2723 acquires the gain coefficient k1 for the first area and the gain coefficient k2 for the second area by applying the reference gain Ae, the first ratio threshold P1, the second ratio threshold P2, and the high luminance pixel ratio P to Equations (24) and (25). The gain calculator 2723 acquires gain characteristics in the tone curve converting process illustrated in FIG. 29 by applying the gain coefficient k1, the gain coefficient k2, the reference gain Ae, the maximum value Amax of the gain, and the index c to Equations (19) and (20) (Step S43).

The second signal generator 2724 multiplies the signal value R(p, q) of the first sub-pixel 49R, the signal value G(p, q) of the second sub-pixel 49G, and the signal value B(p, q) of the third sub-pixel 49B of the pixel 48 of the first signal RGB as the input signal of an image by the gain A corresponding to the luminance Yin acquired by the luminance analyzer 271, thereby acquiring the signal value $x_{1\text{-}(p, q)}$ of the first sub-pixel 49R, the signal value $x_{2\text{-}(p, q)}$ of the second sub-pixel 49G, and the signal value $x_{3\text{-}(p, q)}$ of the third sub-pixel 49B of each pixel 48 of the second signal rgb. Thus, the second signal generator 2724 generates the second signal rgb (Step S44). Specifically, the second signal generator 2724 calculates the signal value $x_{1\text{-}(p, q)}$ of the first sub-pixel 49R, the signal value $x_{2\text{-}(p, q)}$ of the second sub-pixel 49G, and the signal value $x_{3\text{-}(p, q)}$ of the third sub-pixel 49B of each pixel 48 of the second signal rgb by using the following Equations (29), (30), and (31).

$$x_{1\text{-}(p,q)} = A \cdot R(p,q) \quad (29)$$

$$x_{2\text{-}(p,q)} = A \cdot G(p,q) \quad (30)$$

$$x_{3\text{-}(p,q)} = A \cdot B(p,q) \quad (31)$$

In the embodiment, by changing the tone curve setting value input from the external control device 11, the tone curve converting processing characteristics illustrated in FIG. 28 can be changed.

The second luminance threshold Yth2 is assumed to be set to about 80% the maximum value (maximum luminance Yinmax=1) of the luminance Yin of the first signal RGB (Yth2=0.8), for example. The first ratio threshold P1 is assumed to be set to about 30%, for example. The second ratio threshold P2 is assumed to be set to about 50% to 60%, for example. The increase in the dynamic range obtained by the tone curve converting process is not effective enough for an image that is bright as a whole. In addition, the degree of the effect differs according to the use of the display apparatus 10 and the type of image source. Thus, by setting the second luminance threshold Yth2, the first ratio threshold P1, and the second ratio threshold P2 to be values appropriate for the use of the display apparatus 10 and the type of image source, an optimal effect can be acquired.

The configuration of the tone curve converter, the gain characteristics in the tone curve converting process, and the gain coefficient characteristics in the tone curve converting process according to the embodiment may be changed as illustrated in the following FIGS. 33 to 41.

Figure 33:
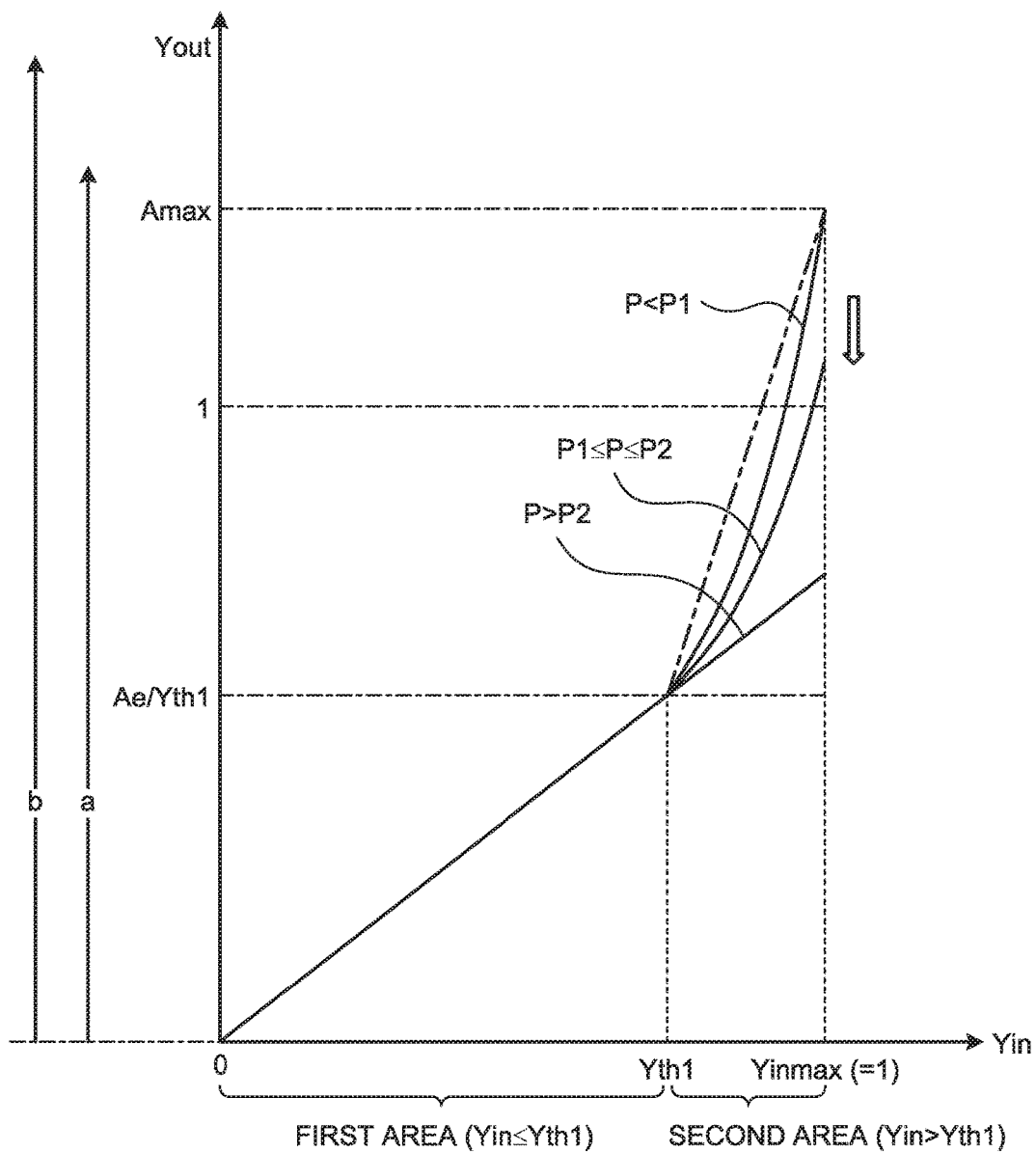
FIG. 33 is a diagram that illustrates an example of tone curve converting processing characteristics of a case where a gain coefficient k1 for a first area is fixed at "1" (k1=1)
Figure 34:
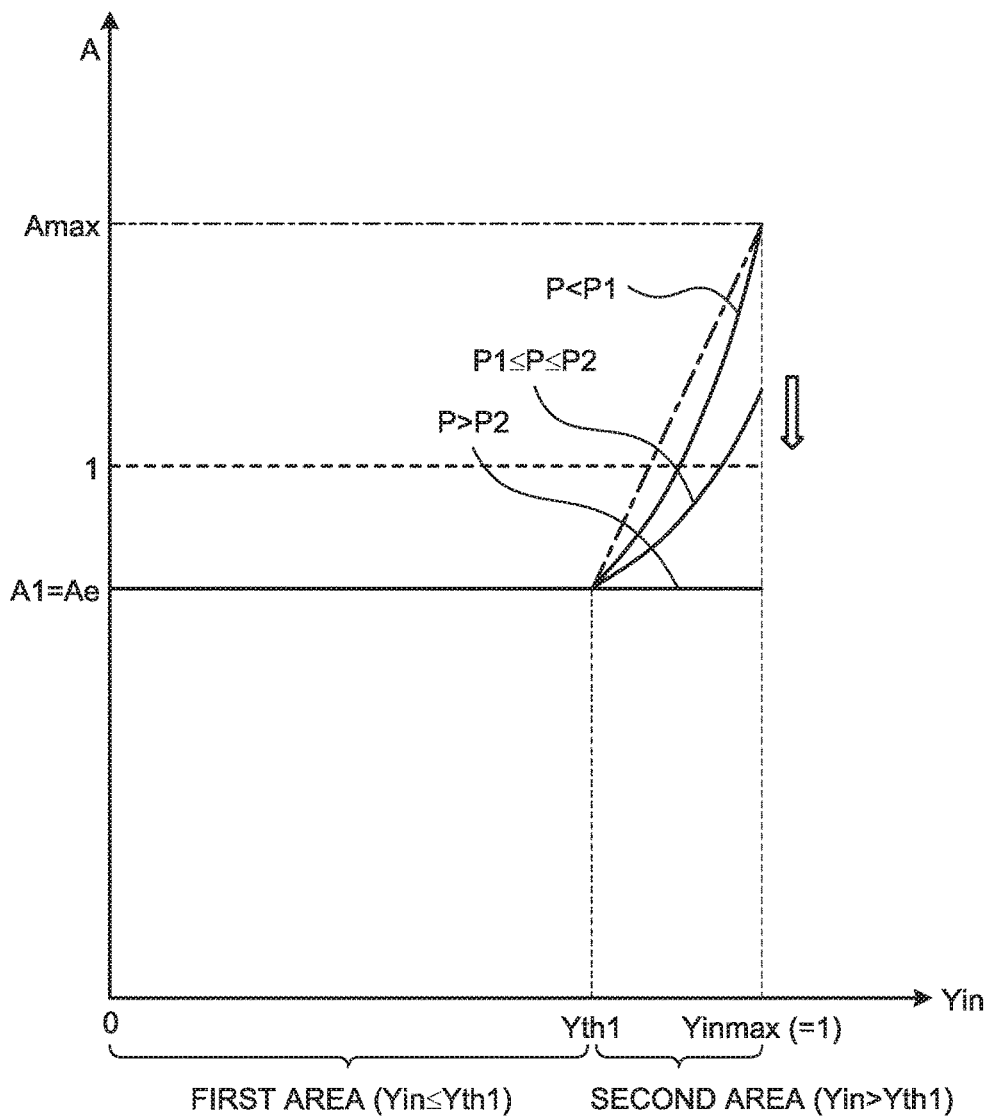
FIG. 34 is a diagram that illustrates an example of gain characteristics in the tone curve converting process of a case where the gain coefficient k1 for the first area is fixed at "1" (k1=1)
Figure 35:
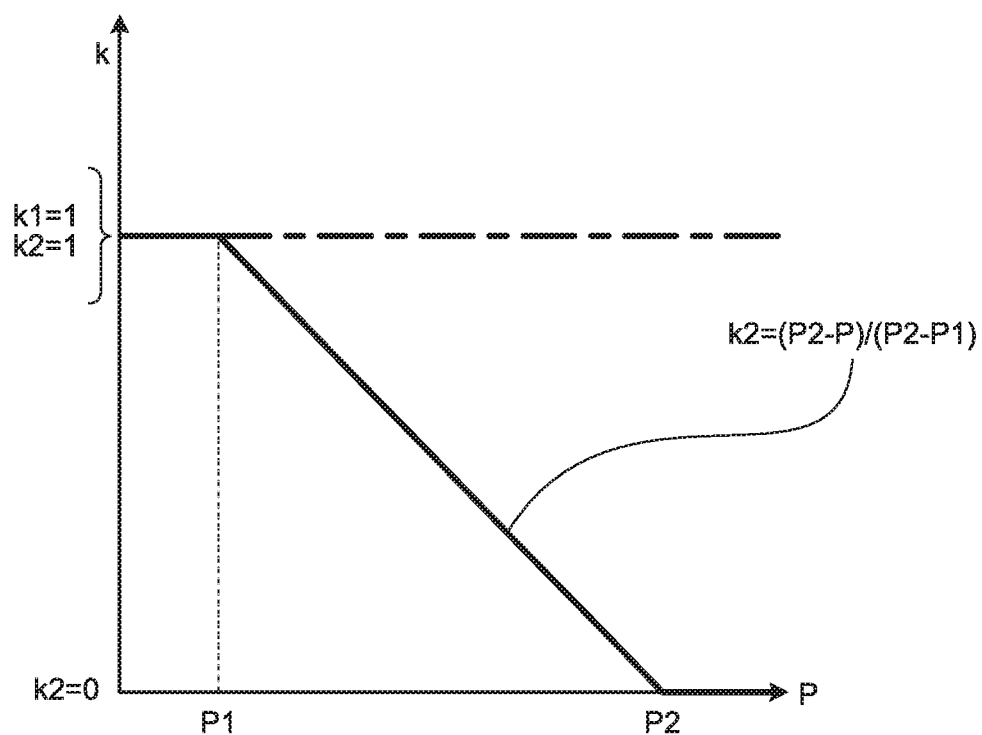
FIG. 35 is a diagram that illustrates an example of gain coefficient characteristics in the tone curve converting process of a case where the gain coefficient k1 for the first area is fixed at "1" (k1=1)

FIG. 33 is a diagram that illustrates an example of tone curve converting processing characteristics of a case where the gain coefficient k1 for the first area is fixed at "1" (k1=1). FIG. 34 is a diagram that illustrates an example of the gain characteristics in the tone curve converting process of a case where the gain coefficient k1 for the first area is fixed at "1" (k1=1). FIG. 35 is a diagram that illustrates an example of the gain coefficient characteristics in the tone curve converting process of a case where the gain coefficient k1 for the first area is fixed at "1" (k1=1).

As illustrated in FIGS. 33, 34, and 35, the gain coefficient k1 for the first area may be set to a constant value (for example, "1") regardless of the first ratio threshold P1 and the second ratio threshold P2. In such a case, the gain coefficient k1 for the first area may be provided as the tone curve setting value, the gain coefficient k1 for the first area input from the external control device 11 may be stored in the tone curve setting value storage 2721, and the gain calculator 2723 may acquire gain characteristics in the tone curve converting process illustrated in FIG. 34 by applying the gain coefficient k1 to Equations (19) and (20) described above (Step S43).

Figure 36:
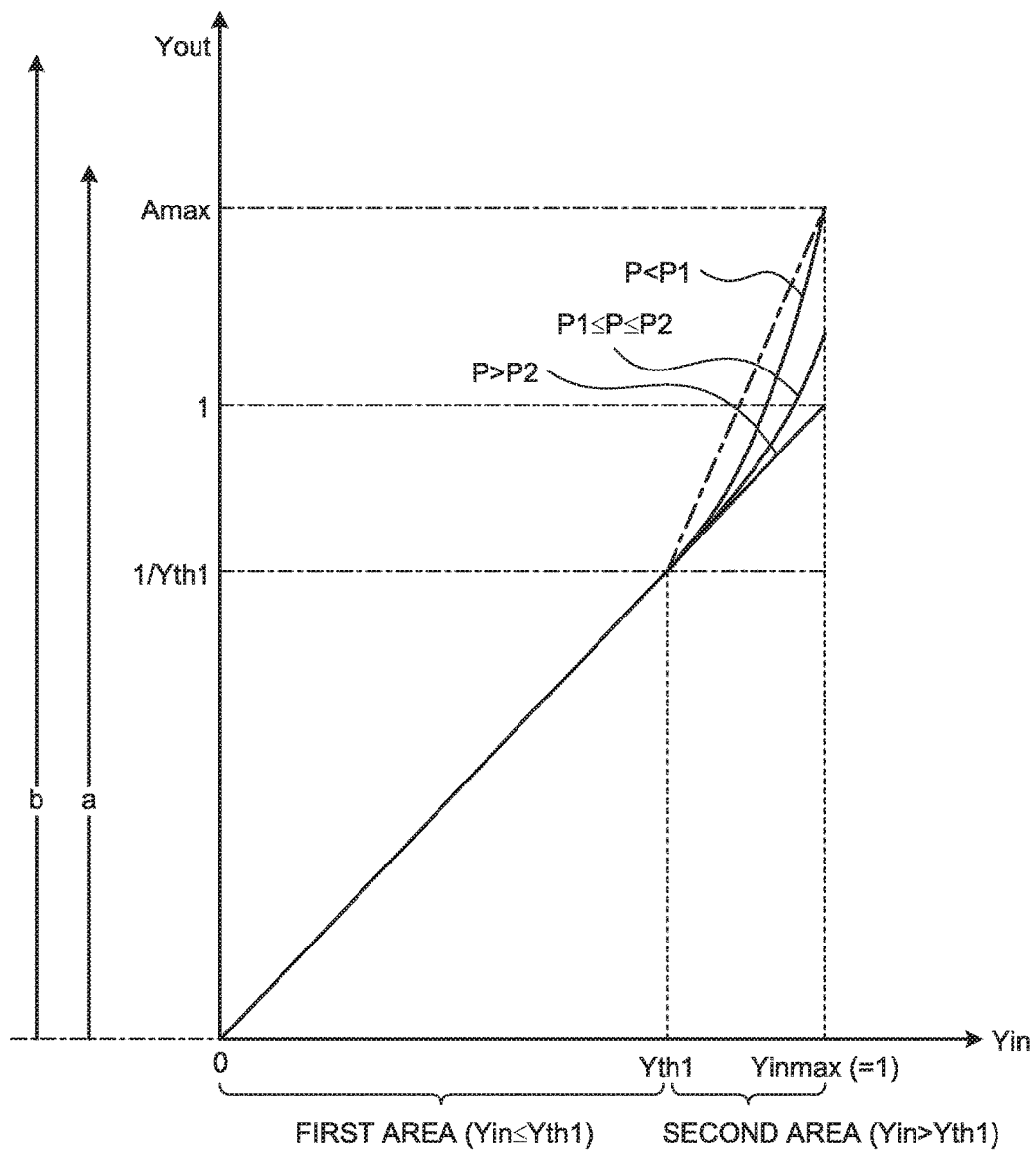
FIG. 36 is a diagram that illustrates an example of tone curve converting processing characteristics of a case where a reference gain Ae and the gain coefficient k1 for the first area are fixed at "1" (Ae=1 and k1=1)
Figure 37:
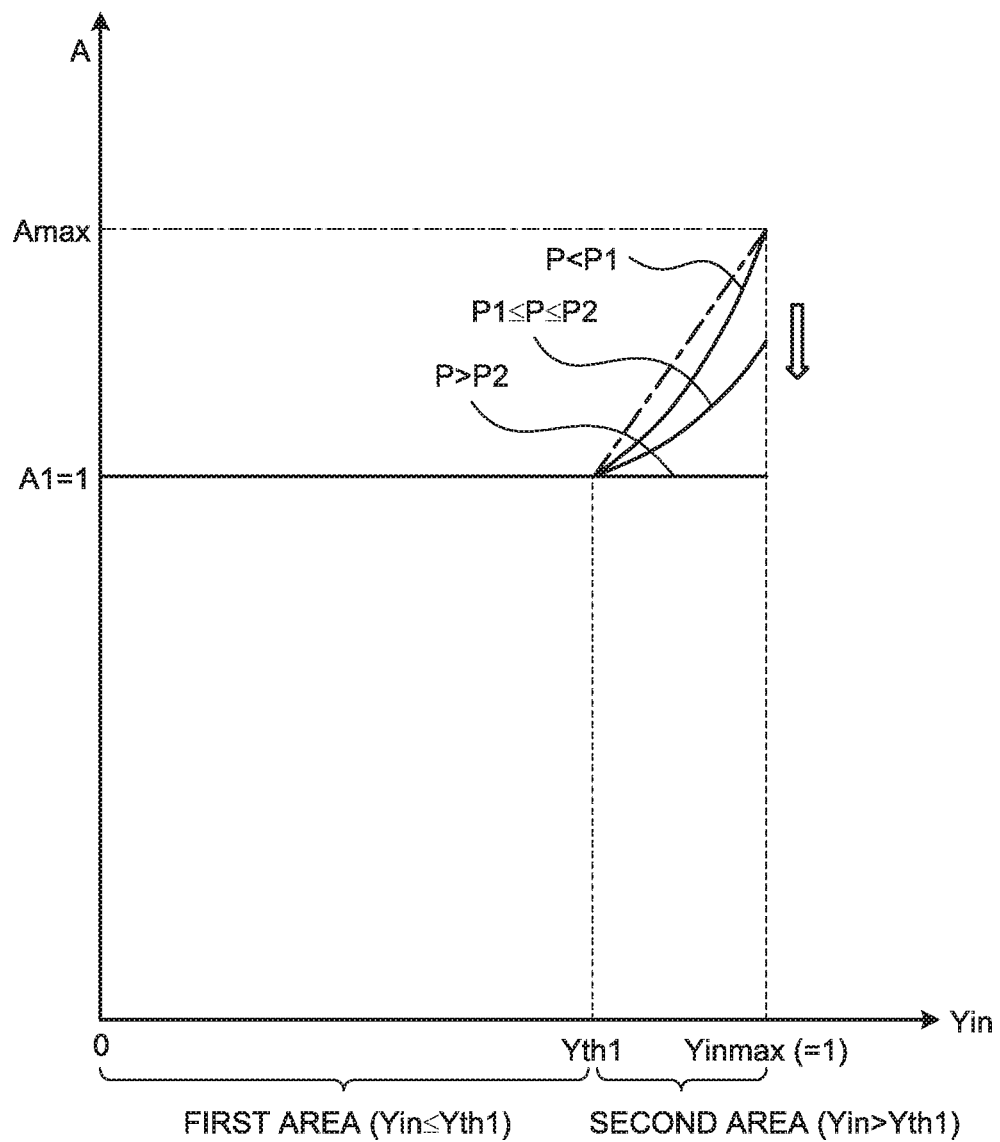
FIG. 37 is a diagram that illustrates an example of gain characteristics in a tone curve converting process of a case where the reference gain Ae and the gain coefficient k1 for the first area are fixed at "1" (Ae=1 and k1=1)

FIG. 36 is a diagram that illustrates an example of the tone curve converting processing characteristics of a case where the reference gain Ae and the gain coefficient k1 for the first area are fixed at "1" (Ae=1 and k1=1). FIG. 37 is a diagram that illustrates an example of the gain characteristics in the tone curve converting process of a case where the reference gain Ae and the gain coefficient k1 for the first area are fixed at "1" (Ae=1 and k1=1).

As illustrated in FIGS. 36 and 37, the reference gain Ae and the gain coefficient k1 for the first area may be set to a constant value (here, "1") regardless of the first ratio threshold P1 and the second ratio threshold P2.

Figure 38:
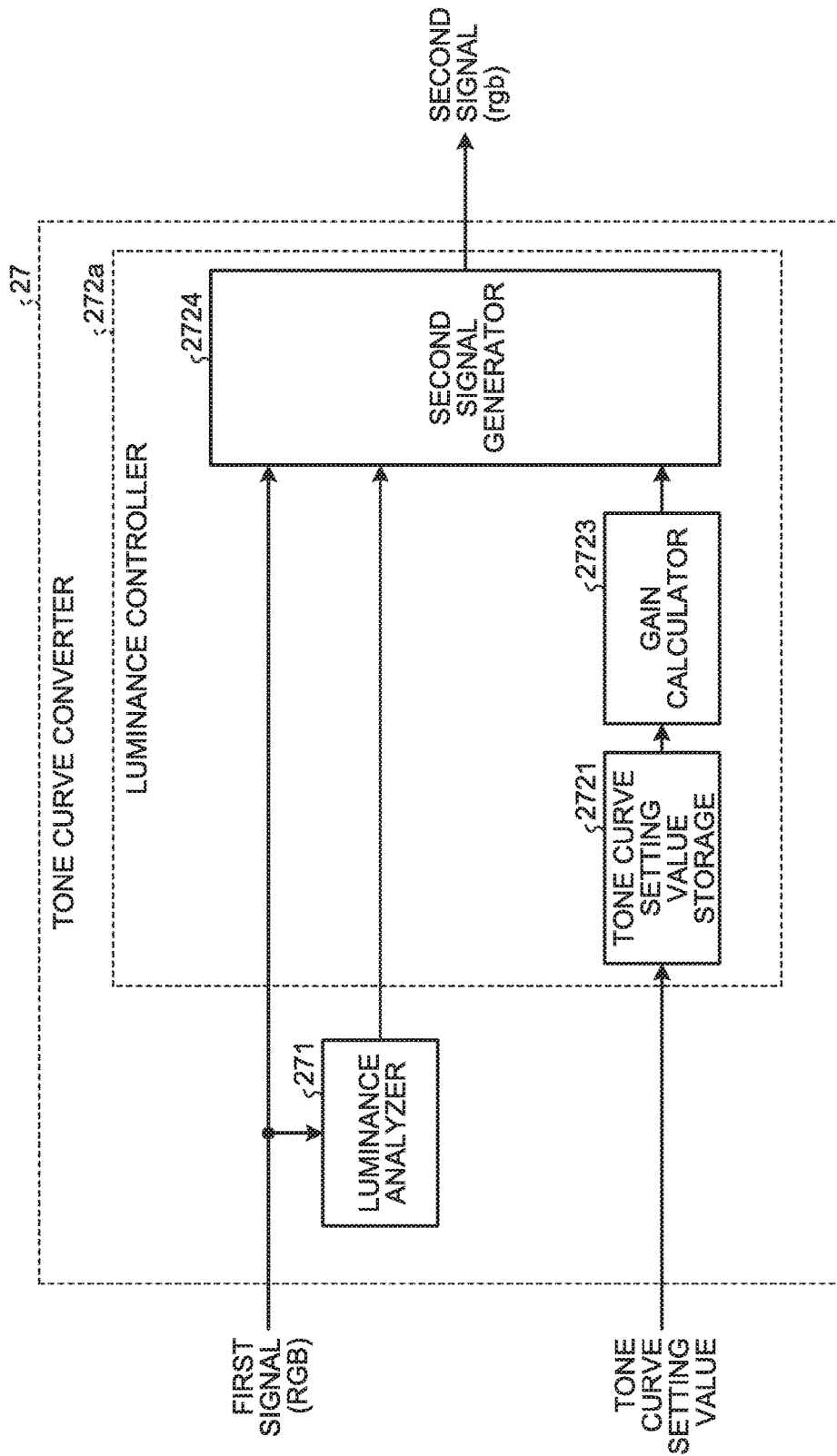
FIG. 38 is a block diagram that illustrates a configuration example of a tone curve converter according to the embodiment in which a high luminance pixel ratio calculator is omitted.
Figure 39:
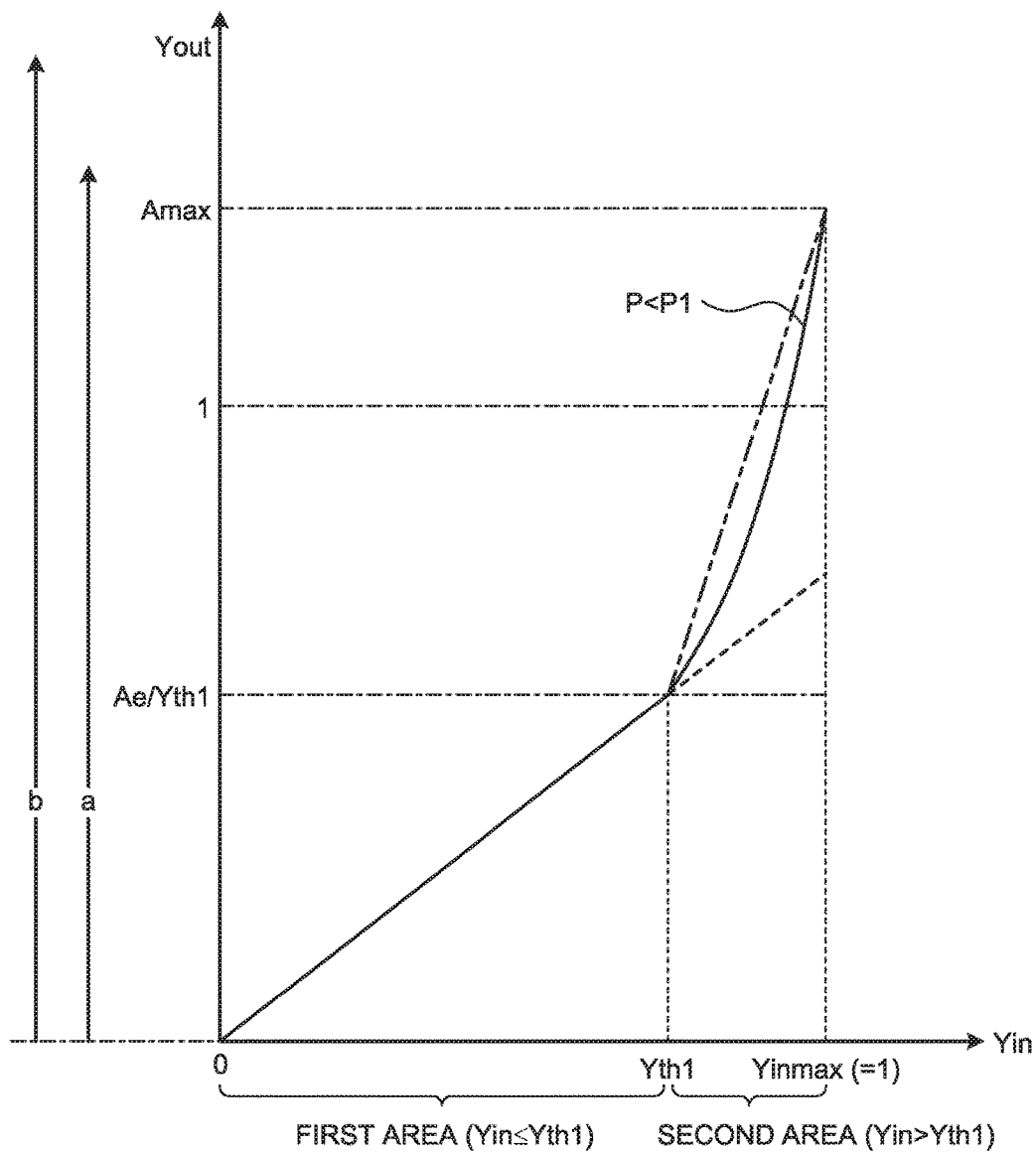
FIG. 39 is a diagram that illustrates an example of tone curve converting processing characteristics in a configuration in which the high luminance pixel ratio calculator is omitted.
Figure 40:
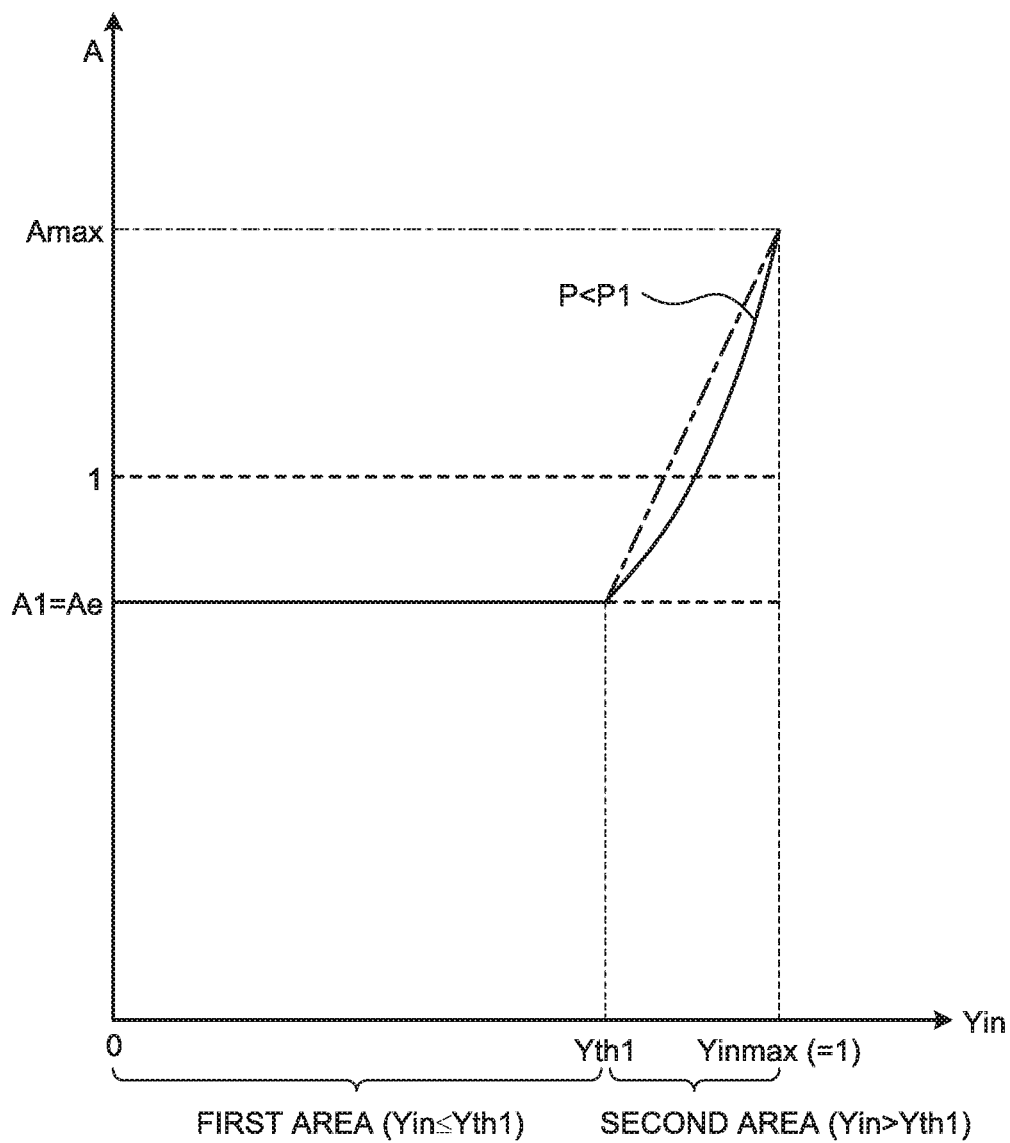
FIG. 40 is a diagram that illustrates an example of gain characteristics in the tone curve converting process in a configuration in which the high luminance pixel ratio calculator is omitted.
Figure 41:
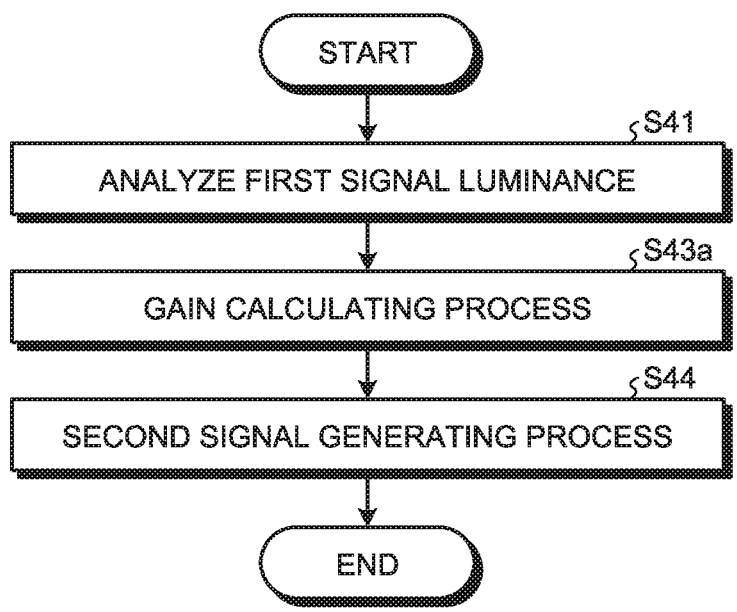
FIG. 41 is a flowchart that illustrates an example of a tone curve converting process in a configuration in which a high luminance pixel ratio calculator is omitted.

FIG. 38 is a block diagram that illustrates a configuration example of a tone curve converter according to the embodiment in which a high luminance pixel ratio calculator is omitted. FIG. 39 is a diagram that illustrates an example of the tone curve converting processing characteristics in a configuration in which the high luminance pixel ratio calculator is omitted. FIG. 40 is a diagram that illustrates an example of the gain characteristics in the tone curve converting process in a configuration in which the high luminance pixel ratio calculator is omitted. FIG. 41 is a flowchart that illustrates an example of the tone curve converting process in a configuration in which a high luminance pixel ratio calculator is omitted.

As illustrated in FIG. 38, the tone curve converter 27 may have a luminance controller 272a in which the high luminance pixel ratio calculator 2722 is omitted from the configuration illustrated in FIG. 31.

In the examples illustrated in FIGS. 38, 39, 40, and 41, the gain coefficient k1 for the first area and the gain coefficient k2 for the second area are set to a constant value (for example, "1").

Specifically, the gain coefficient k1 for the first area and the gain coefficient k2 for the second area are provided as the tone curve setting values, the gain coefficient k1 for the first area and the gain coefficient k2 for the second area input from the external control device 11 are stored in the tone curve setting value storage 2721, and the gain calculator 2723 acquires gain characteristics in the tone curve converting process illustrated in FIG. 40 by applying the gain coefficient k1, the gain coefficient k2, the reference gain Ae, the maximum value Amax of the gain, and the index c to Equations (19) and (20) described above (Step S43a).

Figure 42:
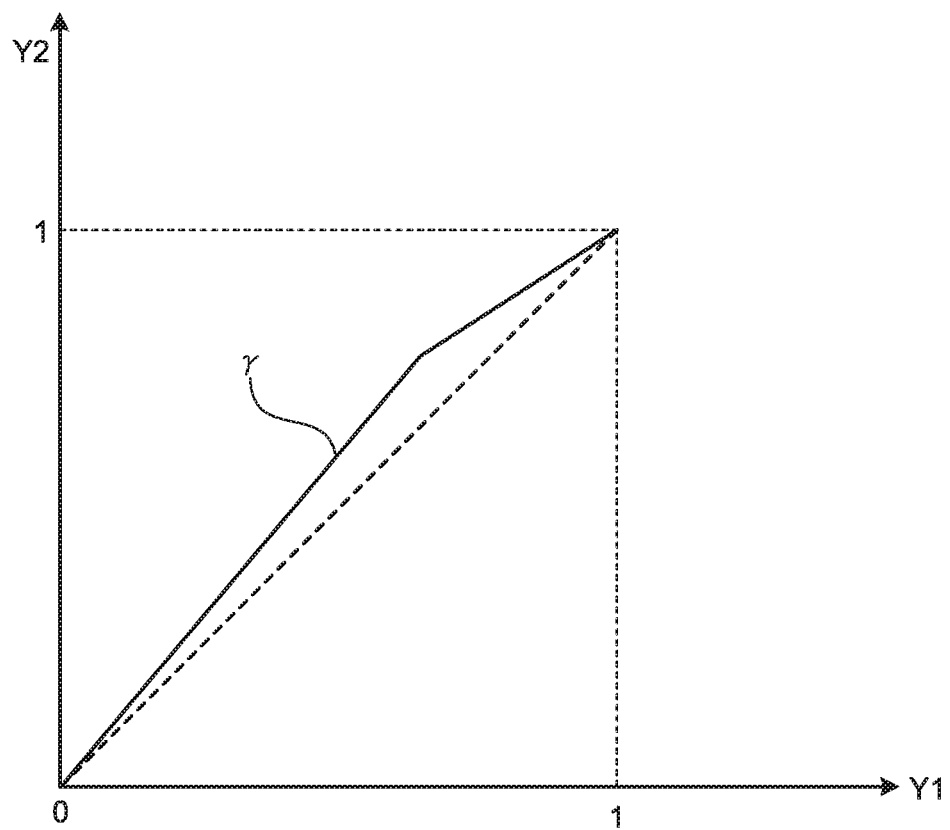
FIG. 42 is a diagram that illustrates a relation between the luminance of an original image and the luminance of a first signal in a case where the luminance of an input signal for the tone curve converter according to the embodiment has a predetermined curve characteristic γ with respect to the luminance of the original image.

FIG. 42 is a diagram that illustrates a relation between the luminance of an original image and the luminance of a first signal in a case where the luminance of the input signal for the tone curve converter according to the embodiment has a predetermined curve characteristic γ with respect to the luminance of the original image. FIG. 43 is a diagram that illustrates examples in which an image display area 100 of an original image is divided into a plurality of areas, and in which the curve characteristic γ of the luminance of the input signal for the tone curve converter according to the embodiment with respect to the luminance of the original image differs from division area to division area.

In the example illustrated in FIG. 42, the horizontal axis represents the luminance Y1 of the original image, and the vertical axis represents the luminance Y2 (Yin) of the first signal RGB that is the input signal for the signal processor 20 according to an embodiment. FIG. 43 illustrates an example that is normalized with respect to the maximum value of the luminance Y1 of the original image.

As illustrated in FIG. 42, even if the luminance Y2 (Yin) of the first signal RGB as the input signal for the tone curve converter 27 has a predetermined curve characteristic γ for the luminance of the original image, the tone curve converting process performed by the tone curve converter 27 according to the embodiment can be applied to the first signal RGB.

In the examples illustrated in FIG. 43, the image display area 100 of the original image is divided into a plurality of division areas 100a to 100l. The luminance Y2 (Yin) of the first signal RGB, which is the input signal for the tone curve converter 27 according to the embodiment, has a curve characteristic γ for the luminance Y1 of the original image that differs from division area to division area.

As illustrated in FIGS. 42 and 43, the tone curve converting process performed by the tone curve converter 27 according to the embodiment can be applied to a case where the luminance Yin of the first signal RGB as the input signal for the tone curve converter 27 has a predetermined curve characteristic γ with respect to the luminance of the original image.

The image processor 22 performs a synchronization process in which the converting process described above is performed, thereby outputting the signal value $X_{1\text{-}(p,q)}$, the signal value $X_{2\text{-}(p,q)}$, the signal value $X_{3\text{-}(p,q)}$, and the signal value $X_{4\text{-}(p,q)}$ of the (p, q)-th pixel 48 (Step S16).

The image display panel driver 40 displays an image on the image display panel 30 for each frame based on a synchronization signal TM. THe planar light source device controller 60 independently drives the light source 56A, 56B, 56C, 56D, 56E, 56F, 57A, 57B, 57C, 57D, 57E, or 57F.

In the embodiment, the pixel 48 has the fourth sub-pixel 49W, and the image processor 22 is configured to convert the second signal rgb of three colors including red, green, and blue into the third signal RGBW of four colors including red, green, blue, and white. The panel luminance control is independently performed individually for the light sources 56A, 56B, 56C, 56D, 56E, and 56F. However, the configuration to which the tone curve converting process performed by the tone curve converter 27 according to the embodiment can be applied is not limited thereto.

For example, even if the configuration is such that a display is performed using sub-pixels of three colors including red, green, and blue, the tone curve converting process performed by the tone curve converter 27 according to the embodiment can be realized by increasing the light source light amount. Even if the display apparatus is an apparatus using an organic electro-luminescence display (OLED) panel using organic electroluminescence emission, the gain for a high luminance pixel can be increased by using remaining power of the lighting amount of the OLED panel.

Figure 44B:
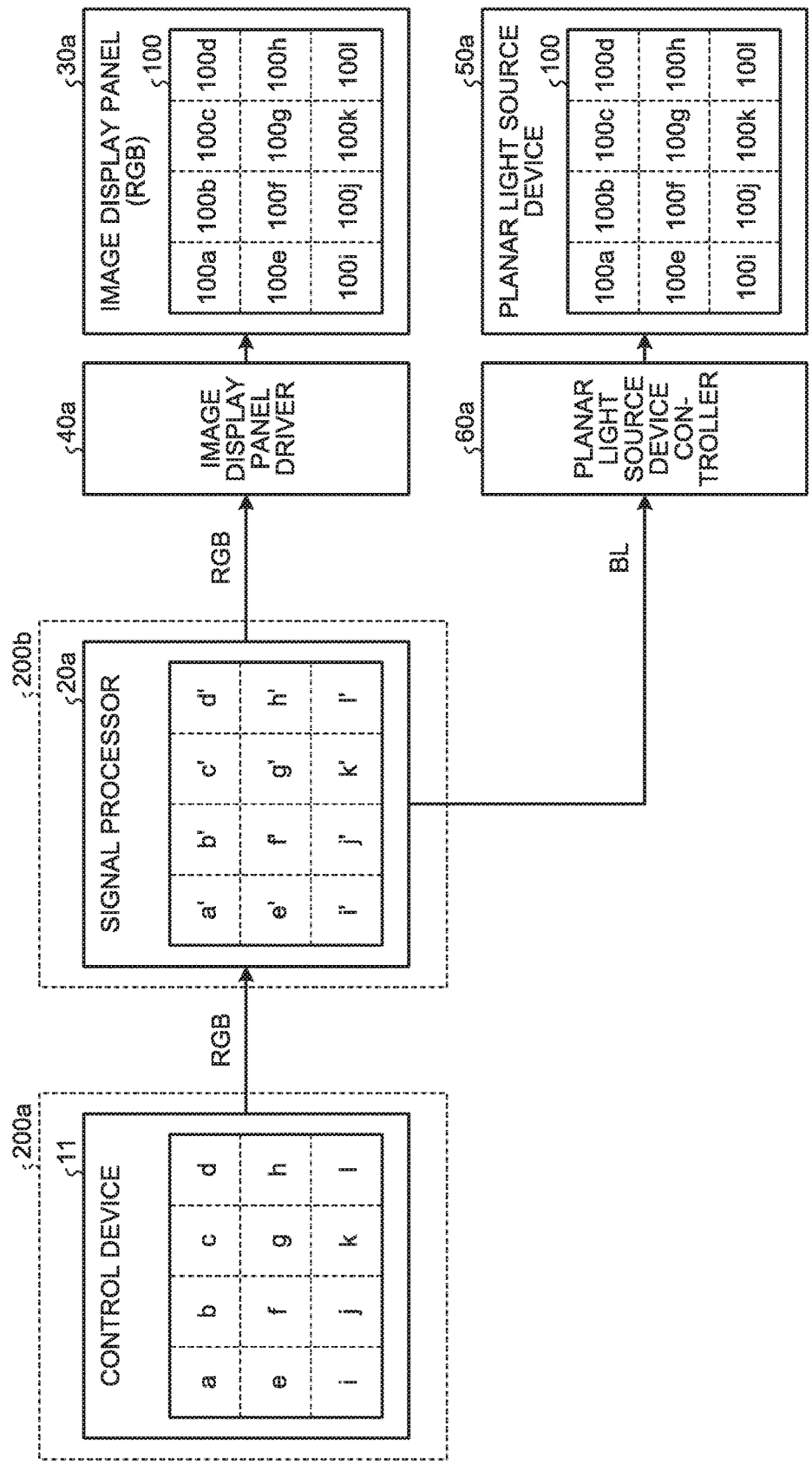
FIG. 44B is a diagram that illustrates an example in which the display apparatus according to the embodiment is applied to a liquid crystal display panel made up of sub-pixels of the three colors red, green, and blue.
Figure 45A:
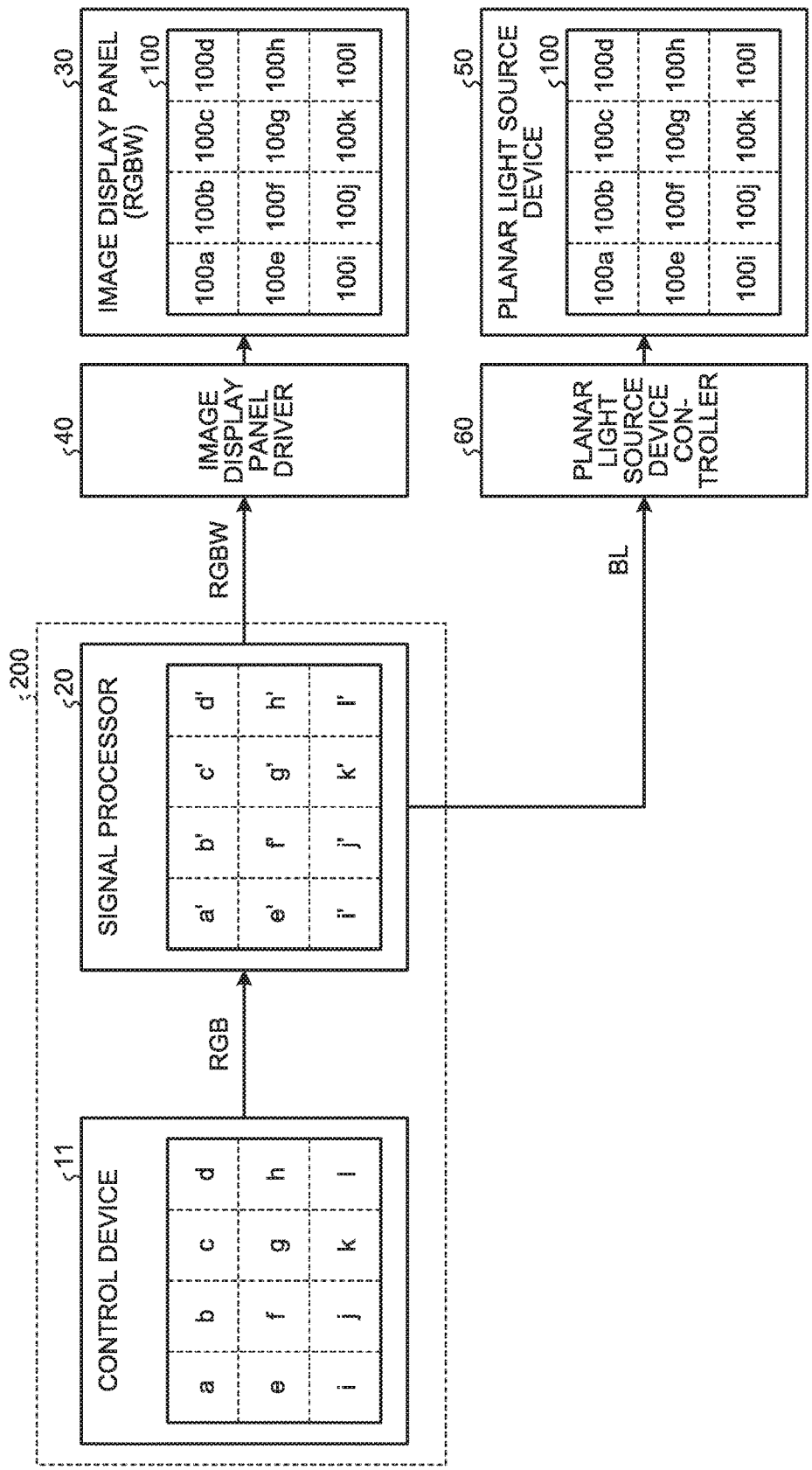
FIG. 45A is a diagram that illustrates another example other than the example illustrated in FIG. 44A in which the display apparatus according to the embodiment is applied to a liquid crystal display panel made up of sub-pixels of the four colors red, green, blue, and white.
Figure 45B:
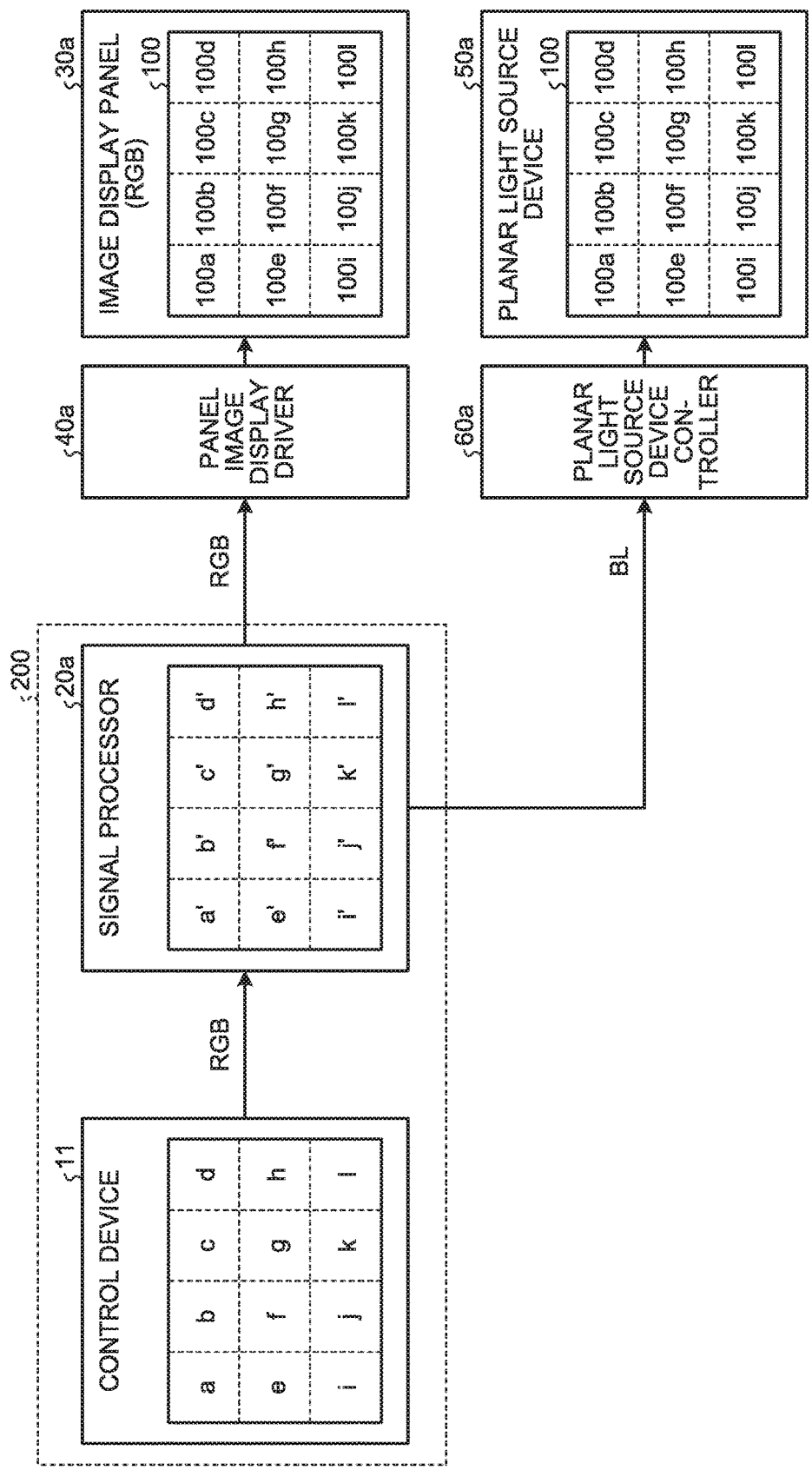
FIG. 45B is a diagram that illustrates another example other than the example illustrated in FIG. 44B in which the display apparatus according to the embodiment is applied to a liquid crystal display panel made up of sub-pixels of the three colors red, green, and blue.
Figure 45C:
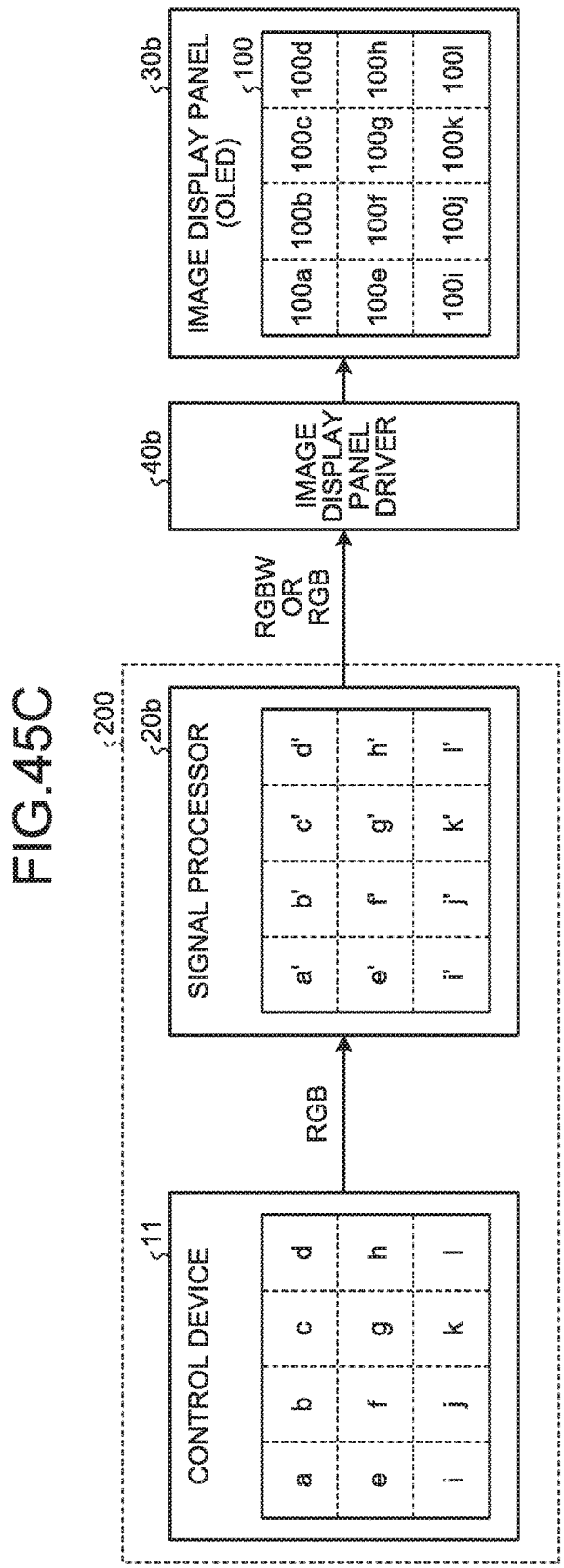
FIG. 45C is a diagram that illustrates another example other than the example illustrated in FIG. 44C in which the display apparatus according to the embodiment is applied to an OLED panel.

FIG. 44A is a diagram that illustrates an example in which the display apparatus according to the embodiment is applied to a liquid crystal display panel made up of sub-pixels of the four colors red, green, blue, and white. FIG. 44B is a diagram that illustrates an example in which the display apparatus according to the embodiment is applied to a liquid crystal display panel made up of sub-pixels of the three colors red, green, and blue. FIG. 44C is a diagram that illustrates an example in which the display apparatus according to the embodiment is applied to an OLED panel. FIG. 45A is a diagram that illustrates another example other than the example illustrated in FIG. 44A in which the display apparatus according the embodiment is applied to the liquid crystal display panel made up of sub-pixels of the four colors red, green, blue, and white. FIG. 45B is a diagram that illustrates another example other than the example illustrated in FIG. 44B in which the display apparatus according to the embodiment is applied to a liquid crystal display panel made up of sub-pixels of the three colors red, green, and blue. FIG. 45C is a diagram that illustrates another example other than the example illustrated in FIG. 44C in which the display apparatus according to the embodiment is applied to an OLED panel.

In the example illustrated in FIG. 44A, a control device 11 is included in a semiconductor integrated circuit (IC) 200a. A signal processor 20 is included in the semiconductor integrated circuit (IC) 200b. The image display panel driver 40 is supplied with an RGBW signal from the signal processor 20 and drives an image display panel (RGBW liquid crystal display panel) 30. The planar light source device controller 60 is supplied with a BL signal from the signal processor 20 and controls the planar light source device 50. The image display area 100 is divided into division areas 100a, 100b, 100c, 100d, 100e, 100f, 100g, 100h, 100i, 100j, 100k, and 100l. In such a configuration, the signal processor 20 performs a tone curve converting process according to a curve characteristic that differs from division area to division area, thereby converting a into a', b into b', c into c', d into d', e into e', f into f', g into g', h into h', i into i', j into j', k into k', and l into l', for the respective division areas 100a, 100b, 100c, 100d, 100e, 100f, 100g, 100h, 100i, 100j, 100k, and 100l.

As illustrated in FIG. 45A, the control device 11 and the signal processor 20 may be included in one semiconductor integrated circuit (IC) 200.

In the example illustrated in FIG. 44B, a control device 11 is included in the semiconductor integrated circuit (IC) 200a. A signal processor 20a is included in the semiconductor integrated circuit (IC) 200b. An image display panel driver 40a is supplied with an RGB signal from the signal processor 20a and drives an image display panel (RGB liquid crystal display panel) 30a. A planar light source device controller 60a is supplied with a BL signal from the signal processor 20a and controls a planar light source device 50a. The image display area 100 is divided into division areas 100a, 100b, 100c, 100d, 100e, 100f, 100g, 100h, 100i, 100j, 100k, and 100l. In such a configuration, the signal processor 20a performs a tone curve converting process according to a curve characteristic that differs from division area to division area, thereby converting a into a', b into b', c into c', d into d', e into e', f into f', g into g', h into h', i into i', j into j', k into k', and l into l', for the respective division areas 100a, 100b, 100c, 100d, 100e, 100f, 100g, 100h, 100i, 100j, 100k, and 100l.

As illustrated in FIG. 45B, the control device 11 and the signal processor 20a may be included in one semiconductor integrated circuit (IC) 200.

In the example illustrated in FIG. 44C, a control device 11 is included in the semiconductor integrated circuit (IC) 200a. A signal processor 20b is included in the semiconductor integrated circuit (IC) 200b. An image display panel controller 40b is supplied with an RGB signal from the signal processor 20b and drives an image display panel (RGB liquid crystal display panel) 30b. The image display area 100 is divided into division areas 100a, 100b, 100c, 100d, 100e, 100f, 100g, 100h, 100i, 100j, 100k, and 100l. In such a configuration, the signal processor 20b performs a tone curve converting process according to a curve characteristic that differs from division area to division area, thereby converting a into a', b into b', c into c', d into d', e into e', f into f', g into g', h into h', i into i', j into j', k into k', and l into l', for the respective division areas 100a, 100b, 100c, 100d, 100e, 100f, 100g, 100h, 100i, 100j, 100k, and 100l.

As illustrated in FIG. 45C, the control device 11 and the signal processor 20b may be included in one semiconductor integrated circuit (IC) 200.

In the example described above, the gain of the high luminance pixel is increased using the luminance in the XYZ color system as an index. The gain of the high luminance pixel may be increased by using the brightness in the HSV space as an index.

As described above, the display apparatus 10 of the embodiment includes the image display panel 30 and the signal processor 20. The image display panel 30 includes a plurality of pixels 48 and displays an image. The signal processor 20 generates the second signal rgb by multiplying signal values for a plurality of sub-pixels making up the pixel 48 by a gain. The signal values of the sub-pixels are included in the first signal RGB that is the input signal of the image. The signal processor 20 calculates the luminance Yin of the pixel 48 based on the signal values of the sub-pixels included in the pixel 48. The signal processor 20 increases the gain by which the signal values of the sub-pixels of a high luminance pixel 48 are multiplied, in accordance with the luminance Yin of the high luminance pixel 48. The high luminance pixel 48 is a pixel having the luminance Yin that exceeds the first luminance threshold Yth1. In this way, the gain of the high luminance pixel can be increased for an arbitrary image input.

In addition, in the embodiment, the first luminance threshold Yth1 is set for a pixel made up of a plurality of the sub-pixels all the signal values of which are greater than 0. Accordingly, the gain for a pixel 48 including a white component can be increased.

Furthermore, in the embodiment, the signal processor decreases the gain by which the signal values of the sub-pixels of a pixel 48 having the luminance Yin of the first signal RGB equal to or less than the first luminance threshold Yth1 are multiplied. In this way, a high luminance pixel can be displayed more distinguishably.

In the embodiment, the signal processor acquires the ratio (high luminance pixel ratio) P of the number of pixels 48 having the luminance Yin equal to or higher than the second luminance threshold Yth2 to the total number of all the pixels 48 displaying the image. When the high luminance pixel ratio P exceeds the first ratio threshold P1, the signal processor decreases the gain by which the signal values of the sub-pixels of the pixel 48 having the luminance Yin that exceeds the first luminance threshold Yth1 are multiplied. In this way, it can be prevented that an effect of increasing the dynamic range is reduced for an image that is bright as a whole.

Furthermore, in the embodiment, when the high luminance pixel ratio P exceeds the second ratio threshold P2 larger than the first ratio threshold P1, the signal processor sets the gain, by which the signal values for sub-pixels are multiplied, to be a predetermined constant value. In this way, the contrast ratio for a bright image can be maintained to be normal.

According to the embodiment, a display apparatus capable of increasing the dynamic range of a display image by increasing the gain of a high luminance pixel for an arbitrary image input is acquired.

As above, while the embodiments of the present invention have been described, such embodiments are not limited to the contents of the embodiments. In each constituent element described above, an element that can be easily considered by a person skilled in the art, an element that is substantially the same, and an element that is in a so-called equivalent range are included. In addition, the constituent elements described above may be appropriately combined. Furthermore, various omissions, substitutions, or changes of the constituent elements may be made in a range not departing from the concepts of the embodiments described above.

The present disclosure includes the following aspects.

(1) A display apparatus comprising:

an image display panel including a plurality of pixels and displaying an image; and a signal processor generating a second signal by multiplying signal values for a plurality of sub-pixels making up each of the plurality of pixels by a gain, the signal values being included in a first signal that is an input signal of the image, wherein the signal processor calculates a luminance of each of the plurality of pixels based on the signal values of the sub-pixels included in the respective pixels, and wherein the signal processor increases the gain by which the signal values of the sub-pixels of the pixel having a luminance greater than a first luminance threshold are multiplied, in accordance with the luminance of the corresponding pixel.

(2) The display apparatus according to (1), wherein the first luminance threshold is set for the pixel made up of the sub-pixels all the signal values of which are greater than 0.

(3) The display apparatus according to (1) or (2), wherein the first luminance threshold is set to a value in a range equal to or greater than 0.7 and less than 1.0.

(4) The display apparatus according to any one of (1) to (3),
wherein the signal processor decreases the gain by which the signal values of the sub-pixels of the pixel having the luminance equal to or less than the first luminance threshold are multiplied.

(5) The display apparatus according to any one of (1) to (4),
wherein the signal processor acquires a ratio of the number of pixels having the luminance equal to or higher than a second luminance threshold to a total number of all the pixels displaying the image,
wherein, when the ratio exceeds a first ratio threshold, the signal processor increases the gain by which the signal values of the sub-pixels of the pixel having the luminance greater than the first luminance threshold are multiplied.

(6) The display apparatus according to (5),
wherein, when the ratio exceeds a second ratio threshold greater than the first ratio threshold, the signal processor sets the gain, by which the signal values of the sub-pixels are multiplied, to be a predetermined constant value.

What is claimed is:

1. A display apparatus comprising:
an image display panel including a plurality of pixels and configured to display an image; and
a signal processor that generates a second signal by multiplying signal values for a plurality of sub-pixels respectively making up each of the plurality of pixels by a gain, the signal values being included in a first signal that is an input signal of the image,
wherein the signal processor calculates a luminance of each of the plurality of pixels based on the signal values of the sub-pixels included in the respective pixels, and
wherein the signal processor increases the gain by which the signal values of the sub-pixels of at least one of the pixels having a luminance greater than a first luminance threshold are multiplied, in accordance with the luminance of said at least one of the pixels,
wherein the signal processor acquires a ratio of the number of the pixels having the luminance equal to or higher than a second luminance threshold to a total number of all of the pixels displaying the image, and
wherein, when the ratio exceeds a first ratio threshold, the signal processor increases the gain by which the signal values of the sub-pixels of said at least one of the pixels having the luminance greater than the first luminance threshold are multiplied.

2. The display apparatus according to claim 1,
wherein the first luminance threshold is set for those of the pixels that are made up of the sub-pixels with the signal values all of which are greater than 0.

3. The display apparatus according to claim 1,
wherein the first luminance threshold is set to a value in a range equal to or greater than 0.7 and less than 1.0.

4. The display apparatus according to claim 1,
wherein the signal processor decreases the gain by which the signal values of the sub-pixels of at least one other one of the pixels having the luminance equal to or less than the first luminance threshold are multiplied.

5. The display apparatus according to claim 1,
wherein, when the ratio exceeds a second ratio threshold greater than the first ratio threshold, the signal processor sets the gain, by which the signal values of the sub-pixels are multiplied, to be a predetermined constant value.

* * * * *

UNITED STATES PATENT AND TRADEMARK OFFICE
CERTIFICATE OF CORRECTION

PATENT NO.         : 10,297,231 B2
APPLICATION NO.    : 15/677326
DATED              : May 21, 2019
INVENTOR(S)        : Kazuhiro Sako et al.

It is certified that error appears in the above-identified patent and that said Letters Patent is hereby corrected as shown below:

On the Title Page

ABSTRACT:
Please remove the duplicated word "the" on Line 7 of the Abstract section.
The resulting Abstract should read as:
ABSTRACT
(57)
According to an aspect, a display apparatus includes: an image display panel including a plurality of pixels and displaying an image; and a signal processor generating a second signal by multiplying signal values for a plurality of sub-pixels making up each of the plurality of pixels by a gain, the signal values being included in a first signal that is an input signal of the image. The signal processor calculates a luminance of each of the plurality of pixels based on the signal values of the sub-pixels included in the respective pixels. The signal processor increases the gain by which the signal values of the sub-pixels of the pixel having a luminance greater than a first luminance threshold are multiplied, in accordance with the luminance of the corre-sponding pixel.

Signed and Sealed this
Ninth Day of July, 2019

Andrei Iancu
*Director of the United States Patent and Trademark Office*